(12) United States Patent
Kuppanna et al.

(10) Patent No.: US 11,570,191 B2
(45) Date of Patent: *Jan. 31, 2023

(54) COMMUNICATIONS METHODS AND APPARATUS FOR DYNAMIC DETECTION AND/OR MITIGATION OF THREATS AND/OR ANOMALIES

(71) Applicant: Ribbon Communications Operating Company, Inc., Westford, MA (US)

(72) Inventors: Sridhar Kuppanna, Nashua, NH (US); Dilnawaj Ahmed, Groton, MA (US); Shaun Jaikarran Bharrat, Edison, NJ (US); Timothy R. Thornton, Brick, NJ (US); Justin Hart, Purton (GB); Kevin Riley, Amesbury, MA (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/149,608

(22) Filed: Jan. 14, 2021

(65) Prior Publication Data

US 2021/0144166 A1    May 13, 2021

Related U.S. Application Data

(63) Continuation of application No. 16/283,600, filed on Feb. 22, 2019, now Pat. No. 10,931,696, which is a
(Continued)

(51) Int. Cl.
*H04L 9/40* (2022.01)
*H04L 47/24* (2022.01)

(52) U.S. Cl.
CPC .......... *H04L 63/1425* (2013.01); *H04L 47/24* (2013.01); *H04L 63/0227* (2013.01);
(Continued)

(58) Field of Classification Search
None
See application file for complete search history.

(56) References Cited

U.S. PATENT DOCUMENTS

| 6,038,555 | A | 3/2000 | Field et al. |
| 8,958,438 | B2 | 2/2015 | Figura et al. |

(Continued)

FOREIGN PATENT DOCUMENTS

EP       3035637 A1    6/2016

OTHER PUBLICATIONS

Extended European Search Report for European Patent Application No. 19834855.9, 7 pages, dated Apr. 7, 2022.
(Continued)

*Primary Examiner* — Nafiz E Hoque
(74) *Attorney, Agent, or Firm* — Straub & Straub; Stephen T. Straub; Michael P. Straub

(57) ABSTRACT

The present invention relates to methods and apparatus for dynamically detecting and/or mitigating threats in communications systems. Exemplary methods and apparatus of the present invention allow for a combination of automated and operator controlled responses to threats. While an operator is provided an opportunity to provide input on how to respond to a threat, after one or more threats of a given type are identified, the system will automatically take corrective action without waiting for operator input and/or in the absence of operator input following notification of a threat.

20 Claims, 21 Drawing Sheets

Related U.S. Application Data continuation-in-part of application No. 16/057,114, filed on Aug. 7, 2018, now Pat. No. 10,659,485.

(60) Provisional application No. 62/703,848, filed on Jul. 26, 2018, provisional application No. 62/697,901, filed on Jul. 13, 2018.

(52) U.S. Cl.
CPC ...... *H04L 63/1433* (2013.01); *H04L 63/1458* (2013.01); *H04L 63/1483* (2013.01); *H04L 63/20* (2013.01)

(56) References Cited

U.S. PATENT DOCUMENTS

| | | | |
|---|---|---|---|
| 10,673,880 B1* | 6/2020 | Pratt | H04L 63/1433 |
| 2006/0047807 A1* | 3/2006 | Magnaghi | H04L 63/1458 709/224 |
| 2009/0300730 A1 | 12/2009 | Chaudhry et al. | |
| 2012/0106379 A1* | 5/2012 | Hamaguchi | H04L 41/142 370/252 |
| 2015/0003600 A1* | 1/2015 | Bucko | H04M 3/436 379/210.02 |
| 2016/0239330 A1* | 8/2016 | Mc Bride | H04L 41/0893 |
| 2017/0295207 A1 | 10/2017 | Yu et al. | |
| 2018/0053401 A1 | 2/2018 | Martin et al. | |

OTHER PUBLICATIONS

Extended European Search Report for European Patent Application No. 19834513.4, 7 pages, dated Feb. 23, 2022.

* cited by examiner

| FIGURE 10A |
| FIGURE 10B |
| FIGURE 10C |
| FIGURE 10D |
| FIGURE 10E |
| FIGURE 10F |
| FIGURE 10G |
| FIGURE 10H |
| FIGURE 10I |
| FIGURE 10J |
| FIGURE 10K | ively tracked with detailed understanding of the UC level interactions such as, for example, who is calling whom and when, what type of media do they typically exchange, etc. Among what is missing in the state of the art for Unified Communications is a holistic system that monitors the Unified Communications network, detects anomalies, and applies Unified Communications policies to the network all in a closed loop with incremental additions or reductions to achieve a desirable operating point.

COMMUNICATIONS METHODS AND APPARATUS FOR DYNAMIC DETECTION AND/OR MITIGATION OF THREATS AND/OR ANOMALIES

RELATED APPLICATIONS

The present application is a continuation of U.S. patent application Ser. No. 16/283,600 which was filed on Feb. 22, 2019 and which was published as U.S. Patent Application Publication No. US 2020-0021609 A1 on Jan. 16, 2020 which claims the benefit of the filing date of U.S. Provisional Patent Application Ser. No. 62/697,901 filed on Jul. 13, 2018 and U.S. Provisional Patent Application Ser. No. 62/703,848 filed on Jul. 26, 2018 and which was also a continuation in part of U.S. patent application Ser. No. 16/057,114 filed on Aug. 7, 2018 which issued as U.S. Pat. No. 10,659,485 on May 19, 2020. Each of the proceeding patent applications, patent application publications, and patents are hereby expressly incorporated by reference in their entirety.

FIELD OF INVENTION

The present invention relates to communications methods and apparatus for dynamically detecting and/or mitigating threats and/or anomalies in communications systems such as for example Unified Communications (UC) systems.

BACKGROUND

As the number of services offered through Unified Communications (UC) frameworks have expanded, Voice Over Internet Protocol (VOIP) and UC communications have become increasingly complex and varied. Various aspects of the UC problem have engendered solutions. There are products which allow viewing the call flows using UC level information, and various UC products allow the introduction of policies which address determined issues. However, the rapid increases in both the number of nodes within a call flow, and the variety of interacting protocols have pushed the management of Unified Communications systems beyond the cognitive capacity of the operator-monitored and controlled paradigm. This problem has previously arisen at lower layers of the networking stack (Internet Protocol (IP) level) and various Security Information and Event Management (SIEM) frameworks were developed to address the shortcomings. However, these SIEM frameworks lose their value when applied at higher levels of the stacks because the salient information necessary for usable Unified Communications monitoring and control is at the application specific protocol level. This is certainly the case for unified communications applications where anomalies can only be tracked or are most effec- From the foregoing it is apparent that there is a need for a technological solution to how to effectively, efficiently and in a cost-efficient manner monitor, detect and/or mitigate threats and/or anomalies in networks that solves one, some, or all of the aforementioned problems.

SUMMARY

The present invention relates to communications methods and apparatus for processing calls and for dynamically detecting and/or mitigating threats and/or anomalies in communications systems/networks, e.g., Unified Communications systems/networks. Various embodiments of the present invention address and solve one or more of the technological problems discussed above.

Various methods and apparatus are described which allow for a combination of automated and operator controlled responses to threats. While an operator is provided an opportunity to provide input on how to respond to a threat, after one or more threats of a given type are identified, the system will automatically take corrective action without waiting for operator input and/or in the absence of operator input following notification of a threat. When an operator does provide input on an action to take in response to a particular type of threat, the information is stored and used to implement corrective action the next time a threat of the same type is detected without waiting for operator input. Should the operator provide input on a detected threat and corrective action has already been taken, policy and/or actions will be updated to ensure that the operator suggested action is implemented with regard to an ongoing or new threat of the same type.

By combining notification and automated corrective action in an interactive process as new threats and/or threats of the same type are detected, the communications system can respond to threats at a rate faster than that which would be possible if human operator input was required before an action is taken. By pushing out or distributing changes in policy to enforcement rules in response to operator input with regard to detected threats, the system can evolve and improve over time while still allowing the threat detection and correction elements to operate, at least in some cases, outside the direct communications path of an individual call. In this way while the components of the threat detection system can influence processing, if the policy updating and/or operator input portion of the system becomes inactive for some reason, the call and/or other signal processing needed to support communications sessions can continue unaffected.

An exemplary embodiment of the present invention includes a method of operating a communication system including the steps of: processing at a first node executing an application for threat detection and mitigation, a first set of traffic data including information about system traffic corresponding to a first time period, one or more pieces of data in said first data set being provided by sensors or sensor enforcer nodes monitoring traffic; detecting, based on the first set of traffic data, a first set of traffic instances which are found to be a first threat of a first type; notifying an operator of the first threat; monitoring to detect a response from the operator indicating an action to be taken in the system in response to the first threat; and in response to detecting an operator indicated action to be taken in response to the first threat, implementing said action; in response to failing to detect an operator indicated action to be taken in response to the first threat within a predetermined time, continuing system operation without taking an action in response to the first threat; and storing information about the first threat of the first type and any action taken in response to the first threat of the first type.

In some embodiments, the method further comprises: in response to detecting an operator indicated action to be taken in response to the first threat, determining a policy change to be implemented to enforce the operator indicated action and communicating the policy change to one or more enforcement nodes or sensor enforcer nodes.

In some embodiments, the method further includes: in response to failing to detect an operator indicated action to be taken in response to the first threat of the first type within a second predetermined time following said first predetermined time: determining an automatic action or operator instructed action to be taken based on a stored set of threat information and action information indicating an automatic action or operator instructed action to be taken in response to a previous threat of the first type; automatically determining a policy change to be implemented to enforce the determined action to be taken; communicating the policy change to be implemented to the sensor enforcer devices and enforcement devices in the communications system.

The determined action to be taken in response to said first threat of a first type may, and in some embodiments does, include adding a source IP block to the sensor enforcer devices and enforcement devices of the communications system, said source IP block corresponding to an IP address of the device which was the source of the traffic corresponding to the set of traffic instances upon which the detection of the first threat was detected.

The sensor enforcer nodes/devices and enforcement nodes/devices may be, and in some embodiments are, firewall devices and SBC devices deployed at access points on the edge of the communication system.

Some embodiments of the method further include the additional steps of: processing at the first node a second set of traffic data including information about system traffic corresponding to a second time period, said second time period following said first time period; detecting, based on the second set of traffic data, a second set of traffic instances which are found to be a second threat of the first type; checking the stored set of threat information and action information indicating an automatic action or operator instructed action to be taken in response to a previous threat of the first type; and automatically taking the automatic or operator instructed action, if any, in the stored information matching the threat of the first type in response to detecting the second threat of the first type, notifying the operator of the second threat; monitoring to detect a response from the operator indicating an action to be taken in response to the second threat. In some such embodiments, in response to detecting an operator indicated action to be taken in response to the second threat, implementing the operator indicated action.

Various method embodiments of the present invention further include the step of updating the stored information corresponding to the first type of threat to indicate the operator specified action to be taken in response to threats of the first type.

In some embodiments of the method, in response to failing to detect an operator indicated action to be taken in response to the second threat in a predetermined time, checking to determine if the second threat corresponds to an increased rate of threats of the first type (e.g., a shorter time between detection of threats of the second type) or an increased level of threat (e.g., due to the severity of the threat); and if the detected threat corresponds to an increased rate of threats or an increased level of threats taking an automated action in response to the second threat in the absence of operator input. In some such embodiments, the step of taking an automated action in response to the second threat in the absence of operator input includes: checking the stored set of threat information and action information indicating an automatic action or operator instructed action to be taken in response to a previous threat of the first type having the same or a greater increased rate of threats of the first type or the same or a lesser level of threat of the first type (e.g., same or lesser severity level of threat for a threat of the first type); and automatically taking the automatic or operator instructed action, if any, in the stored information matching the second threat of the first type in response to detecting the second threat of the first type, said automatically taking the automatic or operator instructed action including: automatically determining a policy change to be implemented to enforce the determined action to be taken, communicating the policy change to be implemented to the sensor enforcer nodes and enforcement nodes in the communications system; and implementing the policy change at the sensor enforcer nodes and the enforcement nodes.

In some embodiments of the present invention the communications system is a Unified Communications system.

In various embodiments the step of detecting, based on the first set of data, a first set of traffic instances which are found to be a first threat of a first type includes determining if the first set of traffic instances contains a set of characteristics or patterns that match a set of characteristics or patterns which are indicative of a threat of the first type.

The invention is also directed to systems and apparatus that are used to implement the various method embodiments of the invention. In some apparatus embodiments the node or device executing the threat detection and mitigation application, the sensors, enforcement nodes or devices, sensor enforcer nodes or devices, gateway nodes or devices, database systems, application nodes and each of the other apparatus/nodes/devices of the system include a processor and a memory, the memory including instructions which when executed by the processor control the apparatus/node/device of the system to operate to perform the steps of various method embodiments of the invention or functions ascribed to the various apparatus/node/device of the system.

An exemplary communications system in accordance with an embodiment of the present invention is a system including: a first node which in turn includes one or more processors configured to control the operation of the first node to perform one or more threat detection and mitigation operations including: (i) processing a first set of traffic data including information about system traffic corresponding to a first time period, one or more pieces of data in said first data set being provided by sensors or sensor enforcer nodes monitoring traffic; (ii) detecting, based on the first set of traffic data, a first set of traffic instances which are found to be a first threat of a first type; (iii) notifying an operator of the first threat; (iv) monitoring to detect a response from the operator indicating an action to be taken in the system in response to the first threat; and in response to detecting an operator indicated action to be taken in response to the first threat, implementing said action; and in response to failing to detect an operator indicated action to be taken in response to the first threat within a first predetermined time, continuing system operation without taking an action in response to the first threat; and the system further includes a storage device in which information about the first threat of the first type and any action taken in response to the first threat of the first type is stored.

In some such embodiments, the communications system is a Unified Communications system and the one or more threat detection and mitigation operations further include: processing at the first node a second set of traffic data including information about system traffic corresponding to a second time period, said second time period following said first time period; detecting, based on the second set of traffic data, a second set of traffic instances which are found to be a second threat of the first type; checking the stored set of threat information and action information indicating an automatic action or operator instructed action to be taken in response to a previous threat of the first type; and automatically taking the automatic or operator instructed action, if any, in the stored information matching the threat of the first type in response to detecting the second threat of the first type.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
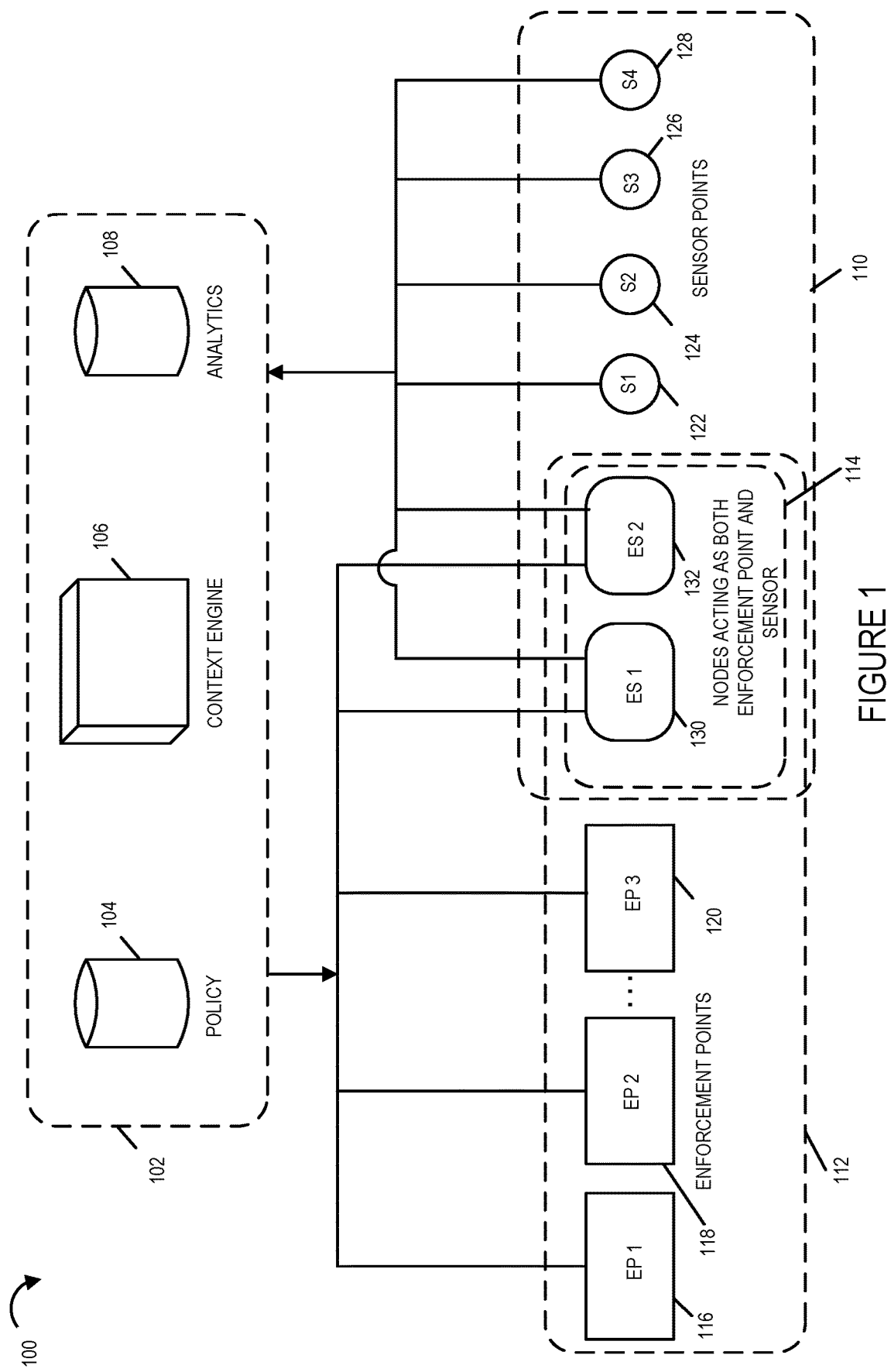
FIG. 1 illustrates an exemplary closed loop system for identifying and mitigating Unified Communications threats and/or anomalies in accordance with an embodiment of the present invention.

Diagram 100 of FIG. 1 illustrates the key components of an exemplary system architecture in accordance with one embodiment of the present invention.

At this level the solution is relatively straight forward. It includes three main domains—the Context Domain 102, the Sensor Domain 110, and the Enforcement Domain 112. The Sensor Domain 110 is also referred to herein as the Sensor Points Domain 110 and the Enforcement Domain 112 is also referred to herein as the Enforcement Points Domain 112. Each of these three main domains includes at least one or more elements/devices of the system.

The Context Domain 102 is the decision making part of the architecture/system. In the exemplary system architecture 100, the Context Domain includes at least the following elements or components: a context engine 106, an analytics component 108, and a policy component 104. The Context Engine component 106 is an extensible engine that is responsible for digesting the feedback from the sensor points of the system and based on the feedback determining what actions to take. For example, the context engine 106 receives information from one or more sensors S1 122, S2 124, S3 126, S4 128, ES 1 node 130 and ES 2 node 132, analyzes the received sensor information and determines actions to be taken based on system policies and generates commands to send to the enforcement points/devices which implement the commands.

The analytics element or component 108 includes a database system including a processor and a storage device. In the database system is stored data/information received from the sensors of the system, e.g., from the sensor points of the sensor domain 110. The database system is in most, but not all, embodiments located in the cloud and is implemented using high-scale cloud database technology. The analytics element 108 may be, and in some embodiments is, implemented as a cloud database system as part of the same cloud platform including the context engine 106 and the policy element 108.

The policy element or component 104, similar to the analytics element 108, includes a database system including a processor and a storage device. Stored in the policy element 108 database system are user defined policies, essentially the instructions that tailor the decision process of the context engine 106. The stored polices being instructions or rules used by the context engine 106 to make decisions based on data/information received from sensors in the system and generate enforcement instructions which are communicated to and enforced at one or more enforcement points in the system.

The sensor domain or sensor points domain 110 includes one or more sensor points, e.g., devices, in the network which collect data. The sensor points may be, and in some embodiments are, dedicated pieces of software such as a purpose built Session Initiation Protocol (SIP) proxy or Application Programming Interface (API) gateway, or the sensor points may be, and some are, embedded code within a larger platform or device such as for example a Session Border Controller (SBC). The sensor points of the sensor domain 110 offer and/or publish data towards the context domain 102 and the elements included in it.

The enforcement domain 112 includes one or more enforcement points EP 1 116, EP 2 118, . . . , EP 3 120 in the system network that alter the nature of the traffic in the system 100. The enforcement points include devices with existing enforcement functions such as, for example, firewalls, Session Border Controllers (SBCs), Software Defined Networking SDN switches (e.g., Open Flow switches), etc. These devices may already be deployed in an existing network and/or serve other functions in the network. Additionally, enforcement points may include dedicated devices and/or components inserted specifically as enforcement points to control the flow of traffic in the system 100.

In some embodiments, there are nodes, components or devices that are part of both the sensor domain 110 and the enforcement domain 112. These nodes, components and/or devices act as both an enforcement point and a sensor point. Region 114 of FIG. 1 illustrates components ES 1 130 and ES 2 132 which are nodes that perform as both an enforcement point and a sensor point.

Figure 2:
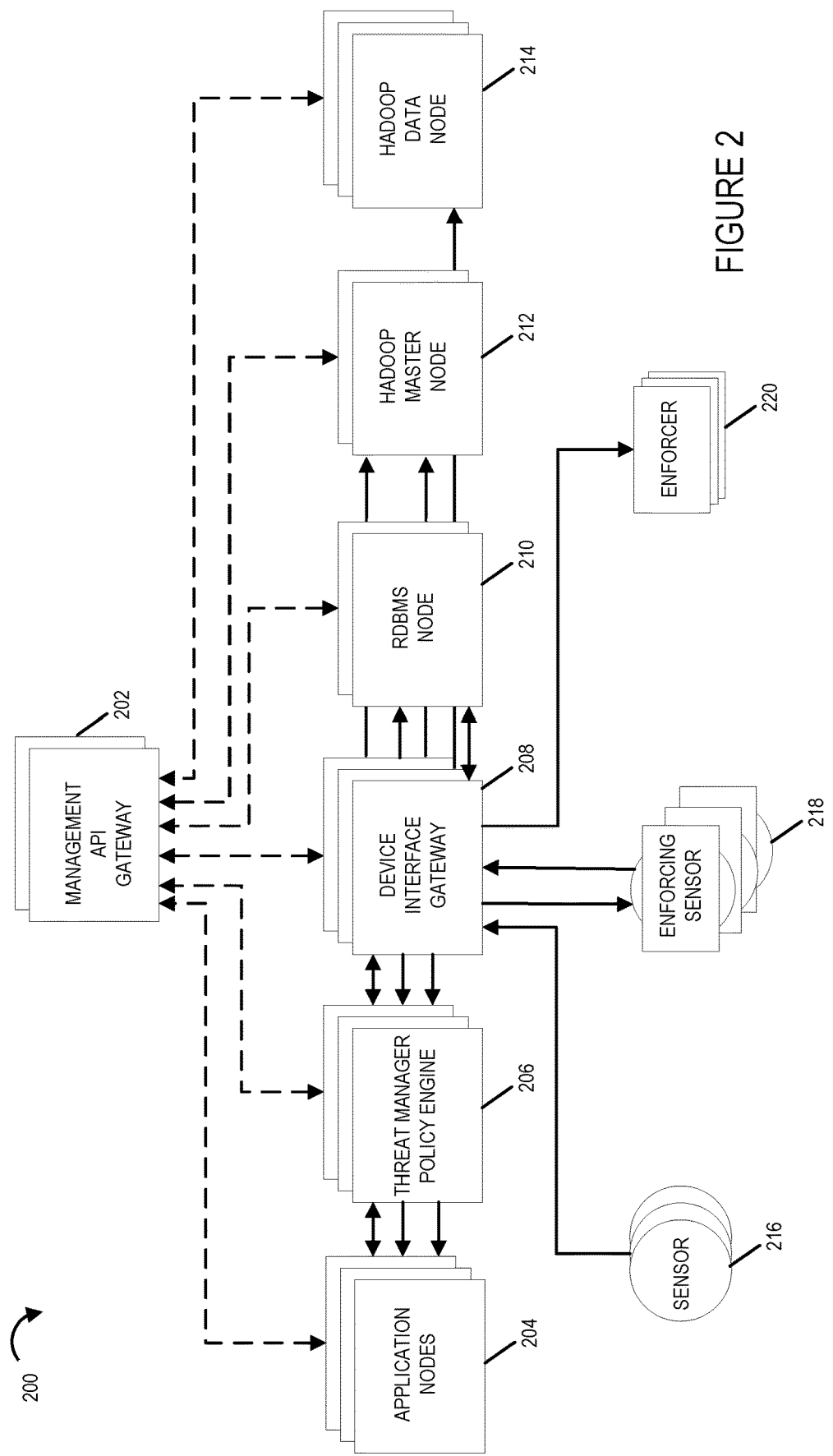
FIG. 2 illustrates details of the exemplary system illustrated in FIG. 1.

Diagram 200 of FIG. 2 illustrates internal or subcomponents of system 100. At the bottom of the system architecture are the sensors 216, enforcers 220 and equipment 218 that are both sensors and enforcers. The sensors 216 are deployed within the network and generate events of import. The enforcers 220 are network actors, e.g., devices that apply policy to control some behavior. Some equipment 218 within the network perform as both a sensor and an enforcement device. An example of such equipment includes a session border controller, e.g., SBC 404 of FIG. 4, which performs as a sensor to detect and report registration failures on a traffic flow and also performs as an enforcement device by applying an Access Control List (ACL) to block that flow.

The Device Interface Gateway (DIG) nodes 208 form the interface between the sensors 216 of the sensor domain 110 and enforcers 220 of the enforcement domain 112 in the network into the security platform. On the ingress side, the device interface gateway nodes 208 receive or collect the applicable data, parse the data, build Parquet files, and write into the Hadoop Distributed File System (HDFS) cluster and relevant streaming interfaces. On the egress side, the device interface gateways (DIGs) accept configuration and status requests from the Management API Gateway (MAG) 202, enforcement requests from the Policy Engine and transform them into the appropriate device-specific commands which are communicated towards the devices.

The Hadoop Master node 212 and Hadoop Data nodes 214 together form a Hadoop cluster. This includes all the facilities for HDFS cluster storage, Hadoop map-reduce job execution, and Spark batch and streaming support. In some embodiments, standard Hadoop functionality is used in the system, so it easily supports deployments where the Hadoop cluster is provided as-a-service by the operator.

The Postgres nodes 210 supply a traditional relational DBMS service. Some applications may do batch processing of the data in the Hadoop cluster but store the resulting data base to Postgres for certain query types. Additionally, system and application configuration will be saved in Postgres.

The Threat & Incident Manager (TIM) and the Policy Engine (PE) nodes 206 are system level components which manage and mitigate threats and incidents. The Threat & Incident Manager serves as the central coordinator for incidents and tracks the overall life-cycle of incidents. It receives incidents and indications from all applications and nodes in the system and initiates actions for the automated incident mitigations. For other incident types, it presents the incidents to the operator and accepts operator directives for actions on the incidents. The Policy Engine implements the policies, e.g., rules, of the system. This is based on directives and/or instructions from the Threat & Incident Manager coupled with the configuration and knowledge about enforcement points in the network. At a high level, the TIM deals in generic actions (such as, for example, BLOCK CALLING NUMBER) and the PE implements this on the specific network (e.g., add calling-number block to master centralized policy server such as for example PSX 402 illustrated in FIG. 4).

The Application nodes 204 implement a variety of applications for the system. These applications are incorporated and executed within the eco-system and rely on specialized services of the platform. These applications could run the gamut. Examples include applications for chart trending, for TDoS (Telephony Denial of Service) detection, for Key Performance Indicator (KPI) monitoring, Traffic Analyzer for historical analysis, and for Robocall detection and mitigation. It is to be understood that the list of applications is only exemplary and that various applications may be, and in some embodiments are, included as separate licensable components for optional activation in various deployments.

The Management API gateway (MAG) 202 is the management interface to the platform. This provides a northbound REST API (Representational State Transfer Application Programming Interface) for configuring and managing the platform. MAG 202 determines whether to handle received requests directly or whether to proxy to a particular node or node-type within the system. The MAG 202 also hosts the user interface (UI) for the system. The UI is in some embodiments implemented as a javascript application. Upon initial https connection to the MAG 202, the UI, e.g., UI javascript, is downloaded to the user's browser and executed.

Figure 3:
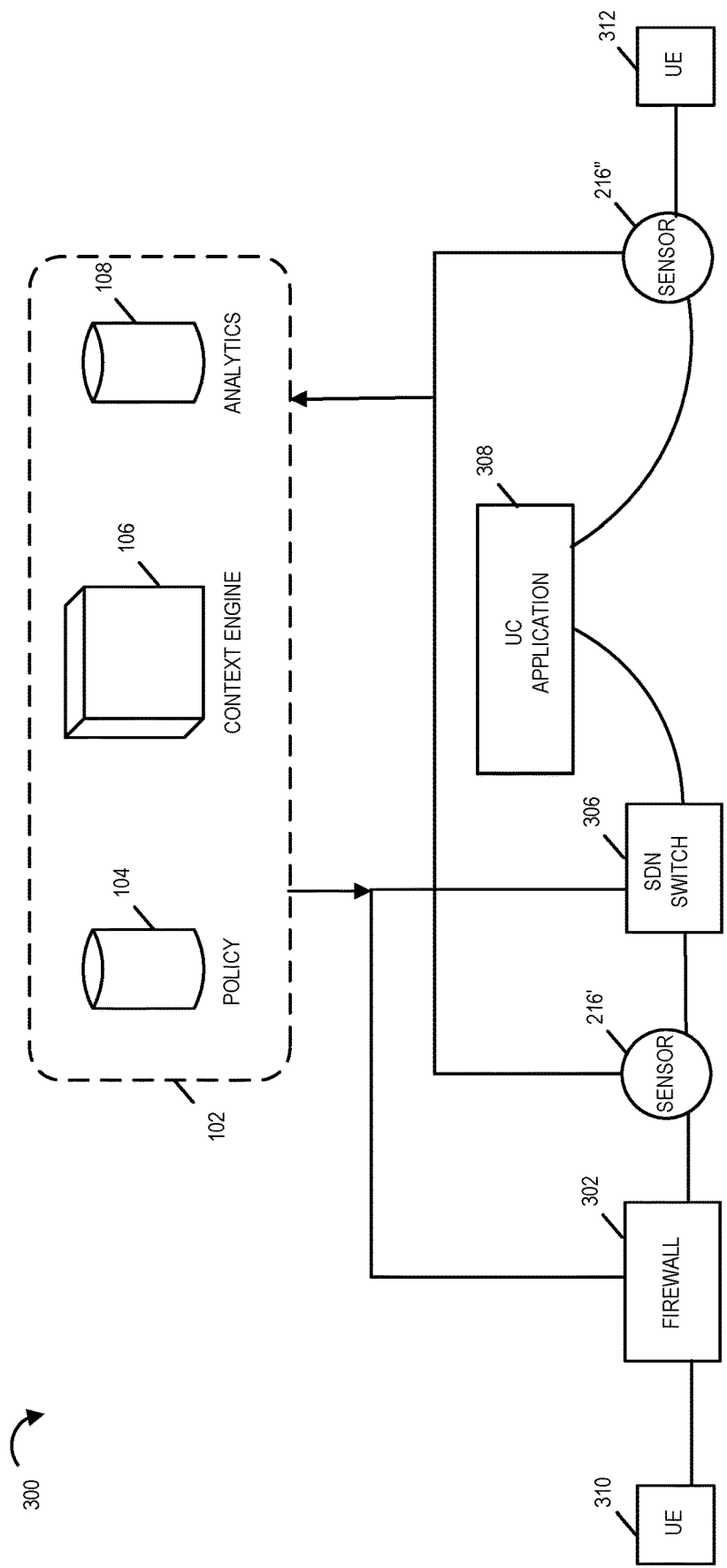
FIG. 3 illustrates an exemplary embodiment of the present invention in which a Unified Communications (UC) application use case is explained.

Diagram 300 of FIG. 3 illustrates an exemplary embodiment of the present invention in which a Unified Communications (UC) application use case is illustrated as applied to the above described system. In this example a user via a user equipment device 310 connects to a UC application 308 via a firewall 302 in an enterprise environment. The UC application 308 in turn connects to a UC user equipment device UE 312 within the enterprise itself. In order to understand the Session Initiation Protocol (SIP) flows, two sensors 216' and 216" have been included. Sensor 216' is located so as to sense information concerning UE 310 and sensor 216" is located so as to sense information concerning UE 312. The network is SDN based and the flow goes through an SDN switch 306. Although the network includes an SDN controller, for the sake of simplifying the diagram for clarity in explaining the invention, the SDN controller has not been shown. Both the firewall 302 and SDN switch 306 provide points of enforcement as each device is capable of performing one or more actions on the Internet Protocol (IP) flows passing through them, e.g., blocking the flow or limiting the flow.

As the UC flow starts, the context engine 106 becomes aware of the flow via information/data communicated to the context engine 106 from the sensors 216' and 216". The context engine 106 in response to the information/data received from sensor 216' and/or sensor 216" communicates instructions to the firewall 302 to adjust its security settings (e.g., to ensure Real-time Transport Protocol (RTP) packets can flow). Furthermore, the context engine 106 communicates instructions to the SDN switch 306 to provide a specific level of Quality of Service (QoS) for the UC flow, or to do more complex actions such as, for example, mirror or copy and forward the packets to another device for call analysis, tracing, lawful intercept, etc. Once the UC session is complete, the Context Engine 106 learns this from data/information communicated to it from sensor 216' and/or sensor 216". In response to learning of the completion of the UC session, the context engine 106 generates and communicates instructions to change/adjust the behavior of the firewall 302 and/or SDN switch 306, for example, to adjust the rules implemented at the firewall 302 and SDN switch 306 such as, for example, shutting down the UC flows, closing pin holes, etc.

Figure 4:
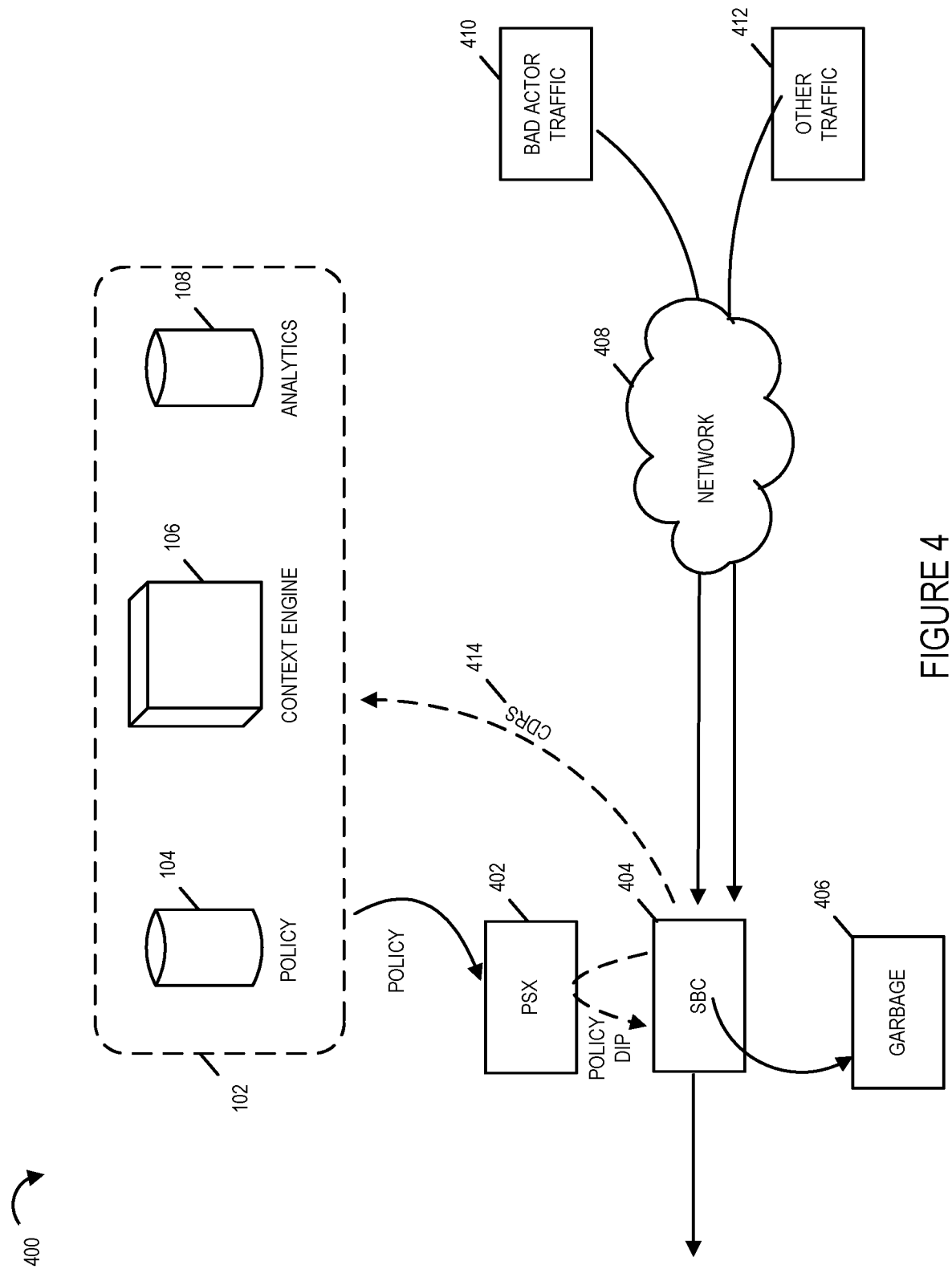
FIG. 4 illustrates another exemplary embodiment of the present invention in which a different Unified Communications (UC) application use case is explained.

Diagram 400 of FIG. 4 illustrates another use case. In the use case illustrated in diagram 400 the traffic stream potentially includes some bad actor traffic 410 that is received via network 408 at SBC 404 along with other traffic 412.

The type of bad actor traffic 410 includes cases such as for example robocalling traffic, exfiltration attempts traffic, Wangiri type fraud traffic, etc. Initially, the bad actor traffic 410 is processed normally by the SBC 404 since it is not known to be bad. The Call Detail Records (CDRs) 414 from the SBC 404 are sent as a matter of course to the Context Engine 106 where the CDRs 414 are processed resulting in the bad actor traffic 410 being detected through ongoing CDR 414 analysis. The Context Engine 106, based on the analytics and policy, then installs via the centralized policy server (PSX) 402 an updated call routing policy for the call processing elements, e.g., SBC 104. From that point on, the bad actor traffic 410 is immediately directed to garbage container 406 instead of being allowed into the network while the other traffic 412 is allowed into the network.

The elements, components, nodes, data systems illustrated in FIGS. 1, 2, 3, and 4 are coupled together via communications links, e.g., bi-directional communications links. While various communications links are illustrated, other network configurations are possible and for the sake of simplicity not all of the communications links or network connections connecting the various nodes/devices have been shown.

Various kinds of monitoring and threat detection may be encompassed in different types on applications running within the contextual plane. As an example, a robo-caller application would monitor for call sources which have the characteristics of robo-calls (for example, very low Answer Seizure Rate (ASR), i.e., the ratio of successfully connected calls to attempted calls, high percentage of short calls, etc.) A traffic anomaly detector could identify bad traffic by building user profiles and then flagging traffic which falls outside the profile.

Another advantage of the present invention is that sensors and sensor enforcer nodes can non-intrusively monitor, collect and provide information (e.g., call record reports (CDRs) on the Unified Communications traffic to the node(s) executing threat detection and mitigation application(s). The threat detection and mitigation applications can perform their detection and selection of mitigation actions to be taken independently from the call processing activities of the call processing devices (e.g., call processing nodes such as SBCs, PBXes, and SDN switches) performed during the receipt of incoming calls, the threat detection and mitigation applications processing of data sets (e.g., call records, application level data, etc.) being off-line processing occurring for example on a periodic basis, the call processing of calls by enforcer nodes being unaffected by the off-line processing of the data sets for the detection of threats. Upon the detection of a threat, a policy update to mitigate the detected threat can then be communicated to the enforcement nodes such as the call processing nodes to enforce the mitigation policy. The use of off-line processing independent of the call processing by the enforcement nodes provides efficiency of the overall system throughput in that the call processing of the system is not affected by the threat detection and mitigation application processing which is independent of the call processing for calls of the system.

In some embodiments, one or more of the elements, nodes or components of the above mentioned systems are implemented within one or more virtual machines. The one or more virtual machines may be, and typically are, implemented on one or more compute nodes in the cloud, a compute node including a processor providing storage, networking, memory, and processing resources, e.g. one or more processors that can be consumed by virtual machine instances. In some embodiments, multiple nodes are implemented within a single virtual machine. In some embodiments, the virtual machine itself holds a container environment, with multiple containers spawned within the virtual machine to each implement a node function. In one mode of operation, the containers to be instantiated are determined at virtual machine instantiation and then stay static throughout the life of the virtual machine. In a second mode of operation, the containers instantiated within the virtual machines are completely dynamic. The virtual machine starts with some set such as for example an empty set of containers and then new containers are added and existing containers removed dynamically.

Figure 5:
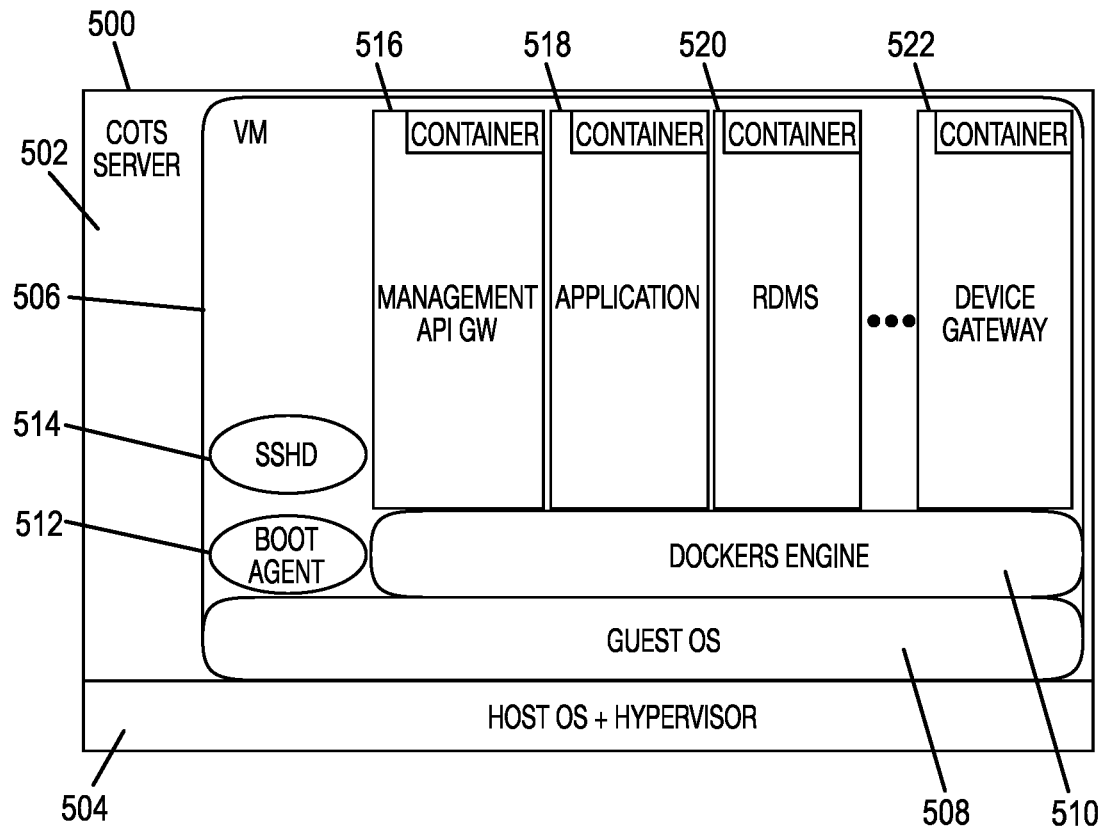
FIG. 5 illustrates an exemplary system in accordance with an embodiment of the present invention.

FIG. 5 illustrates an exemplary system 500 in accordance with an embodiment of the present invention. The exemplary system 500 includes commercial off the shelf server hardware 502 with host operating system and hypervisor software 504 that is used to virtualize the hardware resources, and a virtual machine 506. The hypervisor is software that is run on the host operating system and provides various virtualization services, such as for example I/O device support and memory management. The virtual machine 506 includes a guest operating system 508, a Dockers Engine 510, a boot agent 512, an OpenSSH server process (sshd) 514, and a plurality of exemplary containers the plurality of exemplary containers including a Management API Gateway node container 516, an Application node container 518, RDMS node container 520, . . . , a Device Gateway node container 522.

The guest operating system (guest OS) 508 is the software installed on the virtual machine (VM) and is different than the host operating system. The dockers engine software 510 creates a server-side daemon process that hosts images, containers, networks and storage volumes. The dockers engine also provides a client-side command-line interface (CLI) that enables users to interact with the daemon through a Docker Engine API. The boot agent is software instructions that are executed during the boot up process. The sshd 514 is an OpenSSH server process that listens to incoming connections using the Secure Socket Shell (SSH) protocol and acts as the server for the protocol. It handles user authentication, encryption, terminal connections, file transfers, and tunneling.

In some system embodiments, containers are not used as shown in FIG. 5. In such systems, there is no Dockers Engine 510 and each node shown in FIG. 5 is instead implemented directly within a virtual machine. For example, the Management API Gateway node 516, an Application node 518, RDMS node 520, . . . , a Device Gateway node 522 are implemented on separate virtual machines with each node being mapped to a different virtual machine. In this way each node is implemented on a separate virtual machine.

Figure 6:
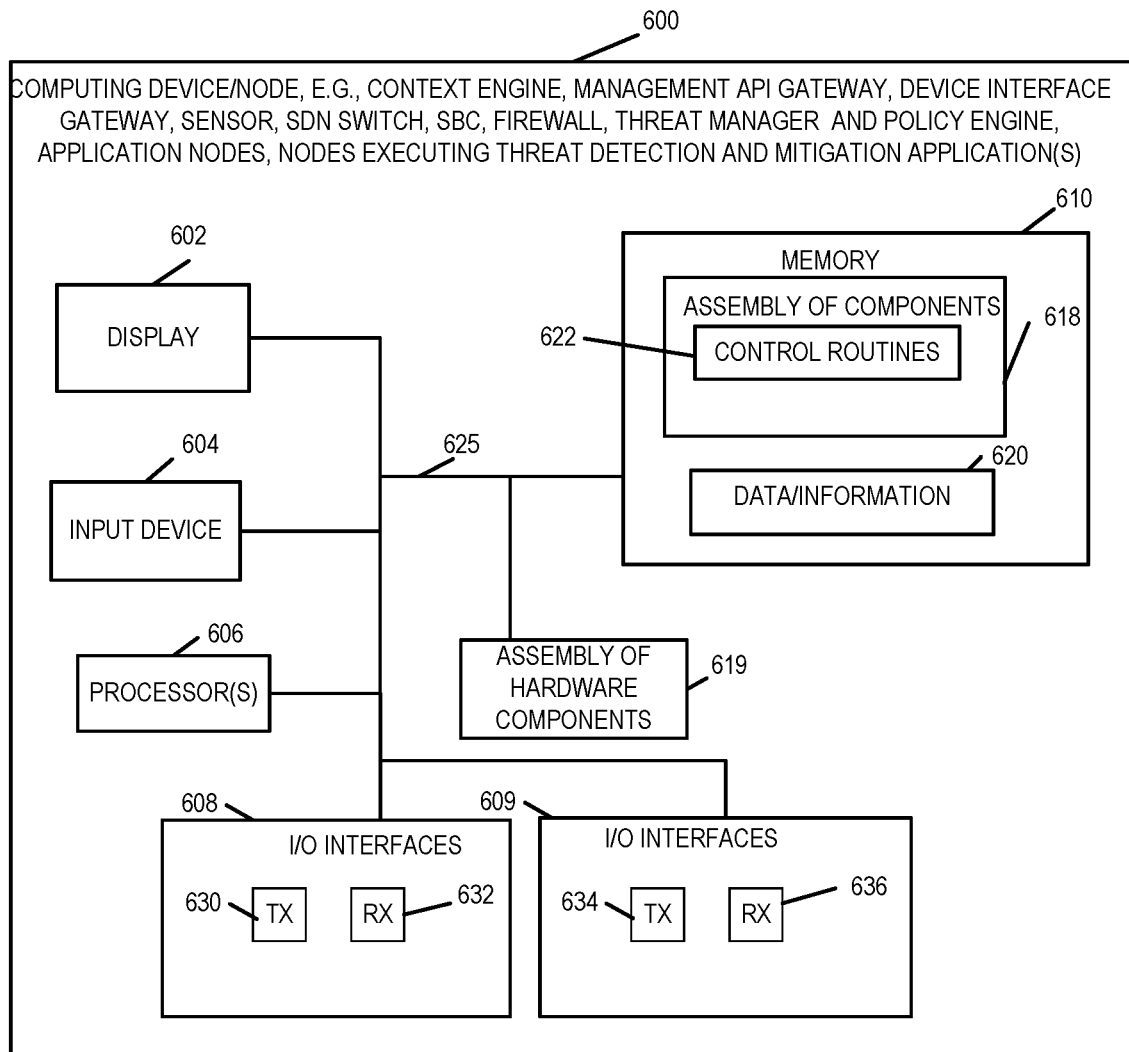
FIG. 6 illustrates an exemplary computing device/node in accordance with an embodiment of the present invention.

In some embodiments, one or more of the elements, nodes or components of the above mentioned systems are implemented in accordance with the exemplary computing device/node 600 illustrated in FIG. 6.

Exemplary computing device/node 600 includes an optional display 602, an input device 604, a processor 606, e.g., a CPU, I/O interfaces 608 and 609, which couple the computing device/node 600 to networks or communications links and/or various other nodes/devices, memory 610, and an assembly of hardware components 619, e.g., circuits corresponding to different components and/or modules, coupled together via a bus 625 over which the various elements may interchange data and information. Memory 610 includes an assembly of components 618, e.g., an assembly of software components, and data/information 620. The assembly of software components 618 includes a control routines component 622 which includes software instructions which when processed and executed by processor 606 control the operation of the computing device/node 600 to perform various functions and/or one or more steps of the various method embodiments of the invention. The I/O interface 608 includes transmitters 630 and receivers 632. The I/O interface 609 includes transmitters 634 and receivers 636. The I/O interfaces are hardware interfaces including hardware circuitry. The computing device/node 600 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Internet Protocol (IP), Transport Control Protocol (TCP), User Datagram Protocol (UDP), Representative State Transfer (REST) protocol, SQL (Structured Query Language) Protocol, and HDFS (Hadoop Distributed File System) Protocol, SQL and/or HDFS being used to interface and access information from the various databases and/or storage devices to which it may be coupled. In some embodiments, the computing device/node 600 includes a communication component configured to operate using IP, TCP, UDP, REST, SQL (Structured Query Language), or HDFS (Hadoop Distributed File System). In some embodiments, the communications component is a hardware component, a software component or a component including hardware and software components. While only a single hardware processor is illustrated in some embodiments, it is to be understood that the computing device/node 600 can include more than one processor with the processing being distributed among the plurality of processors. In some embodiments, one or more of the following are implemented in accordance with the computing device/node 600 illustrated in FIG. 6: context engine element 106, management API gateways 202, application nodes 204, threat manager and policy engine nodes 206, device interface gateways 208, session border controller (SBC) 404, centralized policy and exchange server (PSX) 402, SDN switch 306, firewall 302, enforcer devices 220, sensors 216, sensor 216', sensor 216", enforcing sensors 218, and user equipment devices 310 and 312.

Figure 7:
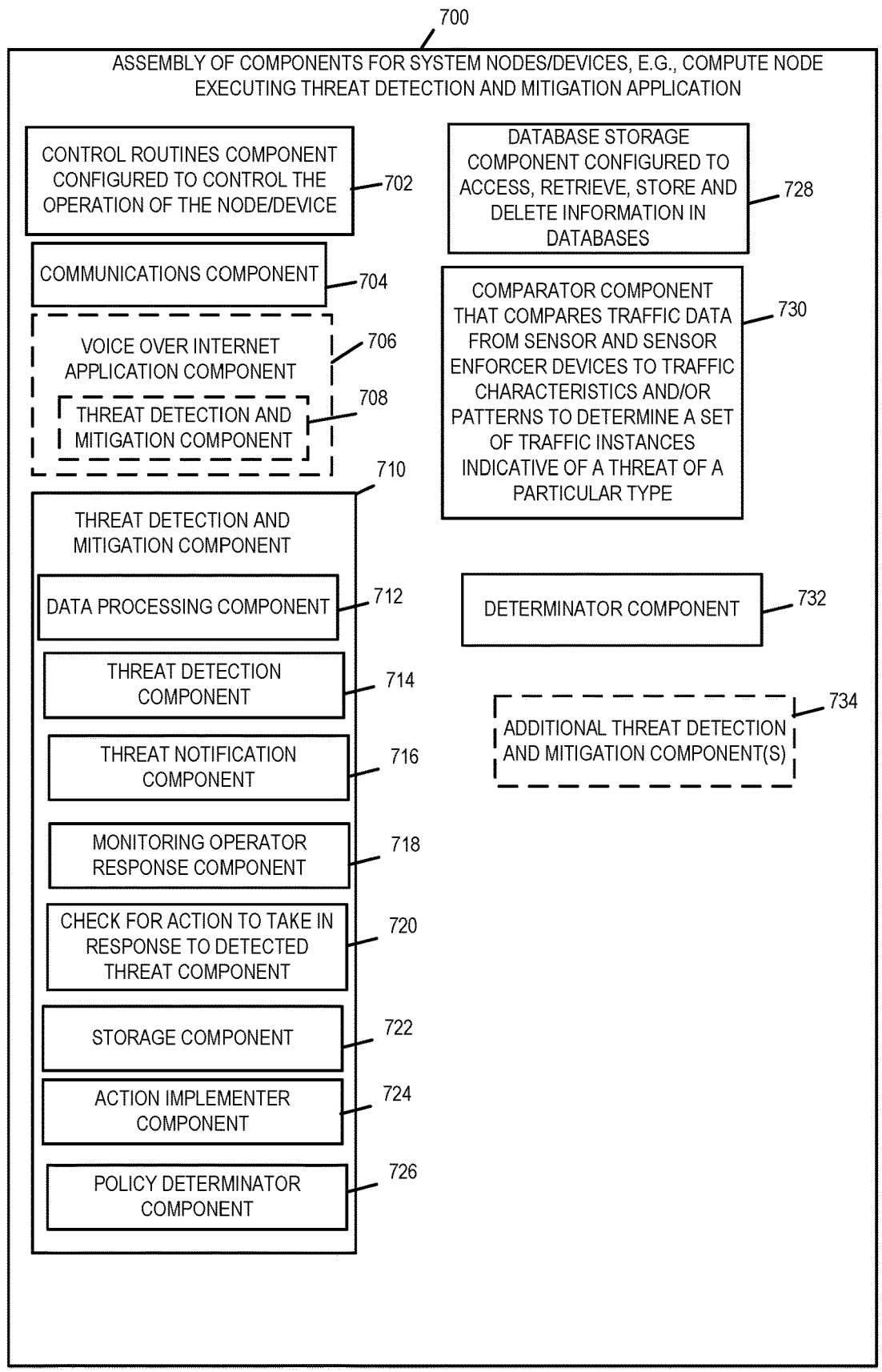
FIG. 7 illustrates an assembly of components for use in an exemplary computing device/node in accordance with an embodiment of the present invention.

An exemplary assembly of components 700 for a computing node 600 implemented as a node or device, e.g., a node executing an application for threat detection and mitigation in accordance with an embodiment of the present invention is illustrated in FIG. 7. One or more of the assembly of components 700 may be implemented as hardware components in the assembly of hardware components 619 or as software components in the assembly of software components 618 stored in memory 610 of the exemplary computing node/device 600. The assembly of components 700 will be discussed in further detail below.

Figure 8:
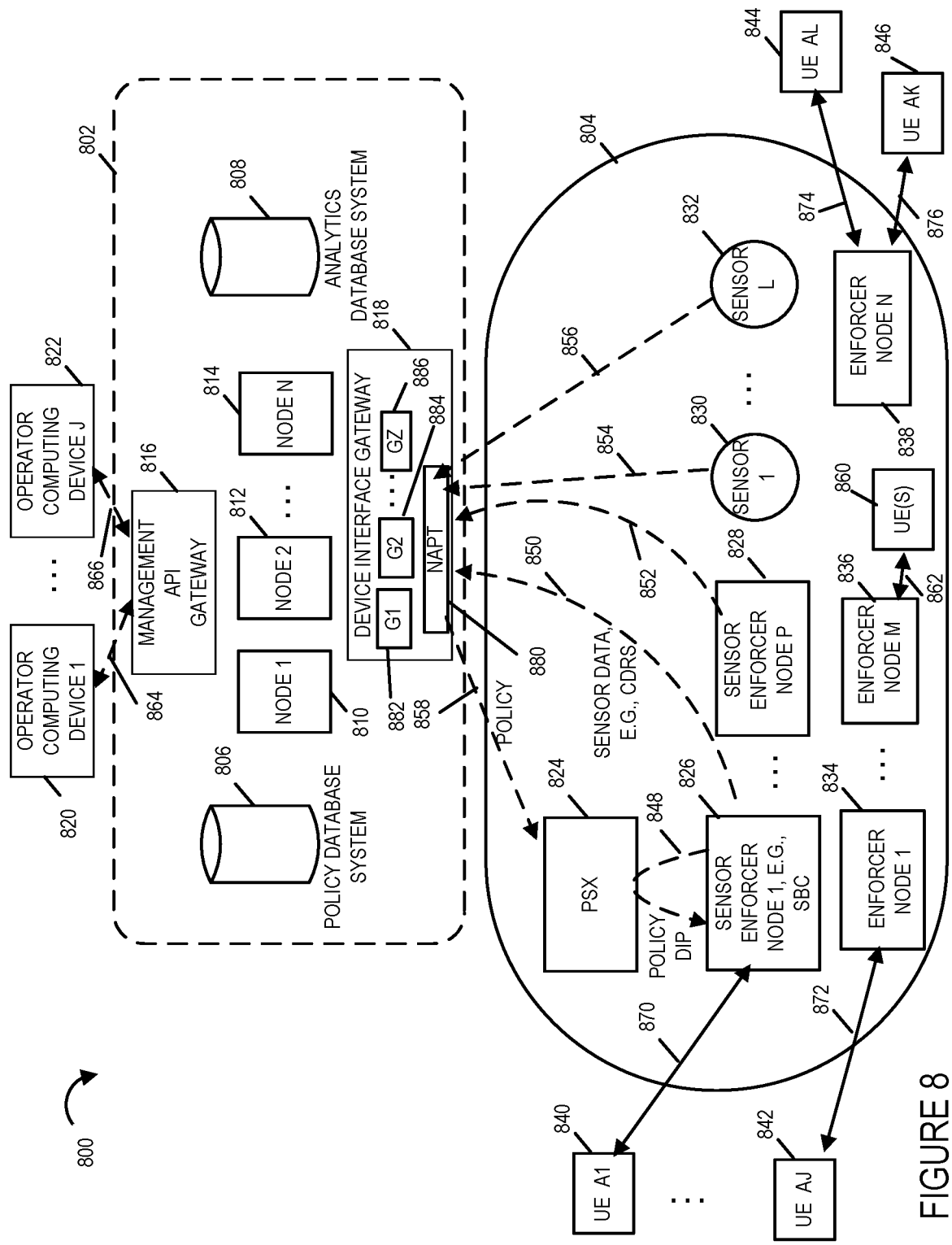
FIG. 8 illustrates another exemplary communications system in accordance with an embodiment of the present invention.

Communications system 800 of FIG. 8 illustrates another exemplary system embodiment of the present invention. Communications system 800 is a Unified Communications system that integrates multiple forms of real-time communications technologies including voice, video, collaboration, presence information and text messaging. Communications system 800 includes a threat detection and mitigation protection sub-system 802 to which a plurality of operator computing devices 1 820, . . . , J 822 are coupled and a communications network 804 to which a plurality of user equipment devices is coupled. The user equipment devices coupled to the communications network 804 include UE A1 840, . . . , UE AJ 842, UE AL 844, UE AK 846 where J, K, L are positive integers greater than 1 such as for example 10, 11, 12. The user equipment devices are communications devices, e.g., mobile devices, cell phones, smartphones, computers, laptops, tablets, landline phones, IMS mobile phones, and PBX phones. The threat detection and mitigation protection sub-system 802 includes the following elements which are connected via communications links so that they can exchange information: a device interface gateway 818, a management Application Programming Interface (API) gateway, a plurality of nodes 1 810, node 2 812, . . . , node N 814 where N is positive integer greater than one, a policy database system 806, and an analytics database system 808. In some embodiments, the node 1 810, node 2 812, . . . , node N 814 each include one or more processors which execute code stored in memory that control the operation of the node, the memory being included in the node or coupled to the node. One, some or all of the nodes 1 810, 2 812, . . . , N 814 execute one or more threat detection and mitigation applications, e.g., a robocall detection and mitigation application, a fraud detection and mitigation application, an International Revenue Share Fraud (IRSF) threat detection and mitigation application, a Premium-rate Revenue Share Fraud (PRSF) threat detection and mitigation application, a service theft detection and mitigation application, a denial of service threat detection and mitigation application, a Wangiri type fraud threat detection and mitigation application, and an exfiltration attempted threat and mitigation application. The policy database system 806 is a storage device which includes policies and/or rules that define actions to be taken in response to detected threats.

The analytics database system is a storage device in which data and information, e.g., call data records also referred to as call detail records, traffic information, user information, application level metrics, data link layer data and physical layer data regarding the traffic in network 804 is stored after being received/provided by sensors and sensor enforcer devices in the network 804. In some embodiments, also stored in the analytics database system 808 are traffic characteristics and/or patterns and/or models used to identify/detect traffic instances and/or threats.

The policy database system 806 and analytics database system 808 in some embodiments are a single database system that includes the data and information included in the policy database system and the analytics database system. In some embodiments the policy and/or analytics database systems are implemented as a Hadoop Distributed File System (HDFS) or cluster.

The management API gateway is a gateway device/node through which the threat detection system 802 communicates with system operator communications/computing devices 1 820, . . . , J 822, where J is a positive integer greater than 1. Communications include for example notifications from the threat detection and mitigation sub-system 802 of detected threats and operator input indicating actions to be taken in response to detected threats. While the operator computing devices 1 820, . . . , J 822 are shown as being outside of the communications network 804, in most embodiments at least some of the operator computing devices are part of the network 804 and/or receive communications over the network 804. In most embodiments, at least some of the operator computing devices 1 820, . . . , J 822 are directly connected to the management API gateway so that congestion and other attacks on the network 804 will not compromise the communications links between these operator computing devices and threat detection and mitigation protection sub-system 802. Communications links 864, . . . , 866 connect operator computing device 1 820, . . . , operator computing device J 822 respectively to the management API gateway 816 of the threat detection and mitigation protect sub-system 802. Exemplary operator computing devices include a computer, a dumb terminal, a mobile device, a smartphone, a laptop, or a tablet of the operator. In some embodiments, at least one of the operator computing devices 820, . . . , 822 is a security information event management (SIEM) system or a device executing a SIEM application where the SIEM system or application is being used in conjunction with the threat detection and mitigation sub-system to manage the security of the communication systems 800.

The device interface gateway 818 couples the nodes and database systems of the threat detection and mitigation sub-system 802 to the devices, nodes and equipment of the network 804. The device interface gateway operates to translate between communications protocols and application programming interfaces of devices, nodes and equipment of the network 804 and the sub-system 802 to exchange data, information, policies, instructions and commands. In the present example, the device interface gateway 818 includes a Network Address and Port Translation (NAPT) 880 sub-component and a plurality of device interface gateway components or instances G1 882, G2 884, . . . , GZ 886 where Z is position number greater than 2. The NAPT 880 allows for a single entry point for communications into the threat detection and mitigation sub-system 802. The NAPT 880 de-multiplexes the received communications/data from the different devices directing it to the correct Device Interface Gateway component or instance (G1 882, G2 884, . . . , GZ 886) based on the device type from which the communication/data was received. Each device type specific component or instance G1 882, G2 884, . . . , GZ 886 performs a gateway function for communications exchanged between devices of the specific type for which the component or instance is configured and the threat detection and mitigation sub-system elements (e.g., nodes, database systems, management interface gateway). In the exemplary system 800 each Device Interface Gateway component or instance G1 882, G2 884, . . . , GZ 886 has a separate IP address and is dedicated to performing gateway functions for a single specific device type. In some other embodiments, a device interface gateway component or instance, e.g., G1 882, performs gateway functions for a plurality of device types. It should also be understood that authentication (and authorization) of devices and/or communications/data received from devices external to the threat detection and mitigation sub-system 802 is also performed by the Device Interface Gateway 818 and in particular by the individual device interface gateway components or instances of the Device Interface Gateway 818. In performing the authentication (and authorization) of the exchange of communications/data with devices external to the sub-system 802 (e.g., sensor, sensor enforcer nodes, enforcement nodes, centralized policy server, etc.), the Device Interface Gateway 818 forms a trust boundary that secures and protects the sub-system 802. For data and information pulled from the sensors, sensor enforcer nodes and enforcer nodes, the authentication/authorization is implied by the operator having configured that each sensor, sensor enforcer nodes and enforcer node or device in the system to which the sub-system 802 will connect and the device interface gateway components or instances connect to the sensor, sensor enforcer node or enforcer node or device rather than the reverse. For data/information pulled or retrieved from sensors, sensor enforcer or enforcer nodes or devices, the authentication/authorization of the sensor, sensor enforcer, or enforcer node or device will be performed by the Device Interface Gateway 818 and in particular the device interface gateway component or instance to which the node or device connects. In some embodiments, the authentication/authorization is achieved through the use of a certificate provided by a client application when node or device connects to the Device Interface Gateway component or instance using Transport Layer Security (TLS) protocol.

The device interface gateway node 818 and in particular each of the device interface gateway components or instances G1 882, G2 884, . . . , GZ 886 receives or collects the applicable data from the sensor and sensor enforcer nodes and, in some embodiments, parses the data, builds Parquet files, and writes the data into the analytics database system.

The device interface gateway (DIG) 818 also accepts configuration and status requests from the Management API Gateway (MAG) 816 which originate with the operator's computing devices.

Furthermore, the device interface gateway 818 (e.g., the device interface gateway components or instances included therein) receives enforcement requests/commands/instructions/policy updates from nodes 1 810, 2 812, . . . , node N 814, e.g., from the threat detection and mitigation applications being executed thereon and transforms these enforcement requests, commands, instructions, and policy updates into the appropriate device-specific commands which are then communicated towards the devices, e.g., Policy Server 824, enforcer nodes 1 834, . . . , enforcer node M 836, and sensor enforcer node 1 826, . . . , sensor enforcer node P 828.

While in this embodiment, the Device Interface Gateway 818 includes a NAPT device 880 in some embodiments, the NAPT device is external to Device Interface Gateway 818 and is positioned as an interface between the sub-system 802 and network 804 so that communications with the devices/nodes of the network 804 pass through the NAPT to the device interface gateway 818.

In some embodiments, instead of device interface gateway 818 with device interface gateway components G1 882, G2 884, ..., GZ 886, each of device interface gateway components G1 882, G2 884, ..., GZ 886 is a separate device interface gateway or instance.

In an exemplary cloud deployed system which uses a plurality of separate device interface gateways or gateway instances, a Cloud Internet Gateway (IGw) performs the NA(P)T function of NAPT 880. Each device interface gateway instance has a public Internet Protocol (IP) address and a private IP address and all packets go through the IGw. At least some of the device interface gateways or gateways instances G1 882, G2 884, ..., GZ 886 pull or extract data from sensor(s) and/or sensor enforcer node(s) or device(s) using the assigned public Internet Protocol (IP) address. The device interface gateways support a number of different protocols for receiving data and/or communicating instructions, commands, and/or policies. In many embodiments, a group of device interface gateway instances support a first device type and a load balancer is used to distribute communications received from different devices of the first device type to the group of device interface gateway instances supporting the first device type for processing.

The network 804 includes sensors, enforcement nodes, sensor enforcer nodes, a policy server(s) and communications links which allow for the flow of traffic through the network and the exchange of information, data, policies, rules, commands, and instructions between the sensors, enforcement nodes, sensor enforcer nodes of the network 804 as well as with the nodes, devices, database systems and device interface gateway of the threat detection and mitigation protect sub-system 802.

The sensors include sensor 1 830, ..., sensor L 832 where L is a positive integer greater than 1. The sensors collect data, e.g., information on the traffic in the network such as, for example, call processing time information, link congestion, user/device information, bandwidth usage, etc. in the network. The sensors may be, and in some embodiments are, dedicated pieces of software such as a purpose built Session Initiation Protocol (SIP) proxy or Application Programming Interface (API) gateway, or the sensors may be, and some are, embedded code within a larger platform or device such as for example a Session Border Controller (SBC). The sensors may be, and in some embodiments are, nodes or devices distributed throughout the network. The sensors offer and/or publish data towards the threat detection and mitigation protect sub-system 802 and the elements included in it.

The enforcement nodes include enforcer node 1 834, ..., enforcer node M 836. The enforcement nodes or devices alter the nature of the traffic in the system 800. Exemplary enforcement nodes include firewalls, Session Border Controllers (SBCs), Software Defined Networking SDN switches (e.g., Open Flow switches), etc. and dedicated devices and/or components inserted specifically into the network to control the flow of traffic in the system 800.

The sensor enforcer nodes include sensor enforcer node 1 826, ..., sensor enforcer node P 828, where P is an integer greater than one. These nodes act as both an enforcement point and a sensor point. Exemplary sensor enforcer nodes include firewall devices, Session Border Controllers, Private Branch Exchanges (PBXes), application servers, configurable switches and equipment executing endpoint security applications.

User equipment devices UE A1 840, ..., UE AJ 842, UE AL 844, UE AK 846 are coupled to the network 804 via communications links 870, ..., 872, 874, 876 respectively. UE A1 840 is coupled to sensor enforcer 826 via communication link 870. UE AJ 842 is coupled to enforcer node 1 834 via communications link 872. UE AL 844 is coupled to enforcer node N 838 via communications link 874. UE AK 846 is coupled to enforcer node N 838 via communications link 876. The sensor enforcer node 826 and enforcer node 1 834 and enforcer node N 838 are located at the edge of the network 804 and act to control and protect the traffic flow into and out of the network. One or more equipment devices UE(s) 860 are coupled to enforcer node M 836 via communications link 862. The UE(s) 860 are located within the network 804 and are for example User Equipment devices of an enterprise network connected to with the enforcer node M for example being an enterprise or PBX system.

The network 804 also includes a policy server/device 824. The policy server receives policies/rules and policy updates from the threat detection and mitigation sub-system 802 and in particular from nodes executing threat detection and mitigation applications and distributes the policy/rules to the enforcement nodes and sensor enforcer nodes for enforcement by those nodes. While only a single policy server 824 has been shown a plurality of policy servers may be, and in some embodiments are, used. For example, in some embodiments a centralized policy server is used to distribute policies to a plurality of local policy servers that in turn distribute the policies to a sub-set of the enforcement and/or sensor enforcement nodes in the network. Communications link 858 connects the device interface gateway 818 of the threat detection and mitigation sub-system 802 to the PSX policy server 824 and shows policy being send from the sub-system 802 to the policy server 824. Communications link 848 is shown as connecting the sensor enforcer node 1 826 to the policy server 824 and the operation of the sensor enforcer node 1 performing a dip into the policy server to retrieve policies from the policy server that the sensor enforcer node 1 826 is to enforce, e.g., the policy shown as being sent down on communications link 858. The policy server 824 includes a processor and a storage device in which the policies or rules for enforcement are stored. The storage device may be for example memory or a database system.

Communications links 850, 852, 854, and 856 couple sensor enforcer node 1 826, ..., sensor enforcer node 828, sensor 1 830, ..., sensor L 832 to device interface gateway 818 of the threat detection and mitigation sub-system 802 respectively. These communications links are used to communicate, send or transmit data from the sensor enforcer nodes and sensors to the threat detection and mitigation protect sub-system 802 for analysis of threats and effect actions taken to mitigate detected threats. As shown on communications link 850 the sensor data can include call data reports (CDRs). While communications links 850, 852, 854, 856, and 858 only show one way arrows, the communications links are bi-directional and information can be exchanged in both directions.

Node 1 810, node 2 812, ..., node 3 814 when executing one or more applications for threat detection and mitigation will process sets of traffic data including one or more pieces of data from one or more sensor or sensor enforcer devices, and detect based on the sets of traffic data sets of traffic instances that are identified as being threats to the operation of the communications system 800, e.g., threatening, for example, the operational performance and/or quality of service that can be provided to users of the communications system 800 as well as theft or fraud being attempted or perpetrated using the communication system 800.

Upon detection of one or more threats, the system allows for a combination of automated and operator controlled responses to the detected threat(s). While an operator is provided an opportunity to provide input on how to respond to a threat, after one or more threats of a given type are identified, the system will automatically take corrective action without waiting for operator input and/or in the absence of operator input following notification of a threat. When an operator does provide input on an action to take in response to a particular type of threat, the information is stored and used to implement corrective action the next time a threat of the same type is detected without waiting for operator input. Should the operator provide input on a detected threat and corrective action has already been taken, policy and/or actions will be updated to ensure that the operator suggested action is implemented with regard to an ongoing or new threat of the same type.

As previously discussed, the monitoring of the traffic of the system is performed offline from the call processing in near real time with only a slight delay. The monitoring occurs in a closed loop wherein the effect of mitigation operations to address detected threats which can include traffic anomalies can be monitored and reported to an operator and additional mitigation operations can be performed until the monitoring indicates that the detected traffic threat has been addressed. More detailed aspects of various exemplary methods in accordance with the present invention will now be discussed in connection with an exemplary method 1000 illustrated in FIG. 10.

Figures 10, 10A:
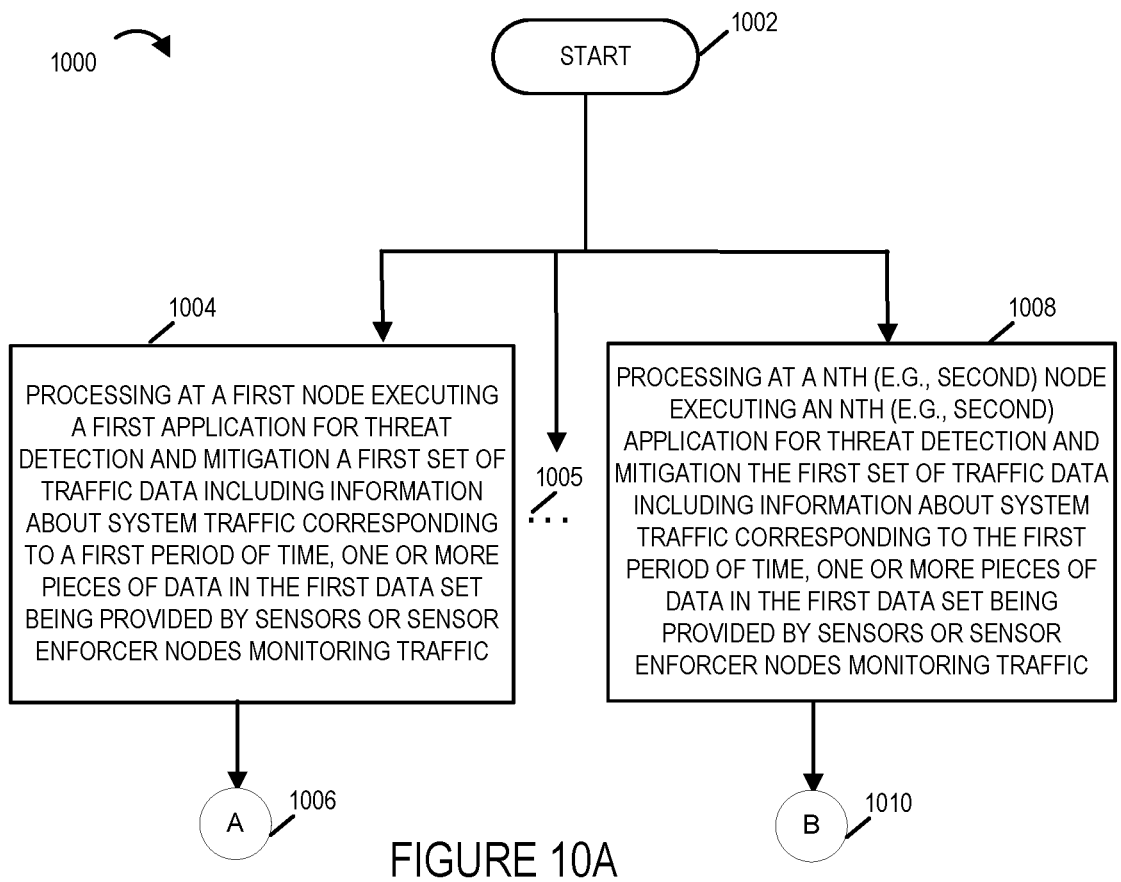
FIG. 10 comprises FIGS. 10A, 10B, 10C, 10D, 10E, 10F, 10G, 10H, 10I, 10J and 10K.
FIG. 10A illustrates the first part of a flowchart of an exemplary communications method in accordance with an embodiment of the present invention.
Figure 10B:
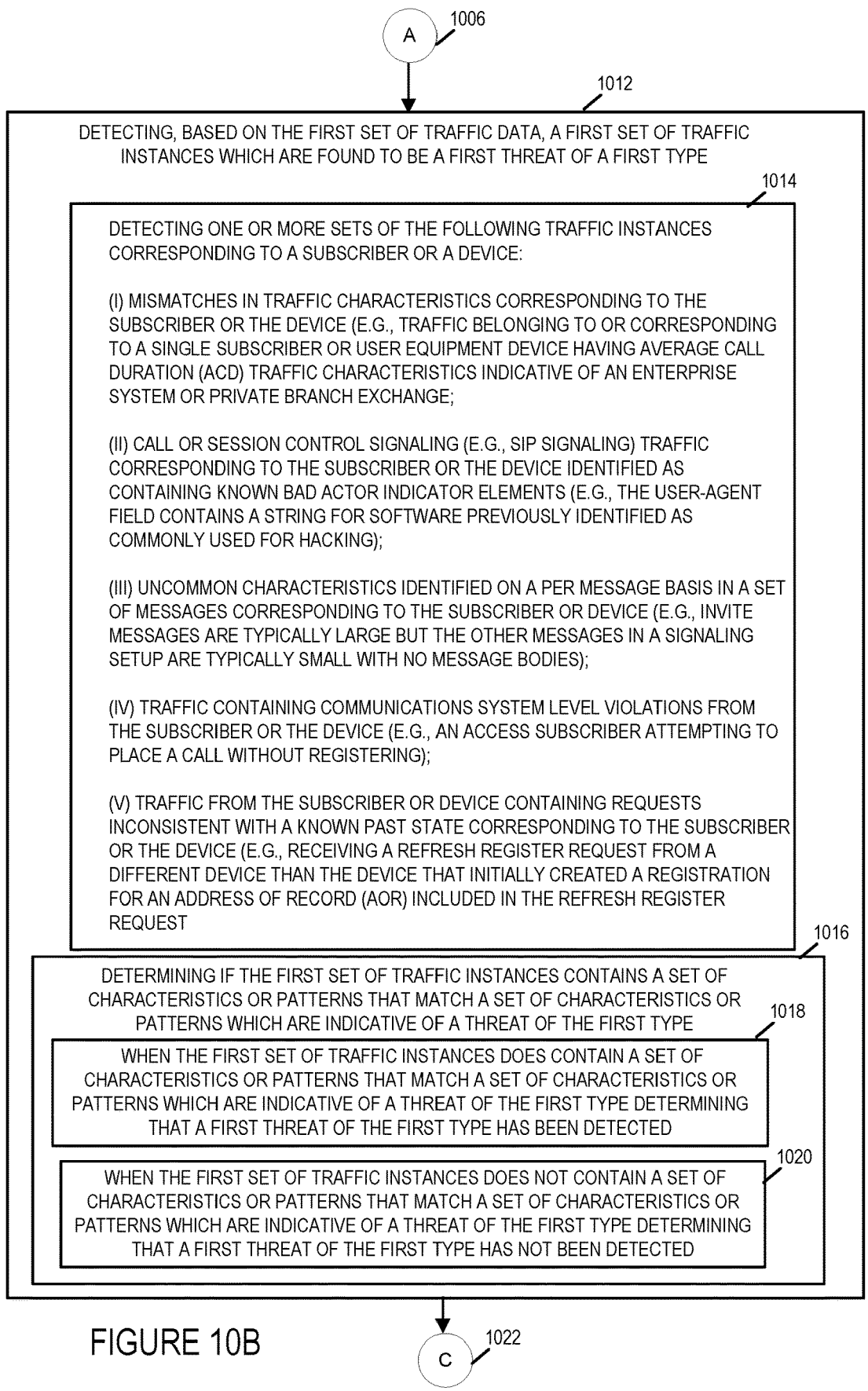
FIG. 10B illustrates the second part of a flowchart of an exemplary communications method in accordance with an embodiment of the present invention.
Figure 10C:
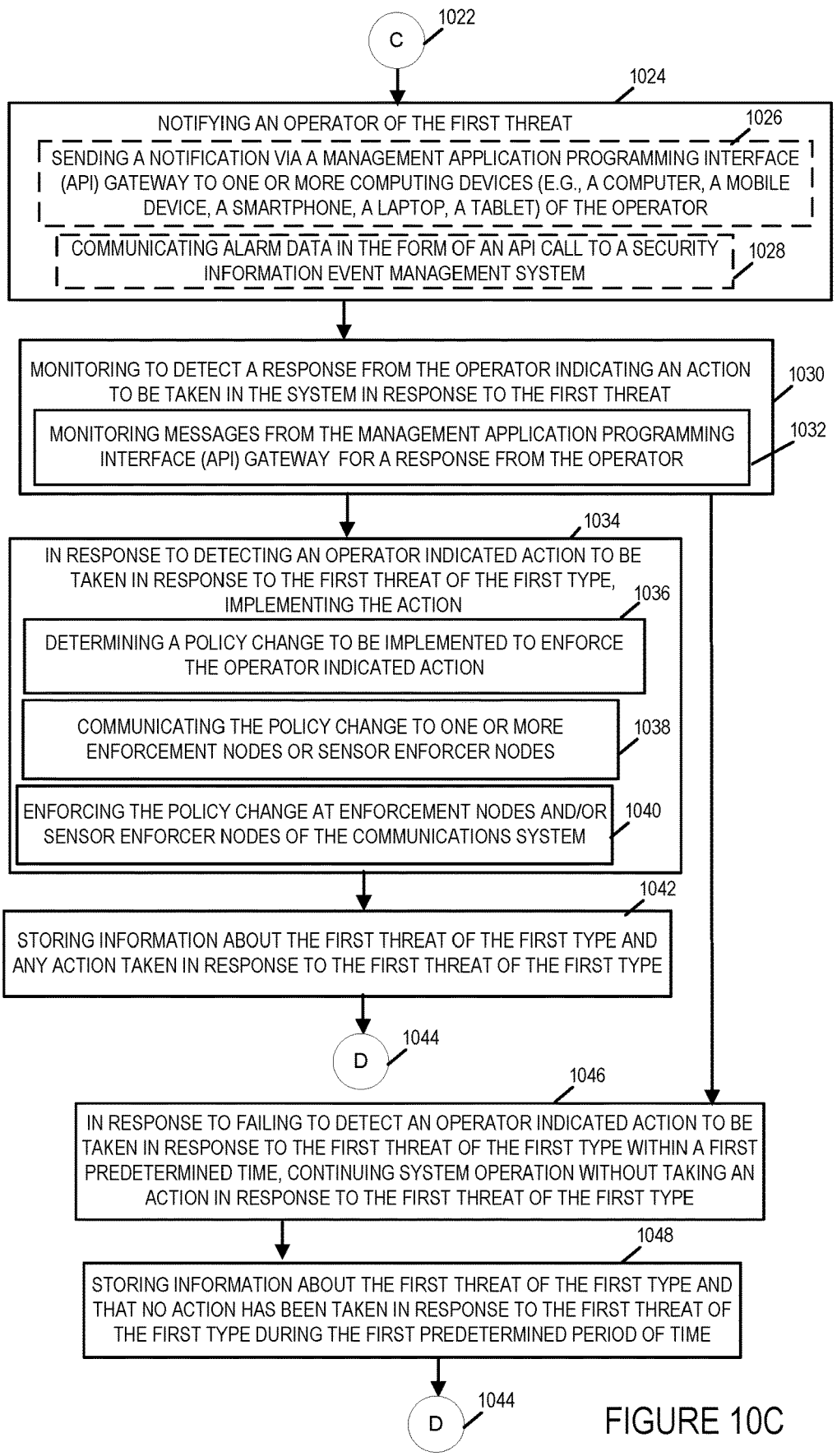
FIG. 10C illustrates the third part of a flowchart of an exemplary communications method in accordance with an embodiment of the present invention.
Figure 10D:
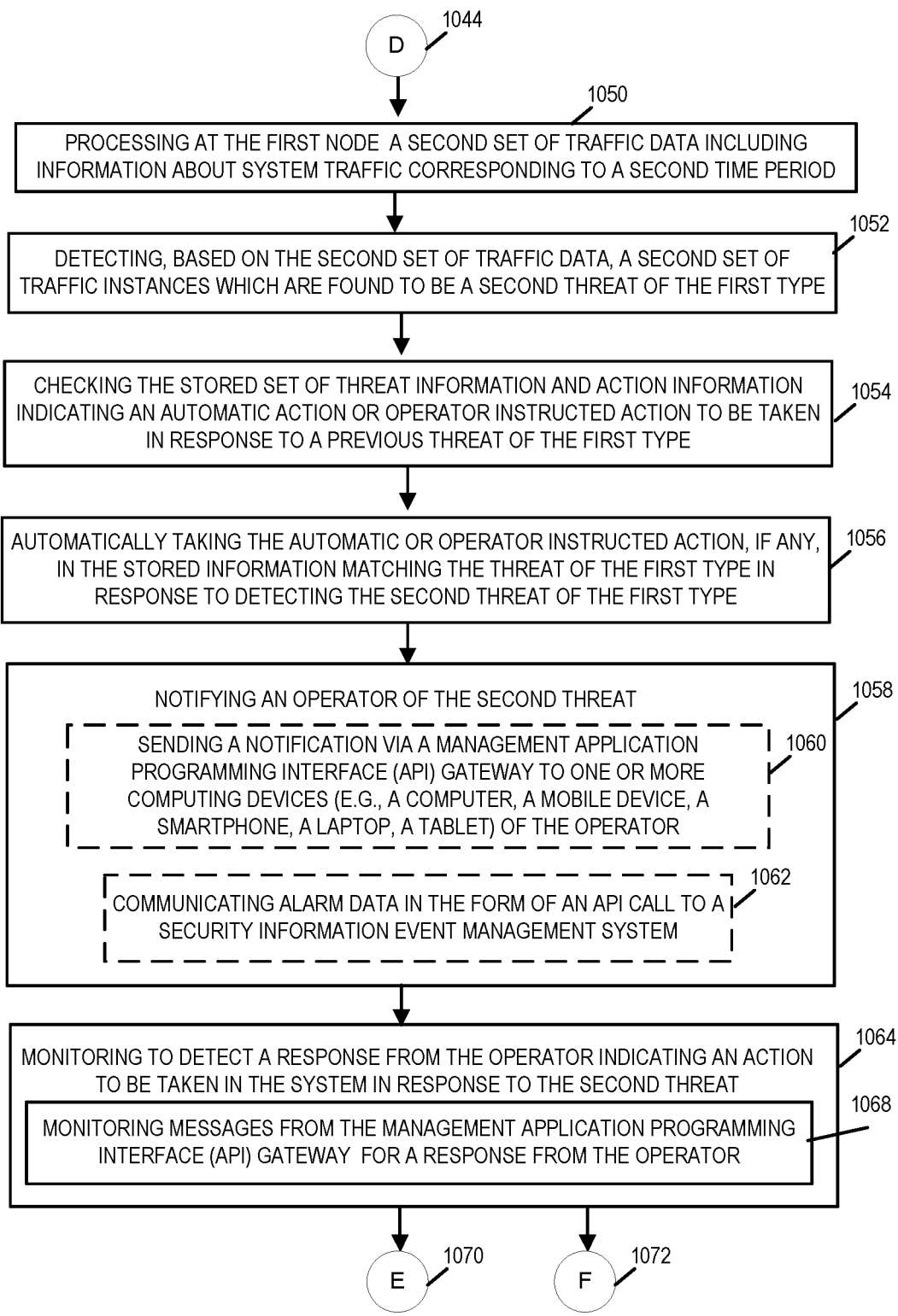
FIG. 10D illustrates the fourth part of a flowchart of an exemplary communications method in accordance with an embodiment of the present invention.
Figure 10E:
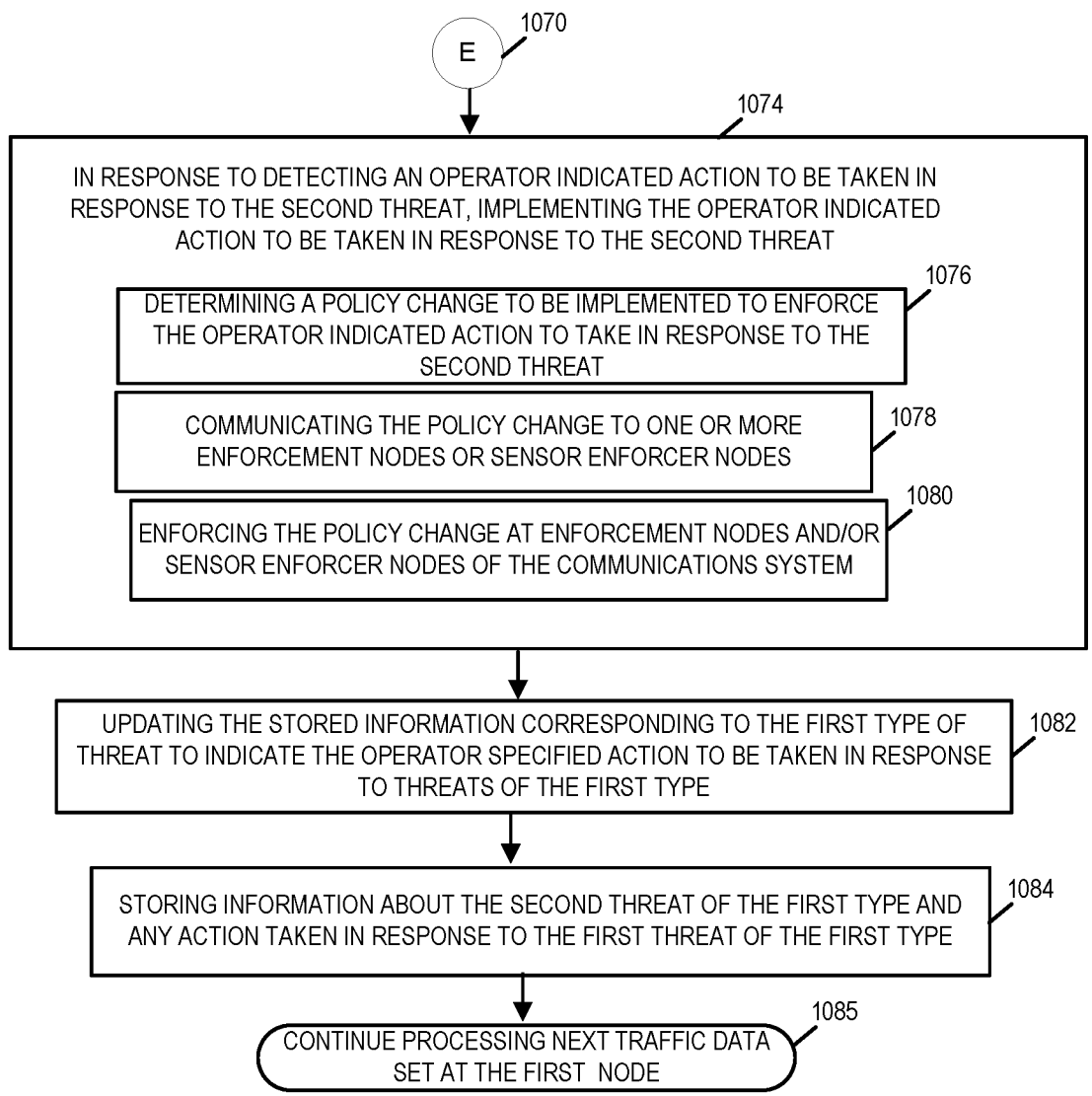
FIG. 10E illustrates the fifth part of a flowchart of an exemplary communications method in accordance with an embodiment of the present invention.
Figure 10F:
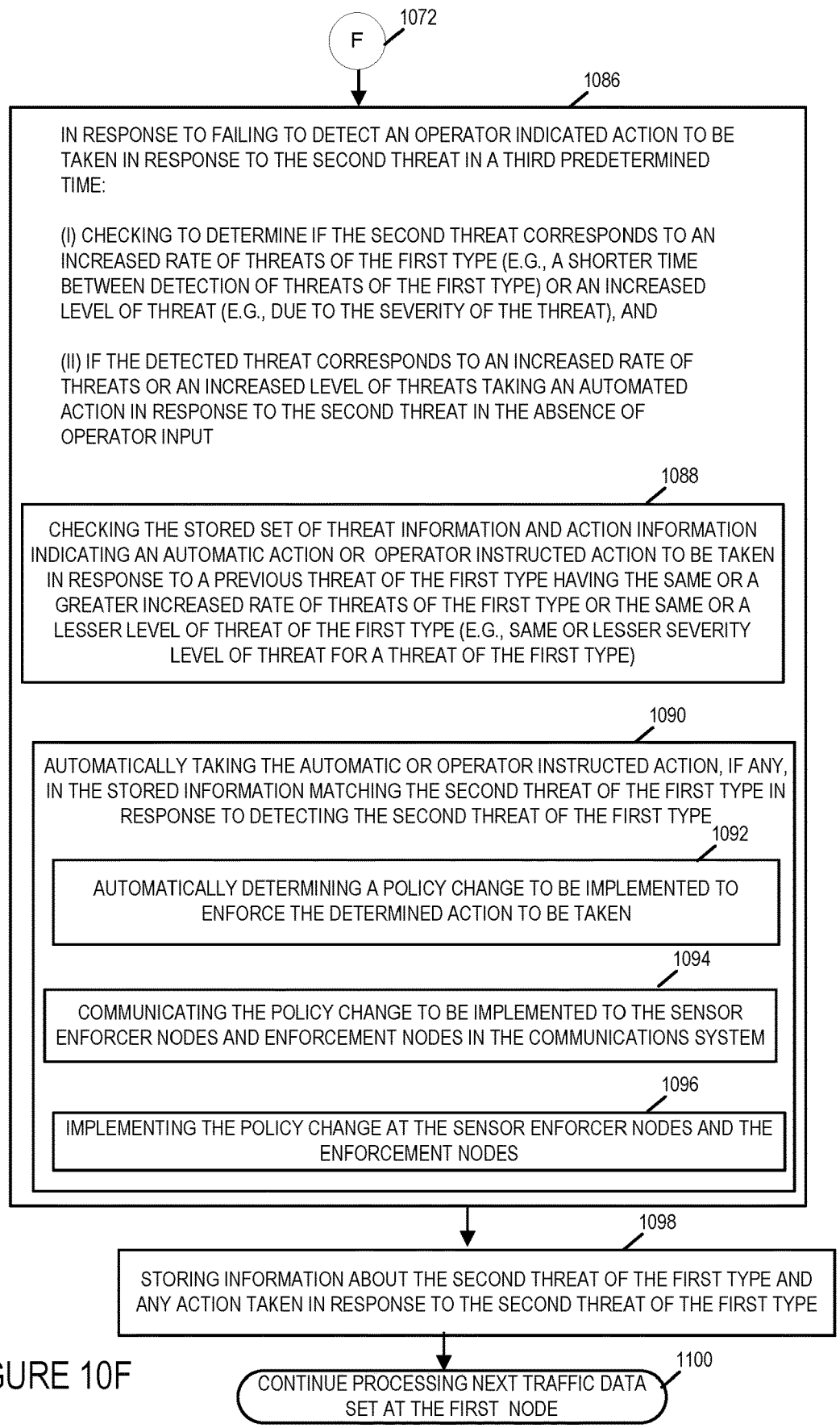
FIG. 10F illustrates the sixth part of a flowchart of an exemplary communications method in accordance with an embodiment of the present invention.
Figure 10G:
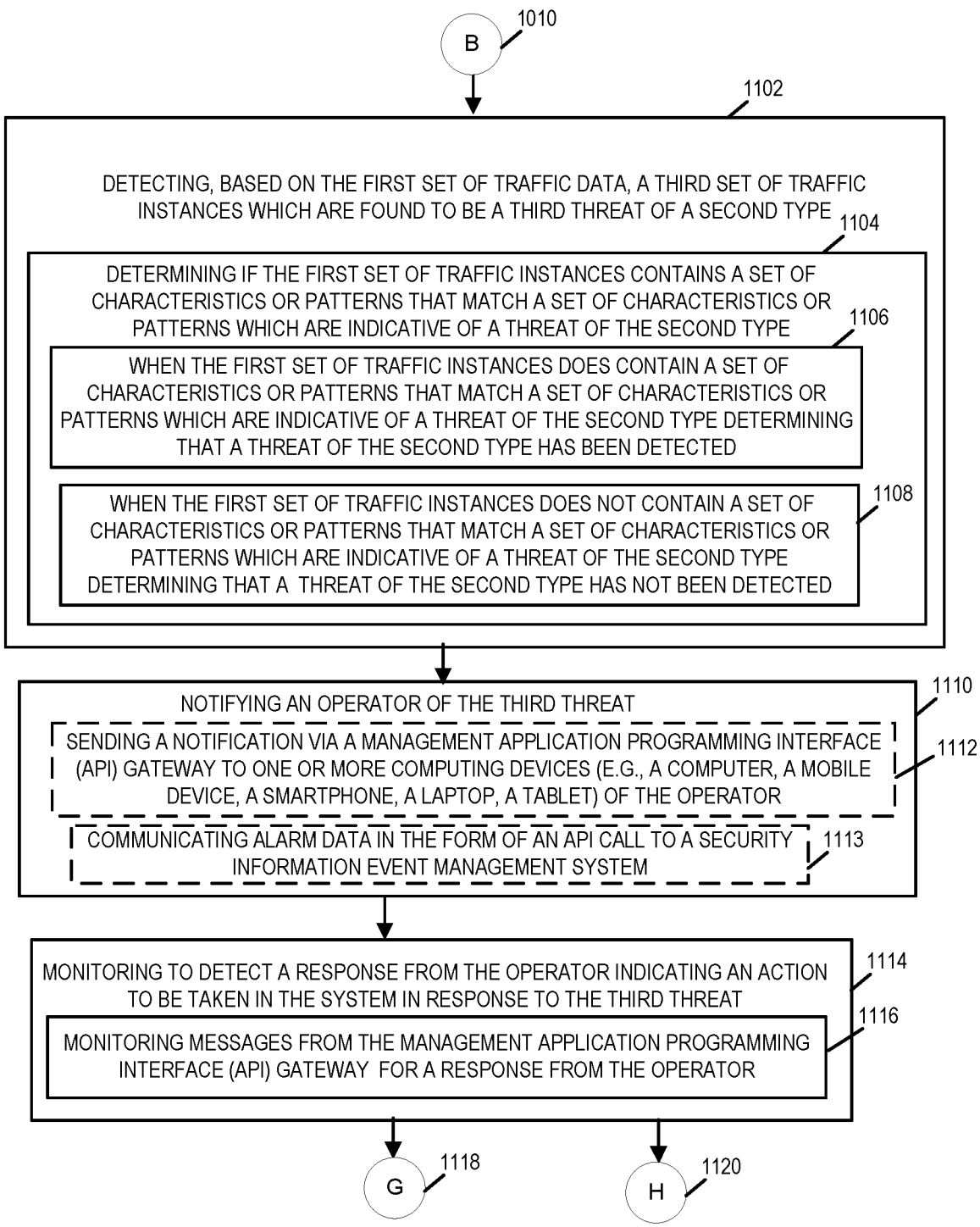
FIG. 10G illustrates the seventh part of a flowchart of an exemplary communications method in accordance with an embodiment of the present invention.
Figure 10H:
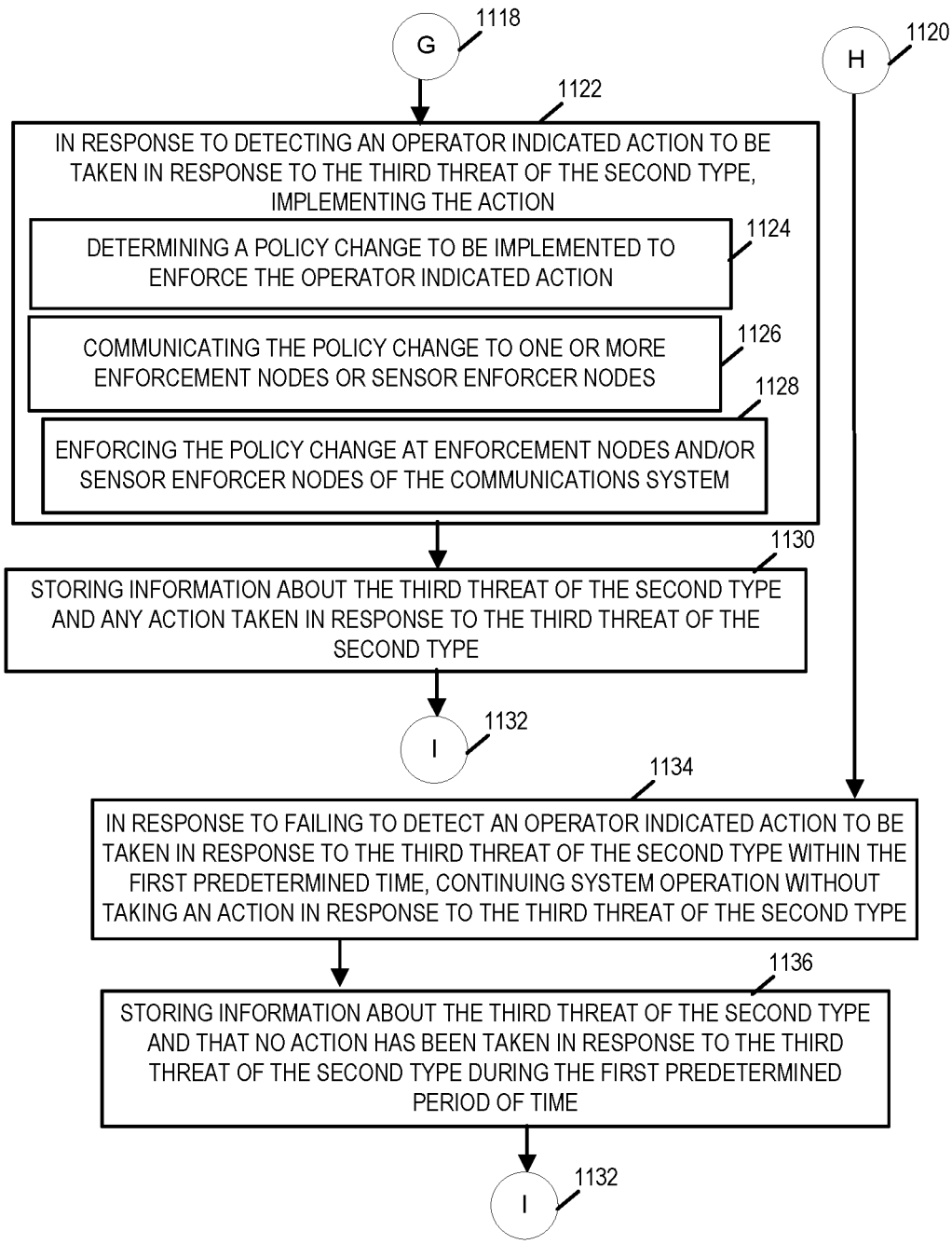
FIG. 10H illustrates the eighth part of a flowchart of an exemplary communications method in accordance with an embodiment of the present invention.
Figure 10I:
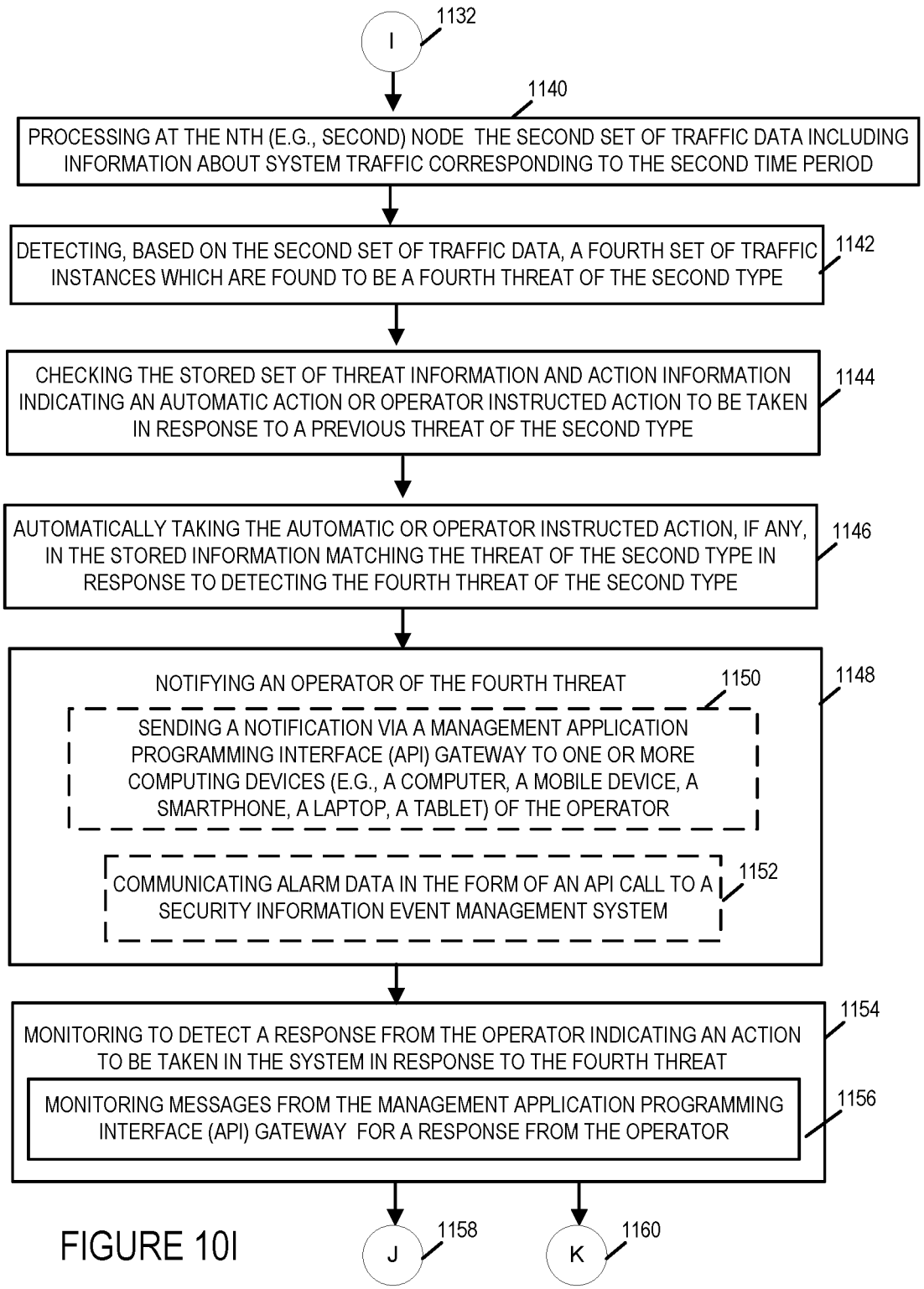
FIG. 10I illustrates the ninth part of a flowchart of an exemplary communications method in accordance with an embodiment of the present invention.
Figure 10J:
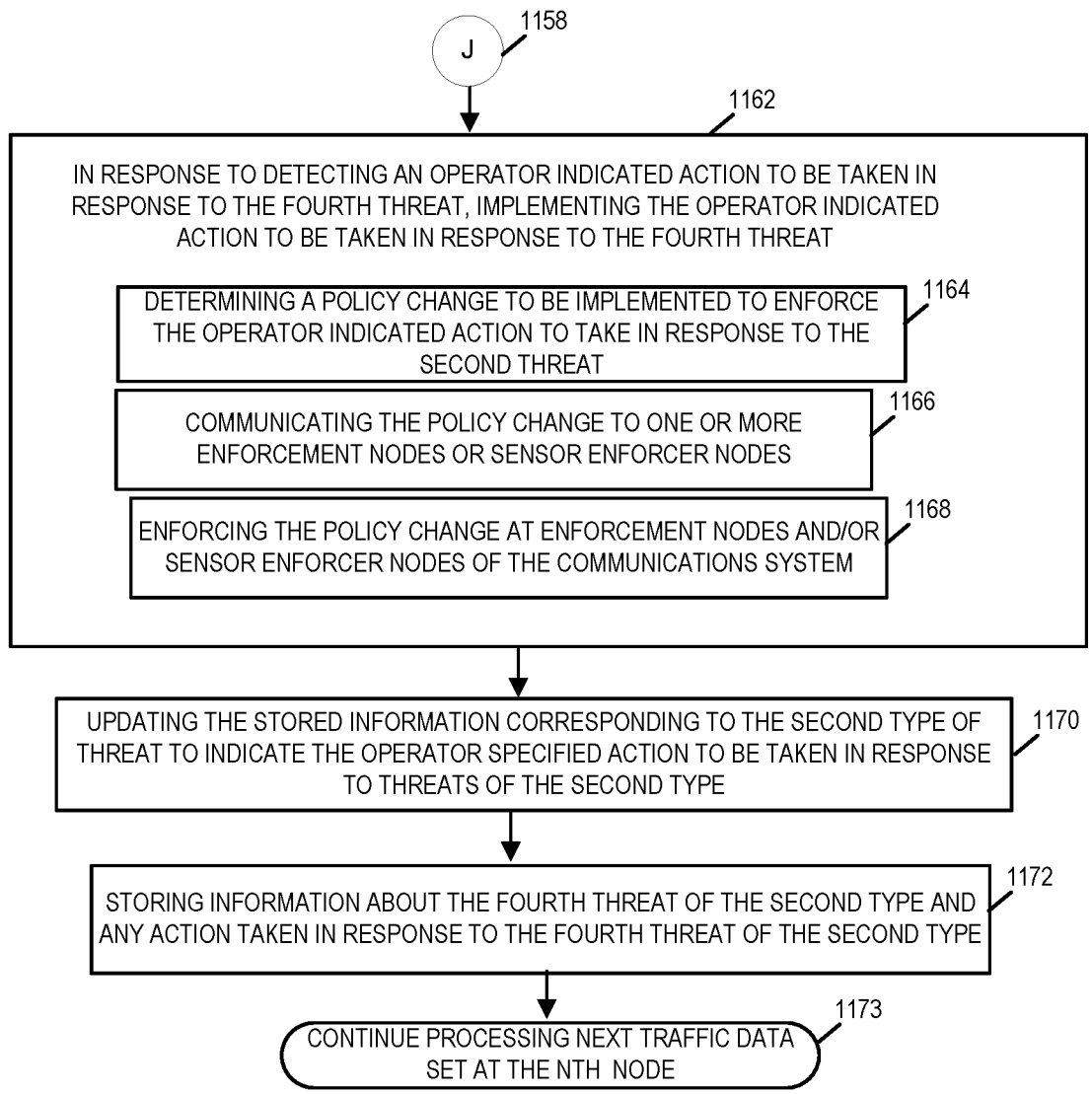
FIG. 10J illustrates the tenth part of a flowchart of an exemplary communications method in accordance with an embodiment of the present invention.
Figure 10K:
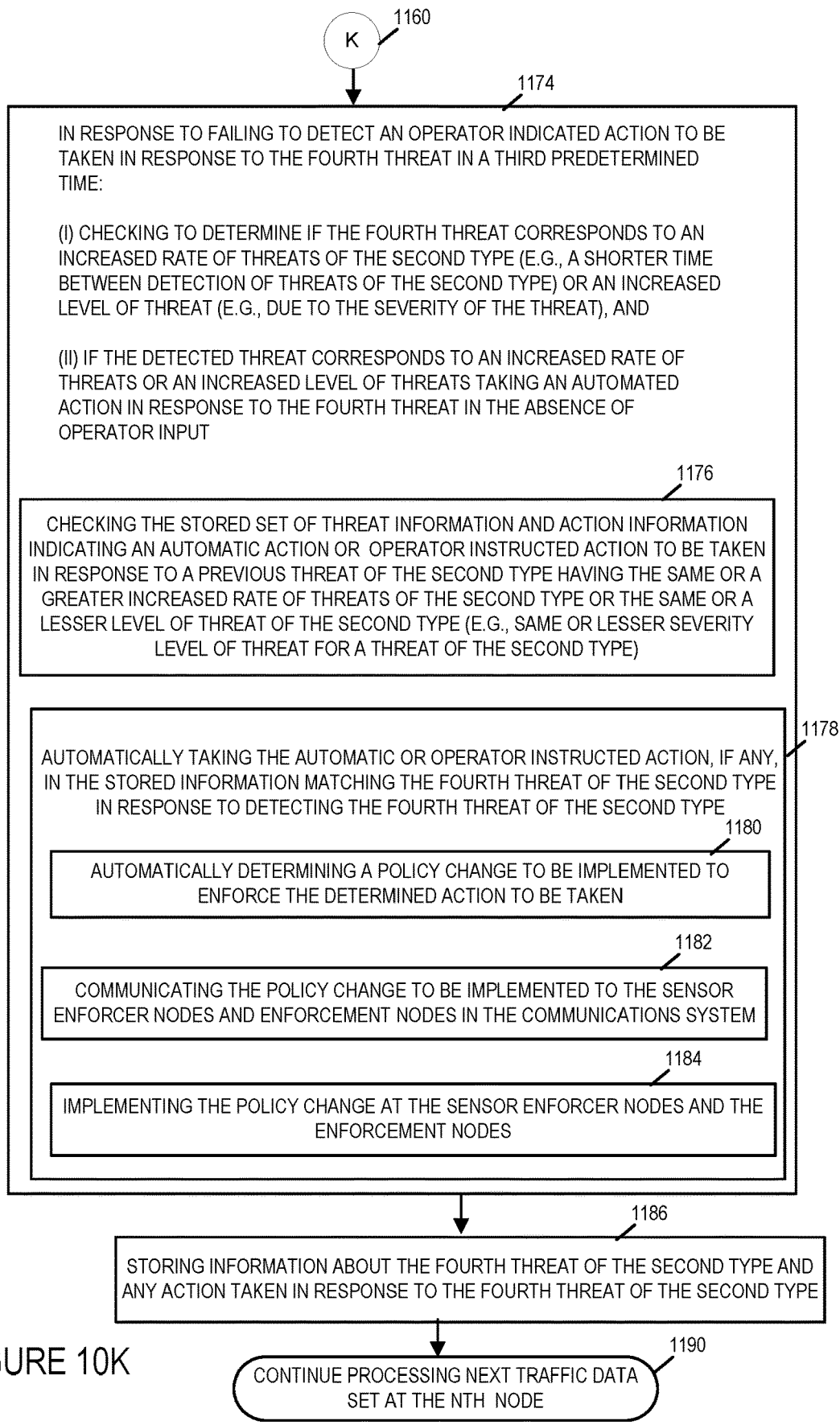
FIG. 10K illustrates the eleventh part of a flowchart of an exemplary communications method in accordance with an embodiment of the present invention.

FIG. 10 comprises FIGS. 10A, 10B, 10C, 10D, 10E, 10F, 10G, 10H, 10I, 10J and 10K. FIG. 10A illustrates the first part of a flowchart of an exemplary communications method in accordance with an embodiment of the present invention. FIG. 10B illustrates the second part of a flowchart of an exemplary communications method in accordance with an embodiment of the present invention. FIG. 10C illustrates the third part of a flowchart of an exemplary communications method in accordance with an embodiment of the present invention. FIG. 10D illustrates the fourth part of a flowchart of an exemplary communications method in accordance with an embodiment of the present invention. FIG. 10E illustrates the fifth part of a flowchart of an exemplary communications method in accordance with an embodiment of the present invention. FIG. 10F illustrates the sixth part of a flowchart of an exemplary communications method in accordance with an embodiment of the present invention. FIG. 10G illustrates the seventh part of a flowchart of an exemplary communications method in accordance with an embodiment of the present invention. FIG. 10H illustrates the eighth part of a flowchart of an exemplary communications method in accordance with an embodiment of the present invention. FIG. 10I illustrates the ninth part of a flowchart of an exemplary communications method in accordance with an embodiment of the present invention. FIG. 10J illustrates the tenth part of a flowchart of an exemplary communications method in accordance with an embodiment of the present invention. FIG. 10K illustrates the eleventh part of a flowchart of an exemplary communications method in accordance with an embodiment of the present invention. The method 1000 may be implemented on various systems, e.g., Unified Communications system, including the exemplary systems described in FIGS. 1, 2, 3, 4, 5, 6 and 8. For explanatory purposes the method will be described in connection with the Unified Communications system 800 illustrated in FIG. 8.

The exemplary method 1000 of operating a communications system begins in start step 1002 shown on FIG. 10A. Operation proceeds from step 1002 to steps 1004, 1005 and 1008 in parallel. The " . . . " 105 between steps 1004 and 1008 in the flowchart indicate one or more additional routines or steps of the flowchart wherein addition nodes separately execute additional applications for threat detection and mitigation including steps 1008, 1102, 1110, 1114, 1122, 1134, 1136, 1140, 1142, 1144, 1146, 1148, 1154, 1162, 1170, 1172 and 1173. In some embodiments, at least some of the nodes of the system, e.g., nodes 1 810, node 2 812, . . . , node N 814 of system 800, execute different threat detection and mitigation applications. In some embodiments, applications for threat detection and mitigation being executed on different nodes process different data sets. For example, data sets are sometimes pre-processed so that data sets provided to an application for threat detection being executed on a node include a limited set of information which is directly pertinent to the type of threat or threats that the application is directed to detecting, each of a plurality of applications for threat detection and mitigation being specifically tailored to detect one or more specific types of threats. Additionally, the amount of time used for the collection of the data within the data sets provided to the nodes may also vary so that data sets used for detecting certain threats contain data collected over a longer time period (e.g., hours) vs. data sets for other types of threats which contain data collected for a shorter time period (e.g., minutes).

In step 1004, a first node of the communications system, e.g., node 1 810, executing a first application for threat detection and mitigation processes a first set of traffic data including information about system traffic corresponding to a first period of time wherein one or more pieces of data in the first data set are provided by sensors and/or sensor enforcer nodes monitoring traffic in the communications system, e.g., sensor data, e.g., 850 sensor data, for example call data records provided from sensor enforcer node 1 826. The first set of traffic data includes information about system traffic corresponding to the first period of time such as for example, call detail records, application level protocol specific information (e.g., Session Initiation Protocol information), and data link layer and physical layer information about the communications system and its communications network links generated by the sensors and/or sensor enforcer nodes over the first time period. Operation proceeds from step 1004 via connection node A 1006 to step 1012.

Application level protocol specific information may, and in some embodiments does, include quality of session metric(s) based on one or more of the following: number of packets exchanged, packet loss, loss rate, discard rate due to late arrival of packets, burst density gap, gap durations, Mean Opinion Score (MOS), Rx factor, jitter, round-trip time, and number of consecutive packet losses for packet loss periods experienced during the session.

In some embodiments, the first set of traffic data includes Real-time Transport Protocol (RTP) application meta-data and raw data and Real-time Transport Control Protocol (RTCP) application meta-data and raw data, application RTP raw data consisting of RTP packets included in the first set of traffic data, e.g., corresponding to one or more an RTP packet streams, the RTP meta-data being data describing an RTP stream (e.g., an RTP stream to which at least some of the RTP raw data corresponds), the RTCP raw data consisting of RTCP packets included in the first set of traffic data e.g., corresponding to one or more RTCP packet streams which in turn correspond to one or more of the RTP packet streams for which raw data is included in the first set of traffic data. The RTCP meta-data is data describing an RTCP stream (e.g., an RTCP stream to which at least some of the RTCP raw data corresponds). In some embodiments, the RTCP meta-data includes one or more of the following: counts of RTCP packets and counts of RTCP streams. In at least some embodiments, the RTP meta-data includes counts of RTP packets, counts of RTP packet streams, rates, jitter, jitter, loss, partner pairs corresponding to RTP packets of a RTP packet stream.

In some embodiments, information and/or data in the first set of data is provided in response to requests from the first node to the sensors and/or sensor enforcer nodes of the communications system while in other embodiments the sensors and/or sensor enforcer nodes are configured to send information and/or data without receiving a request from the first node. In still other embodiments, the information and/or data in the first set of data is provided either in response to requests from the first node or a result of the sensors and/or sensor enforcer nodes being configured to provide the data without a request.

In some embodiments, the information and data in the first set of data is stored by the sensors and/or sensor enforcer nodes in a database system from which the first node obtains the first set of data. In some such embodiments, the information and/or data provided by the various sensors and/or sensor enforcer nodes may be processed and organized prior to be provided or obtained by the first node for analysis.

In step 1012 shown on FIG. 10B, the first node detects, based on the first set of traffic data, a first set of traffic instances which are found to be a first threat of a first type. In some embodiments, step 1012 includes one or more sub-steps 1014 and 1016.

In sub-step 1014, the first node detects one or more sets of the following traffic instances corresponding to a subscriber or a device (e.g., endpoint device): (i) mismatches in traffic characteristics corresponding to the subscriber or the device (e.g., traffic belonging to or corresponding to a single subscriber or user equipment device having average call duration (ACD) traffic characteristics indicative of an enterprise system or private branch exchange (PBX), (ii) call or session control signaling (e.g., Session Initiation Protocol signaling) traffic corresponding to the subscriber or the device identified as containing known bad actor indicator elements (e.g., the user-agent field containing a string for software previously identified as commonly used for hacking attacks), (iii) uncommon characteristics identified on a per message basis in a set of messages corresponding to the subscriber or device (e.g., INVITE messages are typically large but the other messages in a signaling setup exchange are typically small with no message bodies), (iv) traffic containing communications system level violations from the subscriber or the device (e.g., an access subscriber attempting to place a call without registering), (v) traffic from the subscriber or device containing requests inconsistent with a known past state corresponding to the subscriber or the device (e.g., receiving a refresh registration request from a different device than the device that initially created a registration for an address of record (AOR) included in the refresh registration request.

In sub-step 1016, the first node determines if the first set of traffic instances contains a set of characteristics or patterns that match a set of characteristics or patterns which are indicative of a threat of the first type. Sub-step 1016 in some embodiments includes sub-steps 1018 and/or 1020.

In sub-step 1018, the first node determines that a first threat of the first type has been detected when the first set of traffic instances contains a set of characteristics or patterns that match a set of characteristics or patterns which are indicative of a threat of the first type.

In sub-step 1020, the first node determines that a first threat of the first type has not been detected when the first set of traffic instances does not contain a set of characteristics or patterns that match a set of characteristics or patterns which are indicative of a threat of the first type.

Operation proceeds from step 1012 via connection node C 1022 to step 1024 shown on FIG. 10C.

In step 1024, the first node notifies an operator of the communications system of the first threat. In some embodiments step 1024 includes one or more sub-steps 1026 and 1028.

In sub-step 1026, the first node sends or transmits a notification of the first threat via a management application programming interface (API) gateway to one or more computing devices (e.g., a computer, a mobile device, a smartphone, a laptop, or a tablet) of the operator.

In sub-step 1028, the first node communicates or sends alarm data in the form of an API call to a security information event management (SIEM) system of the communications system.

Operation proceeds from step 1024 to step 1030. In step 1030, the first node monitors to detect a response from the operator indicating an action to be taken in the communications system in response to the first threat. In some embodiments, step 1030 includes sub-step 1032. In sub-step 1032, the first node monitors messages from the management application programming interface (API) gateway for a response from the operator.

Operation proceeds from step 1030 to step 1034 when the first node detects a response from the operator to the notification of the first threat. In step 1034, in response to detecting an operator indicated action to be taken in response to the first threat of the first type, the communications system implements the operator indicated action. Step 1034 in some embodiments includes one or more of the sub-steps 1036, 1038, and 1040. In sub-step 1036, a policy change to be implemented to enforce the operator indicated action is determined. In sub-step 1038, the policy change is communicated to one or more enforcement nodes and/or sensor enforcer nodes. In sub-step 1040, the policy change is enforced at enforcement nodes and/or sensor enforcer nodes of the communications system. In some embodiments, sub-steps 1036 and 1038 are performed by the first node or by another node in response to instructions from the first node. For example, in communications systems which include Software Defined Networks, the first node communicates the policy change instructions to a Software Defined Network controller that upon receiving the policy change instructions sends commands or instructions to programmable SDN switches (i.e., enforcement nodes/devices) to implement the policy change(s).

Operation proceeds from step 1040 to step 1042. In step 1042, the first node stores information about the first threat of the first type and any action taken in response to the first threat of the first type in a storage device included in the first node or coupled to the first node, e.g., memory or database storage system. Operation proceeds from step 1042 via connection node D 1044 to step 1050 shown on FIG. 10D.

Returning to step 1030, when the first node fails to detect an operator indicated action in response to the notification of the first threat of the first type within a predetermined time since the notification of the first threat was sent to the operator, the communications system continues to operate without taking an action in response to the first threat of the first type. Under such conditions, the first node refrains from taking any mitigation action to the detected first threat of the first type. Operation proceeds from step 1046 to step 1048.

In step 1048, the first node stores information about the first threat of the first type and that no action has been taken in response to the first threat of the first type during the first predetermined period of time in the storage device included in the first node or coupled to the first node, e.g., memory or database storage system. Operation proceeds from step 1048 via connection node D 1044 to step 1050 shown on FIG. 10D.

In step 1050, a second set of traffic data is processed at the first node. The second set of traffic data including information about system traffic corresponding to a second time period occurring after said first time period. Operation proceeds from step 1050 to step 1052.

In step 1052, the first node based on the second set of traffic data detects a second set of traffic instances which are found to be a second threat of the first type. In some embodiments, step 1052 includes the sub-step of determining if the first set of traffic instances contains a set of characteristics or patterns that match a set of characteristics or patterns which are indicative of a threat of the first type and when the second set of traffic instances does contain a set of characteristics or patterns that match a set of characteristics or patterns which are indicative of a threat of the first type it determines that a second threat of the first type has been detected. Operation proceeds from step 1052 to step 1054.

In step 1054, the first node checks the stored set of threat information and action information indicating an automatic action or operator instructed action to be taken in response to a previous threat of the first type. Operation proceeds from step 1054 to step 1056.

In step 1056, the first node automatically takes the automatic or operator instructed action, if any, in the stored information matching the threat of the first type in response to detecting the second threat of the first type. Operation proceeds from step 1056 to step 1058.

In step 1058, the first node notifies the operator of the communications system of the second threat of the first type. In some embodiments, step 1058 includes one or more sub-steps 1060 and 1062. In sub-step 1062, the first node sends a notification via a management application programming interface (API) gateway to one or more computing devices (e.g., a computer, a mobile device, a smartphone, a laptop, or a tablet) of the operator. In sub-step 1062, the first node communicates or sends alarm data in the form of an API call to a security information event management system of the communications system. Operation proceeds from step 1058 to step 1064.

In step 1064, the first node monitors to detect a response from the operator indicating an action to be taken in the communications system in response to the second threat of the first type. In some embodiments step 1064 includes sub-step 1068. In sub-step 1068, the first node monitors messages from the management application programming interface (API) gateway for a response from the operator.

Operation proceeds from monitoring step 1064 via connection node E 1070 to step 1074 shown on FIG. 10E when a response is detected from the operator with respect to the notification of the second threat of the first type. In step 1074, in response to detecting an operator indicated action to be taken in response to the second threat of the first type, the system implements the operator indicated action to be taken in response to the second threat of the first type. In some embodiments, step 1074 includes one or more sub-step 1076, 1078, and 1080. In sub-step 1076, a policy change to be implemented to enforce the operator indicated action to take in response to the second threat of the first type is determined. In some embodiments, the first node performs sub-step 1076. In sub-step 1078, the policy change for the second threat is communicated or sent to one or more enforcement nodes and/or sensor enforcer nodes of the communications system. In some embodiments step 1078 is performed by the first node. In some embodiments, the first node instructs an SDN controller of the policy change which in turn instructs enforcement nodes and/or sensor enforcer nodes under its control of policy or rules to be enforced to comply with the policy change. In some embodiments, the policy changes are provided to a centralized policy server which distributes the policy changes to the enforcement nodes and/or sensor enforcer nodes of the communications system. In sub-step 1080, the policy change is enforced at enforcement nodes and/or sensor enforcer nodes of the communications system. Operation proceeds from step 1080 to step 1082.

In step 1082, the first node updates the stored information corresponding to the first type of threat to indicate the operator specified action to be taken in response to threats of the first type. Operation proceeds from step 1082 to step 1084.

In step 1084, the first node stores information about the second threat of first type and any action taken in response to the first threat of the first type.

Operation proceeds from step 1084 to step 1085.

In step 1085, processing of the method continues with processing of the next traffic data set at the first node for the detection and mitigation of additional threats.

Returning to monitoring step 1064, after a third predetermined time period has expired without the detection of a response from the operator to the notification of the second threat of the first type operation proceeds from step 1064 via connection F 1072 to step 1086 shown on FIG. 10F.

In step 1086, in response to failing to detect an operator indicated action to be taken in response to the second threat of the first type in a third pre-determined time the system (i) checks to determine if the second threat corresponds to an increased rate of threats of the first type (e.g., a shorter time between detection of threats of the first type) or an increased level of threat (e.g., due to the severity of the threat), and (ii) if the detected threat corresponds to an increased rate of threats or an increased level of threats taking an automated action in response to the second threat in the absence of operator input. Step 1086 may, and in some embodiments does, include one or more sub-steps 1088, 1090. In sub-step 1088, the first node checks the stored set of threat information and action information indicating an automatic action or operator instructed action to be taken in response to a previous threat of the first type having the same or a greater increased rate of threats of the first type or the same or a lesser level of threat of the first type (e.g., same or lesser severity level of threat for a threat of the first type). In sub-step 1090, the system automatically takes the automatic or operator instruction action, if any, in the stored information matching the second threat of the first type. In some embodiments, sub-step 1090 includes one or more sub-steps 1092, 1094, and 1096. In sub-step 1092, the first node automatically determines a policy change to be implemented to enforce the determined action to be taken in response to the second threat. In sub-step 1094, the first node communications the policy change to be implemented to the sensor enforcer nodes and/or enforcement nodes of the communications system. In sub-step 1096, the policy change is implemented at the sensor enforcer nodes and/or the enforcement nodes.

The first node typically performs the operations of step 1086 and its optional sub-steps with the exception of the enforcement of the automated action by the enforcement nodes and/or sensor enforcer node which is performed by the enforcement nodes and/or sensor enforcers. Operation proceeds from step 1086 to step 1098.

In step 1098, the first node stores information about the second threat of the first type and any action taken in response to the second threat of the first type. Operation proceeds from step 1098 to step 1100.

In step 1100, processing of the method continues with processing of the next traffic data set at the first node for the detection and mitigation of additional threats.

Returning to step 1008, in step 1008, a Nth node where N is a positive number greater than 1 of the communications system executing a second application for threat detection and mitigation processes the first set of traffic data including information about system traffic corresponding to the first period of time wherein one or more pieces of data in the first data set are provided by sensors and/or sensor enforcer nodes monitoring traffic in the communications system. Operation proceeds from step 1008 via connection node B 1010 to step 1102 shown on FIG. 10G.

In step 1102 shown on FIG. 10G, the Nth node detects, based on the first set of traffic data, a third set of traffic instances which are found to be a third threat of a second type. In some embodiments, step 1102 includes sub-step 1104.

In sub-step 1104, the Nth node determines if the third set of traffic instances contains a set of characteristics or patterns that match a set of characteristics or patterns which are indicative of a threat of the second type. Sub-step 1104 in some embodiments includes sub-steps 1106 and/or 1108.

In sub-step 1106, the Nth node determines that a threat of the second type has been detected when the third set of traffic instances contains a set of characteristics or patterns that match a set of characteristics or patterns which are indicative of a threat of the second type.

In sub-step 1108, the Nth node determines that a threat of the second type has not been detected when the third set of traffic instances does not contain a set of characteristics or patterns that match a set of characteristics or patterns which are indicative of a threat of the second type. Operation proceeds from step 1102 to step 1110.

In step 1110, the Nth node notifies an operator of the communications system of the third threat. In some embodiments step 1110 includes one or more sub-steps 1112 and 1113.

In sub-step 1112, the Nth node sends or transmits a notification of the third threat via a management application programming interface (API) gateway to one or more computing devices (e.g., a computer, a mobile device, a smartphone, a laptop, or a tablet) of the operator.

In sub-step 1113, the Nth node communicates or sends alarm data in the form of an API call to a security information event management (SIEM) system of the communications system. Operation proceeds from step 1110 to step 1114.

In step 1114, the Nth node monitors to detect a response from the operator indicating an action to be taken in the communications system in response to the third threat. In some embodiments, step 1114 includes sub-step 1116. In sub-step 1116, the Nth node monitors messages from the management application programming interface (API) gateway for a response from the operator.

Operation proceeds from step 1114 to step 1122 shown on FIG. 10H via connection node G 1118 when the Nth node detects a response from the operator to the notification of the third threat. In step 1122, in response to detecting an operator indicated action to be taken in response to the third threat of the second type, the communications system implements the operator indicated action. Step 1122 in some embodiments includes one or more of the sub-steps 1124, 1126, and 1128. In sub-step 1124, a policy change to be implemented to enforce the operator indicated action is determined. In sub-step 1126, the policy change is communicated to one or more enforcement nodes and/or sensor enforcer nodes. In sub-step 1128, the policy change is enforced at enforcement nodes and/or sensor enforcer nodes of the communications system. In some embodiments, sub-steps 1124 and 1126 are performed by the Nth node or by another node in response to instructions from the Nth node.

Operation proceeds from step 1122 to step 1130. In step 1130, the Nth node stores information about the third threat of the second type and any action taken in response to the third threat of the second type in the storage device included in the first node or coupled to the first node, e.g., memory or database storage system.

Operation proceeds from step 1130 via connection node I 1132 to step 1140 shown on FIG. 10I.

Returning to monitoring step 1114, when the Nth node fails to detect an operator indicated action in response to the notification of the third threat of the second type within a predetermined time since the notification of the third threat was sent to the operator, operation proceeds from step 1114 via connection node H 1120 to step 1134 shown on FIG. 10H. In step 1134, in response to failing to detect an operator indicated action to be taken in response to the third threat of the second type within the predetermined time, the communications system continues to operate without taking an action in response to the third threat of the second type. Under such conditions, the Nth node refrains from taking any mitigation action to the detected third threat of the second type. Operation proceeds from step 1134 to step 1136.

In step 1136, the Nth node stores information about the third threat of the second type and that no action has been taken in response to the third threat of the second type during the predetermined period of time in the storage device included in the Nth node or coupled to the Nth node, e.g., memory or database storage system. Operation proceeds from step 1136 via connection node I 1132 to step 1140 shown on FIG. 10I.

In step 1140, the second set of traffic data is processed at the Nth node, the second set of traffic data including information about system traffic corresponding to the second time period occurring after said first time period. Operation proceeds from step 1140 to step 1142.

In step 1142, the Nth node based on the second set of traffic data detects a fourth set of traffic instances which are found to be a fourth threat of the second type. In some embodiments, step 1142 includes the sub-step of determining if the fourth set of traffic instances contains a set of characteristics or patterns that match a set of characteristics or patterns which are indicative of a threat of the second type and when the fourth set of traffic instances does contain a set of characteristics or patterns that match a set of characteristics or patterns which are indicative of a threat of the second type it determines that a fourth threat of the second type has been detected. Operation proceeds from step 1142 to step 1144.

In step 1144, the Nth node checks the stored set of threat information and action information indicating an automatic action or operator instructed action to be taken in response to a previous threat of the second type. Operation proceeds from step 1144 to step 1146.

In step 1146, the Nth node automatically takes the automatic or operator instructed action, if any, in the stored information matching the threat of the second type in response to detecting the fourth threat of the second type. Operation proceeds from step 1146 to step 1148.

In step 1148, the Nth node notifies the operator of the communications system of the fourth threat of the second type. In some embodiments, step 1148 includes one or more sub-steps 1150 and 1152. In sub-step 1150, the Nth node sends a notification via a management application programming interface (API) gateway to one or more computing devices (e.g., a computer, a mobile device, a smartphone, a laptop, or a tablet) of the operator. In sub-step 1152, the Nth node communicates or sends alarm data in the form of an API call to a security information event management system of the communications system. Operation proceeds from step 1148 to step 1154.

In step 1154, the Nth node monitors to detect a response from the operator indicating an action to be taken in the communications system in response to the fourth threat of the second type. In some embodiments step 1154 includes sub-step 1156. In sub-step 1156, the Nth node monitors messages from the management application programming interface (API) gateway for a response from the operator.

Operation proceeds from monitoring step 1154 via connection node J 1158 to step 1162 shown on FIG. 10J when a response is detected from the operator with respect to the notification of the fourth threat of the second type. In step 1162, in response to detecting an operator indicated action to be taken in response to the fourth threat of the second type, the system implements the operator indicated action to be taken in response to the fourth threat of the second type. In some embodiments, step 1162 includes one or more sub-step 1164, 1166, and 1168. In sub-step 1164, a policy change to be implemented to enforce the operator indicated action to take in response to the fourth threat of the second type is determined. In some embodiments, the Nth node performs sub-step 1164. In sub-step 1166, the policy change for the fourth threat is communicated or sent to one or more enforcement nodes and/or sensor enforcer nodes of the communications system. In some embodiments step 1166 is performed by the Nth node. As previously discussed in connection with the first node, the Nth node may, and in some embodiments does, communicate or send the instructions to the enforcement nodes and/or sensor enforcer nodes via an SDN controller and/or policy server such as for example, a centralized policy server which distributes the policy changes to the enforcement nodes and/or sensor enforcer nodes of the communications system. In sub-step 1168, the policy change is enforced at enforcement nodes and/or sensor enforcer nodes of the communications system. Operation proceeds from step 1162 to step 1170.

In step 1170, the Nth node updates the stored information corresponding to the second type of threat to indicate the operator specified action to be taken in response to threats of the second type. Operation proceeds from step 1170 to step 1172.

In step 1172, the Nth node stores information about the fourth threat of the second type and any action taken in response to the fourth threat of the second type. Operation proceeds from step 1172 to step 1173.

In step 1173, processing of the method continues with processing of the next traffic data set at the Nth node for the detection and mitigation of additional threats.

Returning to monitoring step 154, after a predetermined time period has expired without the detection of a response from the operator to the notification of the fourth threat of the second type operation proceeds from step 1154 via connection K 1160 to step 1174 shown on FIG. 10K.

In step 1174, in response to failing to detect an operator indicated action to be taken in response to the fourth threat of the second type in a pre-determined time the system (i) checks to determine if the fourth threat corresponds to an increased rate of threats of the second type (e.g., a shorter time between detection of threats of the second type) or an increased level of threat (e.g., due to the severity of the threat), and (ii) if the detected threat corresponds to an increased rate of threats or an increased level of threats taking an automated action in response to the fourth threat in the absence of operator input. Step 1174 may, and in some embodiments does, include one or more sub-steps 1176, 1178. In sub-step 1176 the Nth node checks the stored set of threat information and action information indicating an automatic action or operator instructed action to be taken in response to a previous threat of the second type having the same or a greater increased rate of threats of the second type or the same or a lesser level of threat of the second type (e.g., same or lesser severity level of threat for a threat of the second type). In sub-step 1178, the system automatically takes the automatic or operator instruction action, if any, in the stored information matching the second threat of the second type. In some embodiments, sub-step 1178 includes one or more sub-steps 1180, 1182, and 1184. In sub-step 1180, the Nth node automatically determines a policy change to be implemented to enforce the determined action to be taken in response to the fourth threat. In sub-step 1182, the Nth node communications the policy change to be implemented to the sensor enforcer nodes and/or enforcement nodes of the communications system. In sub-step 1184, the policy change is implemented at the sensor enforcer nodes and/or the enforcement nodes.

The Nth node typically performs the operations of step 1174 and its optional sub-steps with the exception of the enforcement of the automated action by the enforcement nodes and/or sensor enforcer node which is performed by the enforcement nodes and/or sensor enforcers. Operation proceeds from step 1174 to step 1186.

In step 1186, the Nth node stores information about the fourth threat of the second type and any action taken in response to the fourth threat of the second type. Operation proceeds from step 1186 to step 1190.

In step 1190, processing of the method continues with processing of the next traffic data set at the Nth node for the detection and mitigation of additional threats.

It should be understood that the time periods, predetermined times, and predetermined periods of time discussed in the various embodiments are configurable. Different time periods may be, and in some embodiments are, used by different threat detection and mitigation applications. For example, in steps 1004 and step 1008 different time periods may be used instead of the same first period of time. The use of different time periods results in the use of different data sets being analyzed by the first and Nth nodes. Another example is the amount of time to wait for a response from the operator after notification of a threat before taking an automated action in response to the detected threat is also configurable and may for example be based on the type and/or severity of the detected threat.

FIG. 7 as discussed above is a drawing illustrating an assembly of components 700 which may be included in an exemplary computing node or device 600 when implemented as a node or device executing an application for threat detection and mitigation, e.g., nodes 1 810, 2 812, . . . , N 814 of FIG. 8 implemented in accordance with exemplary embodiment component 600. Assembly of components 700 can be, and in some embodiments is, used in computing node 600. The components in the assembly of components 700 can, and in some embodiments are, implemented fully in hardware within the processor 606, e.g., as individual circuits. The components in the assembly of components 700 can, and in some embodiments are, implemented fully in hardware within the assembly of components 619, e.g., as individual circuits corresponding to the different components. In other embodiments some of the components are implemented, e.g., as circuits, within the processor 606 with other components being implemented, e.g., as circuits within assembly of components 619, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 610 of the computing node 600, with the components controlling operation of computing node 600 to implement the functions corresponding to the components when the components are executed by a processor, e.g., processor 606. In some such embodiments, the assembly of components 700 is included in the memory 610 as assembly of components 618. In still other embodiments, various components in assembly of components 700 are implemented as a combination of hardware and software, e.g., with another circuit external to the processor providing input to the processor 606 which then under software control operates to perform a portion of a component's function. While shown in the FIG. 6 embodiment as a single processor, e.g., computer, it should be appreciated that the processor 606 may be implemented as one or more processors, e.g., computers.

When implemented in software the components include code, which when executed by the processor 606, configure the processor 606 to implement the function corresponding to the component. In embodiments where the assembly of components 700 is stored in the memory 610, the memory 610 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the computing node or device 600 or elements therein such as the processor 606, to perform the functions of corresponding steps illustrated and/or described in the method of flowchart of FIG. 10 and/or described with respect to any of the Figures. Thus the assembly of components 700 includes various components that perform functions of corresponding steps of FIG. 10.

Assembly of components 700 includes components 702, 704, 706, 708, 710, 712, 714, 716, 718, 720, 722, 724, 726, 728, 730, 732, and 734. The control routines component 702 is configured to control the operation of the node or device. The communications component 704 is configured to provide communications functionality including communications signaling and support for various communications protocols and interfaces. The Application Component 706 is a component that provides a Unified Communications service, e.g., Voice Over Internet service, that includes a sub-component or subroutine that is a threat detection and mitigation component 708. While the threat detection and mitigation component 708 may be a sub-component or subroutine of an optional Unified Communications Application Component 706, in many embodiments the node/device includes one or more separate threat detection and mitigation components 710 and 734. The threat detection and mitigation components 708, 710, and 734 detect threats and takes actions to mitigate the threats. Each of the threat detection and mitigation components 708, 710, 734 can detect and take actions with respect to one or more threats. The threat detection and mitigation component 710 includes one or more of the following components: data processing component 712, threat detection component 714, threat notification component 716, monitoring operator response component 718, check for action to take in response to detected threat component 720, storage component 722, action implementer component 724, and a policy determinator component 726. Each of the other threat detection and mitigation components 708 and 734 may include one or more of the components described in connection with threat detection and mitigation component 710.

The data processing component 712 processes sets of traffic data including information about system traffic correspond to a time period with one or more pieces of data in the first data set being provided by sensors or sensor enforcer nodes monitoring traffic in the communications system, e.g., system 800.

The threat detection component 714 detects, based on the sets of traffic data sets of traffic instances which are found to be one or more threats, and identifies the type of each threat detected and the level of severity of the threat.

The threat notification component 716 notifies an operator of the system of the detected threats.

The monitoring operator response component 718 monitors to detect a response from the operator indicating an action to be taken in response to the threat about which a notification was sent to the operator.

The check for action to take in response to detected threat component 720 checks a stored set of threat information and action information to see if there is a match to the type of threat detected and if so whether there is action information indicating an automatic action or operator instructed action to be taken in response to a previous threat of the type detected.

The storage component 722 stores and retrieves data, information, and instructions from storage devices including memory and database(s).

The action implementer component 724 implements mitigation actions by determining policy updates to implement the determined or operator indicated actions.

The policy determinator component 726 determines policies or policy updates to implement action, e.g., mitigation actions, to be taken, i.e., implemented and enforced, by enforcement nodes and sensor enforcer nodes in the communications system, e.g., system 800.

The database storage component 728 is configured to access, retrieve, store and delete information in databases.

The comparator component 730 compares traffic data from sensor and sensor enforcer nodes/devices to traffic characteristics and/or patterns to determine a set of traffic instances indicative of a threat of a particular type.

The determinator component 732 makes determinations needed by the node including for example, determinations as to whether a comparison of traffic data to traffic characteristics and patterns results in the detection of a threat, what type of threat has been determined, what action to take in response to a detected threat or whether no action is to be taken in response to a threat.

In some embodiments one or more of the following components are sub-components of one or more of the threat detection and mitigation components 706, 710, and 734: database storage component 728, comparator component 730, determinator component 732.

In some embodiments, the control routines component 702 includes one or more threat detection and mitigation components 710 as sub-components or the threat detection and mitigation component includes the control routines component as a sub-component of the threat detection and mitigation component 710.

Figure 9:
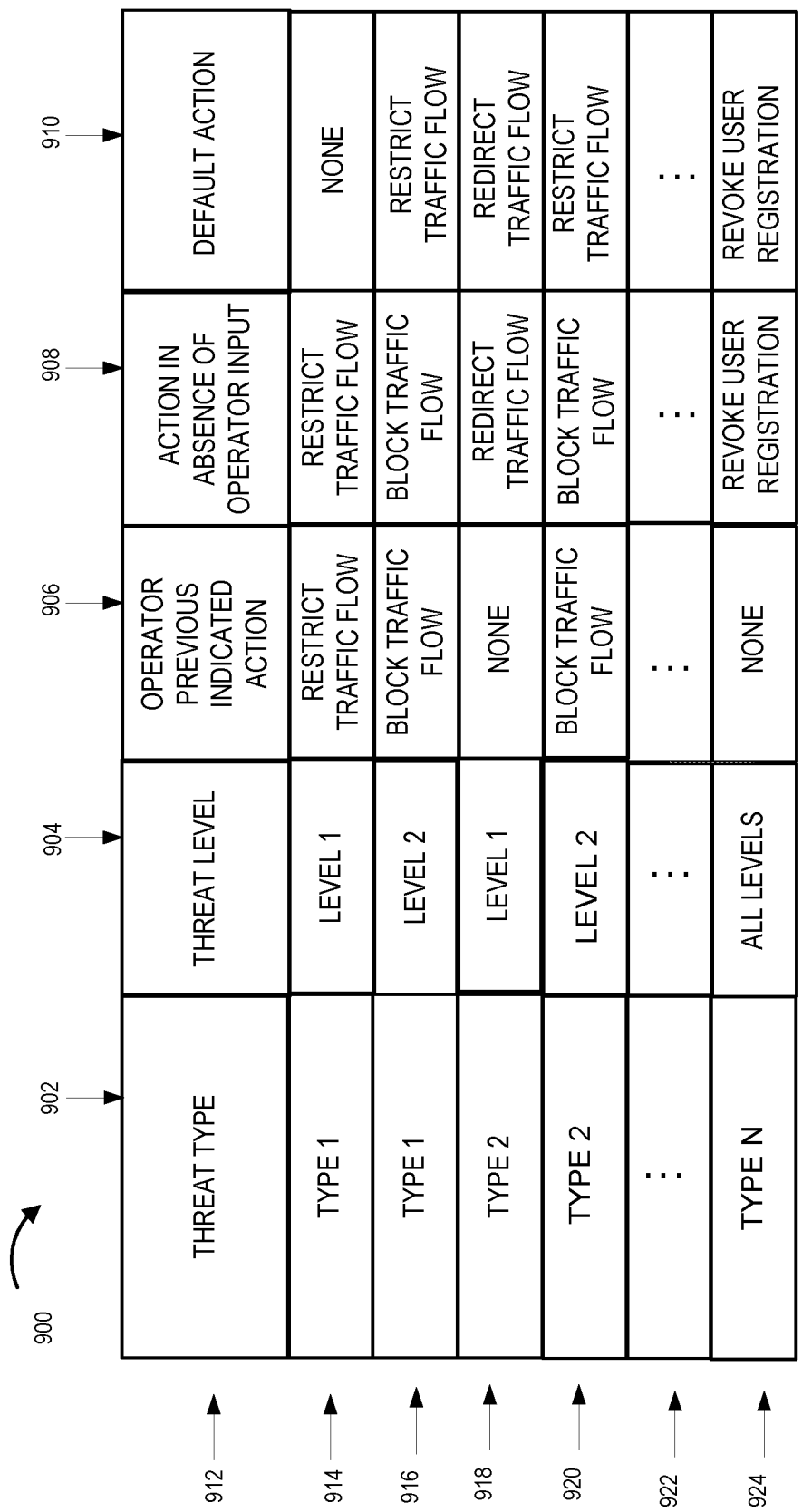
FIG. 9 illustrates a set of exemplary records including information about threats of various types and actions for responding to and/or mitigating such threats.

FIG. 9 illustrates a table 900 including an exemplary set of threat information and action information in the form of records containing information correlating threat types, threat levels and corresponding actions to mitigate threats of the identified threat type and level. Row 912 contains headings identifying the data included in each column and is included for explanatory purposes. Each of the entries in rows 914, 916, 918, 920 and 924 contains information associating a threat type identified in the entries of column 902 with a threat level (e.g., severity level contained in the entries in column 904, operator previously indicated action contained in the entries of column 906, action to be taken in absence of operator input contained in the entries of column 908, and the default action to be taken is contained in the entries of column 910. For example, the type 1 threat (entry column 902, row 914) having a threat level of level 1 (entry column 904, row 914) has a operator previously indicated mitigation action to be taken of restrict traffic flow (e.g., corresponding to the threat) (entry column 906, row 914), an action to be taken in absence of operator input of restrict traffic flow (entry column 908, row 914), and a default action to be take in response to a threat of type 1 have a threat level of level of none indicated no default actions to be taken (entry column 910, row 914). The threat types, levels and actions are merely exemplary and are used for illustrative purposes. The threat type 902 identifies a specific threat type and may, and in some embodiments does, include sufficient information so that multiple threats of the same general type are distinguished based on the traffic flows, source and/or destination or other identifying factors. For example, a robo call threat of type 1 may correspond to robo calls being placed from a specific telephone number or source or may be more generally robo calls emanating from a trunk group or group of source identifiers. The level of threat corresponds to the severity of the threat on the system or a portion of the system's performance and/or the effect on one or more subscribers of the system. For example, a denial of service attack threat can escalate as the quality of service and ability to provide services in the system escalates. The operator previous indicated action is the stored mitigation action indicated to be taken by the operator in response to the corresponding threat type having the associated threat level. The default action is typically an action identified by the user prior to the system experiencing a threat of the corresponding type and level usually inputted at time of initialization of the system or addition of the threat type and level to the system. The action in absence of operator input is an automatic action to be taken by the system in response to a threat type and level indicated. Initially it will be the default action if a default action is specified for the threat type and level and then will become an operator previously indicated action once the operator has specified an action to be taken in response to the threat type and level indicated. If no default action is specified and no operator previous indicated action is specified for the threat type and threat level, the system will take no action but continue to operate and monitor the threat and key performance indicators related to the threat. The information in table 900 is stored in a storage device, e.g., the analytics database system 808 of system 800 and/or in memory of the nodes (e.g., node 1 810, node 2 812, . . . , node N 814 of system 800) executing applications for detecting and mitigating threats in the communications systems (e.g., system 800). In some embodiments, upon detection of a threat and identification of the threat type based on traffic instances, characteristics or patterns, the node executing threat detection and mitigation application which detected the threat will reference the table 900 to determine what if any action (e.g. policy update) is to be taken in response to the detected threat based on the threat level determined. The node executing the threat detection and mitigation application that detected the threat will also update the information in the table to reflect actions taken and operator indicated actions taken. In some embodiments, the operator will specify when inputting an action whether it should replace an operator previous indicated action in the table or not thereby giving control to the operator on which actions are to be "learned" by the system. In some embodiments, the operator previous indicated action will be updated only if the action taken is determined by the system, e.g., the threat detection and mitigation application, that is monitoring the threat to have reduced the threat level by a greater amount than the operator previous indicated action currently stored in the table. The threat level is determined based on the key performance indicators regarding the threat and its current effect on the system and/or subscriber(s). The " . . . " in each of the columns of row 922 is a representation that table extends on with additional threat types, levels, operator previously indicated actions, actions in absence of operator inputs and default actions.

Row 916 of table 900 associates the threats of type 1 (entry column 902, row 916) with a threat level of level 2 (entry column 904, row 916) with operator previous indicated action of block traffic flow corresponding to the detected threat (entry column 906, row 916), action in absence of operator input of block traffic flow corresponding to the detected threat (entry column 908, row 916) and a default action of restrict traffic flow (entry column 910, row 916).

Row 918 of table 900 associates the threats of type 2 (entry column 902, row 918) with a threat level of level 1 (entry column 904, row 918) with operator previous indicated action of none corresponding to the detected threat (entry column 906, row 918), action in absence of operator input of redirect traffic flow corresponding to the detected threat (e.g., to a voice mail system) (entry column 908, row 918) and a default action of redirect traffic flow corresponding to the detected threat (e.g., to a voice mail system) (entry column 910, row 918). Note that in this example, as the operator previous indicated action is none when an action in absence of operator input is to be implemented the default action is used.

Row 920 of table 900 associates the threats of type 2 (entry column 902, row 920) with a threat level of level 2 (entry column 904, row 920) with operator previous indicated action of block traffic flow corresponding to the detected threat (entry column 906, row 920), action in absence of operator input of block traffic flow corresponding to the detected threat (entry column 908, row 920) and a default action of restrict traffic flow corresponding to the threat (entry column 910, row 920).

The " . . . " in each of the columns of row 922 is a representation that table extends on with additional threat types, levels, operator previously indicated actions, actions in absence of operator inputs and default actions.

Row 924 of table 900 associates the threats of type N (entry column 902, row 924) all threat levels (entry column 904, row 924) with operator previous indicated action of none (entry column 906, row 924), action in absence of operator input revoke user registration corresponding to the threat (entry column 908, row 924) and a default action of revoke user registration corresponding to the threat (entry column 910, row 924).

As previously discussed the threat types, levels and actions of table 900 are exemplary in nature and are provided for illustrative purposes.

Figure 11:
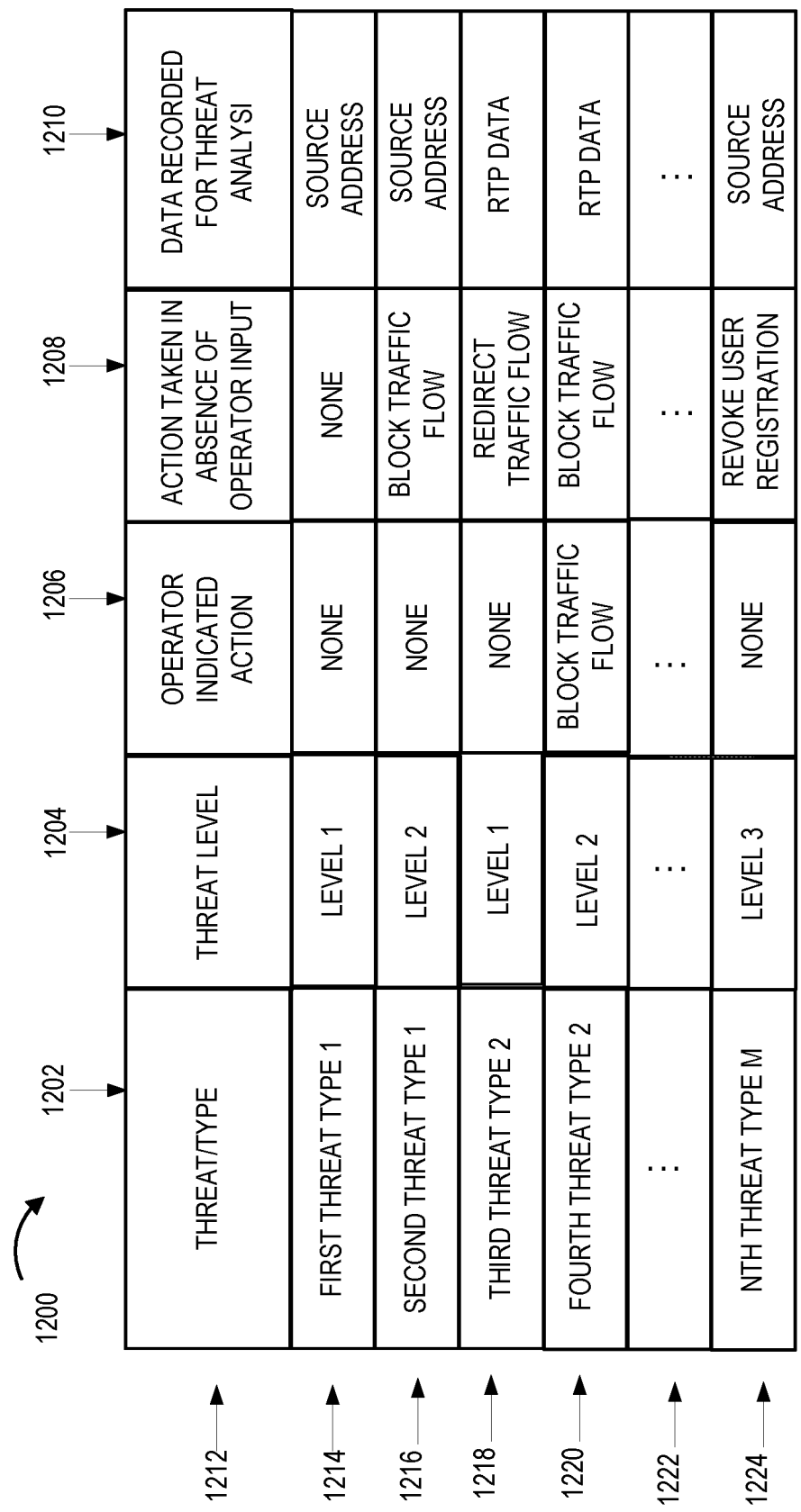
FIG. 11 illustrates a set of exemplary records including information about threats of various types which have been detected by the system and actions taken in response to the detected threats.

FIG. 11 illustrates a table 1200 including an exemplary set of threat information and action information in the form of records containing information correlating detected threats by threat type and threat level with the corresponding actions to be taken to mitigate the detected threat. Row 1212 contains headings identifying the data included in each column and is included for explanatory purposes. Each of the entries in rows 1214, 1216, 1218, 1220 and 1224 contains information corresponding to a detected threat having a type identified in the entries of threat/type column 1202 with a threat level, e.g., severity level contained in the entries in column 1204, operator indicated action in response to notification of the threat contained in the entries of column 1206, action to be taken in absence of operator input contained in the entries of column 1208, and an exemplary data recorded for analysis of the threat and/or mitigation of the threat by the actions taken column 1210. For example, the first threat detected has is a type 1 threat (entry column 1202, row 1214) having a threat level of level 1 (entry column 1204, row 1214) for which an operator did not input an indicated mitigation action to be taken and hence it includes operator indicated action of none (entry column 1206, row 1214), an action to be taken in absence of operator input of none (entry column 1208, row 1214), and data recorded for threat analysis being indicated as the source address of the threat (entry column 1210, row 1214). The threat/types, levels, actions and data recorded or stored for threat analysis are merely exemplary and are used for illustrative purposes. The threat/type 1202 identifies a specific detected threat along with the type of threat, e.g., a robo call threat of type 1 being for instance a robo call threat from a specific source address. As previously explained the level of threat corresponds to the severity of the threat on the system or a portion of the system's performance and/or the effect on one or more subscribers of the system. The operator indicated action is the stored mitigation action indicated to be taken by the operator in response to a notification sent to the operator in response to the detection of the first threat of the first type. The action in absence of operator input is an automatic action to be taken by the system in response to the first threat and is typically determined by matching the threat type and level to information in table 900 and identifying the action to be taken in absence of operator input. The information in table 1200 is stored in a storage device, e.g., the analytics database system 808 of system 800 and/or in memory of the nodes (e.g., node 1 810, node 2 812, . . . , node N 814 of system 800) executing applications for detecting and mitigating threats in the communications systems (e.g., system 800). In some embodiments, upon detection of a threat and identification of the threat type based on traffic instances, characteristics or patterns, the node executing threat detection and mitigation application which detected the threat will reference the table 900 to determine what if any action (e.g. policy update) is to be taken in response to the detected threat based on the threat level determined.

The node executing the threat detection and mitigation application that detected the threat will also update the information in the table 1200 to reflect automatic actions taken and operator indicated actions taken in response to detected threats. In some embodiments, the operator will specify when inputting an action whether the inputted action should replace an operator's previously indicated action in the table or not thereby giving control to the operator on which actions are to be "learned" by the system. In some embodiments, the operator's previous indicated action will be updated only if the action taken is determined by the system, e.g., the threat detection and mitigation application, that is monitoring the threat to have reduced the threat level by a greater amount than the operator's previous indicated action currently stored in the table reduced similar threats of the same type and level.

The threat level is determined in some embodiments based on key performance indicators corresponding to the threat and threat's current effect on the system, system traffic, system devices/nodes and/or subscriber(s) of the system.

Row 1216 of table 1200 associates the second detected threat of type 1 (entry column 1202, row 1216) with a threat level of level 2 (entry column 1204, row 1216) with operator indicated action of none (entry column 906, row 916) meaning the operator did not input an action to be taken in response to notification of the detection of the second threat of type 1, action in absence of operator input of block traffic flow corresponding to the detected threat which was taken (entry column 1208, row 1216) and a data recorded and stored for threat analysis and effect of mitigation action being source address (entry column 1210, row 1216).

Row 1218 of table 1200 associates the third detected threat which is type 2 threat (entry column 1202, row 1218) with a threat level of level 1 (entry column 1204, row 1218) with operator indicated action of none (entry column 1206, row 1216) meaning the operator did not input an action to be taken in response to notification of the detection of the third threat of type 2, action in absence of operator input of redirect traffic flow (e.g., to a voicemail system) corresponding to the detected threat which was taken (entry column 1208, row 1218) and data recorded and stored for threat analysis and effect of mitigation action being RTP data from the traffic flow (entry column 1210, row 1218).

Row 1220 of table 1200 associates the fourth detected threat which is a type 2 threat (entry column 1202, row 1220) with a threat level of level 2 (entry column 1204, row 1220) with operator indicated action of block traffic flow (entry column 1206, row 1216) meaning the operator inputted an action to be taken in response to notification of the detection of the fourth threat of type 2, action in absence of operator input of block traffic flow corresponding to the detected threat which was taken as the operator input was received after a predetermined time the expiry of which resulted in an automatic action to be taken (entry column 1208, row 1220) and data recorded and stored for threat analysis and effect of mitigation action being RTP data (entry column 1210, row 1220). In this example, in the entries in row 1220 the operator indicated action was entered after the expiration of a predetermined time the expiration of which led to the automated action identified in column 1208 row 1220 entry. This automated action is the same as the operator indicated action so no change needed to be made after the operator indicated action was inputted. If the operator indicated action was to restrict the traffic flow (e.g., the bandwidth amount) but not block it the system would have responded and modified the action being implemented in response to the fourth threat.

The " . . . " in each of the columns of row 1222 is a representation that table extends on with additional threat types, levels, operator previously indicated actions, actions in absence of operator inputs and default actions.

Row 1224 of table 1200 associates the Nth detected threat which is type M threat (entry column 1202, row 1224) with a threat level of level 3 (entry column 1204, row 1224) with operator indicated action of none (entry column 1206, row 1224) meaning the operator did not input an action to be taken in response to notification of the detection of the Nth threat of type M, action in absence of operator input of revoke user registration corresponding to the detected threat which was taken (entry column 1208, row 1224) and data recorded and stored for threat analysis and effect of mitigation action being source address of the traffic flow or messages corresponding to the threat (entry column 1210, row 1224). In this example, the revoke user registration action is determined by matching the threat N type M to the correct entry in the table 900 which is the row 924 and implementing the corresponding action to be taken in absence of operator input in response to the notification of the threat.

As previously discussed the threats, types, levels, actions and data recorded and stored for threat and mitigation analysis of table 1200 are exemplary in nature and are provided for illustrative purposes. In most embodiments, the table is updated each time a threat is detected and each time an action is taken or when the operator fails to indicate an action to be taken in a predetermined time period.

In some embodiments, the tables 900 and 1200 also include additional columns for additional information tracked in connection with threats and actions to be taken in response to the threats. For example, in some embodiments the table 900 includes an additional column indicating the alarm information to be included in notifications to the operator of the threat, e.g., alarm data in the API calls to a SIEM system. The table 1200 similarly in some embodiments includes an additional column of information which tracks the information sent out in each notification to the operator.

In some embodiments, the actions to be taken in response to threats are also based on additional factors which may be, and sometimes are, included in the table 900 such as for example the day (regular work day, weekend or holiday day) the threat is detected, time of day threat detected, or service contracts, e.g., guaranteed Quality of Service), affected by the detected threat.

As discussed above, some prior approaches to anomaly detection and/or mitigation include tools which allow for the monitoring of the network coupled with human decision making and changing policies. Furthermore, there are some Security Information and Event Management frameworks that perform monitoring and sometimes policy enforcement. However, the current invention addresses the aforementioned problems with these approaches by providing a novel closed loop system for Unified Communications (UC) systems in which knowledge learned during monitoring is programmatically coupled into actions, e.g., enforcement actions which results in new knowledge and updated actions in a continuously evolving cycle.

This closed loop approach applied to Unified Communications provides numerous advantageous over prior systems. First, the complexity of a UC solution makes it extremely difficult, if not impossible in some situations, for human operators to understand the interactions of the system and to identify, detect and/or classify anomalies. This requires a level of UC awareness that cannot be provided by existing SIEM solutions since they consider low-level, generic events. Traffic flows which might be clearly anomalous from a UC perspective will generally look like very normal IP flows en mass. For example, the calls from a robocaller are all part of the same IP packet flow with the legitimate calls from the upstream peer. Second, UC attacks often evolve at a rapid rate. A static solution involving a human-interaction for mitigation through policy will only be effective for the short time before the threat is tweaked or modified. Coupled with the lengthy time to detect and involve human decision-making in the first place, the overall period of mitigation results in an unacceptably low portion of the threat window. In contrast, various embodiments of the present invention use a closed loop approach that overcomes these problems by providing for automatic evaluation of the effect of mitigation actions implemented to address the original detected problem and to make subsequent adjustments to fine tune the mitigation actions. This happens at the speed of the automated feedback loop which is orders of magnitude faster than a human-involved loop.

Numbered List of Exemplary Method Embodiments

Method Embodiment 1. A method of operating a communication system, the method comprising: processing at a first node executing an application for threat detection and mitigation, a first set of traffic data including information about system traffic corresponding to a first time period, one or more pieces of data in said first data set being provided by sensors or sensor enforcer nodes monitoring traffic; detecting, based on the first set of traffic data, a first set of traffic instances which are found to be a first threat of a first type; notifying an operator of the first threat; monitoring to detect a response from the operator indicating an action to be taken in the system in response to the first threat; and in response to detecting an operator indicated action to be taken in response to the first threat, implementing said action; in response to failing to detect an operator indicated action to be taken in response to the first threat within a predetermined time, continuing system operation without taking an action in response to the first threat; and storing information about the first threat of the first type and any action taken in response to the first threat of the first type.

Method Embodiment 1A. The method of method embodiment 1, further comprising: in response to detecting an operator indicated action to be taken in response to the first threat determining a policy change to be implemented to enforce the operator indicated action and communicating the policy change to one or more enforcement nodes or sensor enforcer nodes.

Method Embodiment 1B. The method of method embodiment 1A wherein detecting, based on the first set of traffic data, a first set of traffic instances which are found to be a first threat of a first type includes detecting one or more sets of the following traffic instances corresponding to a subscriber or a device: mismatches in traffic characteristics corresponding to the subscriber or the device (e.g. traffic belonging to or corresponding to a single subscriber or user equipment device having average call duration (ACD) traffic characteristics indicative of an enterprise system or Private Branch Exchange); call or session control signaling (e.g., SIP signaling) traffic corresponding to the subscriber or the device identified as containing known bad actor indicator elements (e.g., the User-Agent contains a string for software commonly used for hacking); uncommon characteristics identified on a per message basis in a set of messages corresponding to the subscriber or device (e.g., INVITE messages are typically large but the other messages in a signaling setup are typically small with no message bodies); traffic containing communications system level violations from the subscriber or the device (e.g., an access subscriber attempting to place a call without registering); traffic from the subscriber or device containing requests inconsistent with a known past state corresponding to the subscriber or the device (e.g., receiving a refresh register request from a different device than the device that initially created a registration for an Address of Record (AOR) included in the refresh register request).

Method Embodiment 1C. The method of method embodiment 1B further comprising: in response to failing to detect an operator indicated action to be taken in response to the first threat of the first type within a second predetermined time following said first predetermined time: determining an automatic action or operator instructed action to be taken based on a stored set of threat information and action information indicating an automatic action or operator instructed action to be taken in response to a previous threat of the first type; automatically determining a policy change to be implemented to enforce the determined action to be taken; communicating the policy change to be implemented to the sensor enforcer devices and enforcement devices in the communications system.

Method Embodiment 1D. The method of method embodiment 1C wherein said determined action to be taken in response to said first threat of a first type includes adding a source IP block to the sensor enforcer devices and enforcement devices of the communications system, said source IP block corresponding to an IP address of the device which was the source of the traffic corresponding to the set of traffic instances upon which the detection of the first threat was detected.

Method Embodiment 1E. The method of method embodiment 1D, wherein said sensor enforcer devices and enforcement devices including firewall devices and SBC devices deployed at access points on the edge of the communication system.

Method Embodiment 2. The method of method embodiment 1, further comprising: processing at the first node a second set of traffic data including information about system traffic corresponding to a second time period, said second time period following said first time period;

detecting, based on the second set of traffic data, a second set of traffic instances which are found to be a second threat of the first type; checking the stored set of threat information and action information indicating an automatic action or operator instructed action to be taken in response to a previous threat of the first type; and automatically taking the automatic or operator instructed action, if any, in the stored information matching the threat of the first type in response to detecting the second threat of the first type.

Method Embodiment 3. The method of method embodiment 2, further comprising: notifying the operator of the second threat; monitoring to detect a response from the operator indicating an action to be taken in response to the second threat.

Method Embodiment 4. The method of method embodiment 3, further comprising: in response to detecting an operator indicated action to be taken in response to the second threat, implementing the operator indicated action.

Method Embodiment 5. The method of method embodiment 4, further comprising: updating the stored information corresponding to the first type of threat to indicate the operator specified action to be taken in response to threats of the first type.

Method Embodiment 6. The method of method embodiment 3, further comprising: in response to failing to detect an operator indicated action to be taken in response to the second threat in a predetermined time, checking to determine if the second threat corresponds to an increased rate of threats of the first type (e.g., a shorter time between detection of threats of the first type) or an increased level of threat (e.g., due to the severity of the threat); and if the detected threat corresponds to an increased rate of threats or an increased level of threats taking an automated action in response to the second threat in the absence of operator input.

Method Embodiment 6A. The method of method embodiment 6, wherein taking an automated action in response to the second threat in the absence of operator input includes: checking the stored set of threat information and action information indicating an automatic action or operator instructed action to be taken in response to a previous threat of the first type having the same or a greater increased rate of threats of the first type or the same or a lesser level of threat of the first type (e.g., same or lesser severity level of threat for a threat of the first type); and automatically taking the automatic or operator instructed action, if any, in the stored information matching the second threat of the first type in response to detecting the second threat of the first type, said automatically taking the automatic or operator instructed action including: automatically determining a policy change to be implemented to enforce the determined action to be taken, communicating the policy change to be implemented to the sensor enforcer nodes and enforcement nodes in the communications system; and implementing the policy change at the sensor enforcer nodes and the enforcement nodes.

Method Embodiment 7. The method of method embodiment 1, wherein said sensor enforcer nodes operate as both sensors that monitor traffic and enforcement devices that enforce policy.

Method Embodiment 7A. The method of method embodiment 7, wherein said sensor enforcer nodes include firewall devices, Session Border Controllers, Private Branch Exchanges (PBXes), application servers, equipment executing endpoint security applications, and configurable switches (e.g., Software Defined Network (SDN) switches such as for example OpenFlow switches).

Method Embodiment 7B. The method of method embodiment 7A, wherein said enforcement policy includes controlling the flow of traffic in the system in accordance with policy rules or directives.

Method Embodiment 7B1. The method of method embodiment 7A, wherein said enforcement policy includes one or more of the following: (i) controlling the flow of traffic in the system in accordance with policy rules or directives and (ii) revoking or restricting user or endpoint equipment privileges (e.g., revoking a Session Initiation Protocol registration) in accordance with policy rules or directives.

Method Embodiment 7C. The method of method embodiment 7, wherein at least one of said sensor enforcer nodes is a Session Border Controller that performs as a sensor to detect and report registration failures on a traffic flow and also performs as an enforcement device by applying an Access Control List to block the traffic flow in response when instructed to block the traffic flow.

Method Embodiment 8. The method of method embodiment 1, wherein said first set of traffic data including information about system traffic corresponding to a first time period includes application level protocol specific information.

Method Embodiment 8A. The method of method embodiment 8, wherein said application level protocol specific information includes Session Initiation Protocol information.

Method Embodiment 8AA. The method of method embodiment 8, wherein said application level protocol specific information includes a quality of session metric based on one or more of the following: number of packets exchanged, packet loss, loss rate, discard rate due to late arrival of packets, burst density gap, gap durations, Mean Opinion Score (MOS) score, Rx factor, jitter, round-trip-time, and number of consecutive packet losses for packet loss periods experienced during the session.

Method Embodiment 8B. The method of method embodiment 8A, wherein said first set of traffic data also includes data link layer and physical layer information.

Method Embodiment 8C. The method of method embodiment 8, wherein said first set of traffic data includes Real-time Transport Protocol (RTP) application meta-data and raw data and Real-time Transport Control Protocol (RTCP) application meta-data and raw data.

Method Embodiment 8C1. The method of method embodiment 8C, wherein said RTP raw data consists of RTP packets included in the first set of traffic data; wherein said RTP meta-data is data describing an RTP stream (e.g., an RTP stream to which at least some of said RTP raw data corresponds); wherein said RTCP raw data consists of RTCP packets included in the first set of traffic data; wherein said RTCP meta-data is data describing an RTCP stream (e.g., an RTCP stream to which at least some of said RTCP raw data corresponds).

Method Embodiment 8C2. The method of method embodiment 8C1, wherein said RTCP meta-data include one or more of the following: counts of RTCP packets and counts of RTCP streams; wherein said RTP meta-data includes counts of RTP packets, counts of RTP packet streams, rates, jitter, loss, partner pairs corresponding to RTP packets of a RTP packet stream.

Method Embodiment 8D. The method of method embodiment 1, wherein said sensors include at least one of: a Session Initiation Protocol (SIP) proxy or an Application Programming Interface (API) gateway.

Method Embodiment 8E. The method of method embodiment 1, wherein said first set of traffic data includes call data record information.

Method Embodiment 9. The method of method embodiment 1, wherein said communications system is a Unified Communications system; and wherein said application for threat detection and mitigation is an integral part of a security framework of the Unified Communications system and not an independent application separate from the security framework of the Unified Communications system.

Method Embodiment 9A. The method of method embodiment 1, wherein said communications system comprises an ecosystem including the application for threat detection and mitigation, said application for threat detection and mitigation not being independent of said ecosystem.

Method Embodiment 9AA. The method of method embodiment 1, wherein said first node and said application for threat detection and mitigation executing on said first node are an integral part of an ecosystem formed by said communications system, said application for threat detection and mitigation being in a trusted relationship with other applications included in said ecosystem and not being independent of said ecosystem.

Method Embodiment 9AAA. The method of method embodiment 1, wherein said application for threat detection and mitigation is a subroutine or component of another application of the communications system and not an independent application.

Method Embodiment 9B. The method of method embodiment 1 wherein said first node includes a plurality of applications, one of said plurality of applications being said application for threat detection and mitigation.

Method Embodiment 9B1. The method of method embodiment 9B, wherein said application for said threat detection and mitigation is one of the following: a robocall detection and mitigation application, a fraud detection and mitigation application, an International Revenue Share Fraud (IRSF) threat detection and mitigation application, a Premium-rate Revenue Share Fraud (PRSF) threat detection and mitigation application, a service theft detection and mitigation application, a key performance indicator monitoring application, a traffic analyzer for historical analysis application, a telephony denial of service application.

Method Embodiment 9B2. The method of method embodiment 9B1, wherein said plurality of applications includes more than one application for threat detection and mitigation.

Method Embodiment 9B3. The method of method embodiment 9B2, wherein said plurality of applications further include one or more applications which are not applications for threat detection and mitigation.

Method Embodiment 9C. The method of method embodiment 9, 9A, 9AA, 9AAA or 9B, wherein said application for threat detection and mitigation is a separate licensable component which is only operational upon receipt of an indication of an active license.

Method Embodiment 10. The method of method embodiment 1, wherein said detecting, based on the first set of data, a first set of traffic instances which are found to be a first threat of a first type includes determining if the first set of traffic instances contains a set of characteristics or patterns that match a set of characteristics or patterns which are indicative of a threat of the first type.

Method Embodiment 10A. The method of method embodiment 10, wherein said set of characteristics or patterns are one of the following: a predetermined set of characteristics or patterns stored in memory prior to the start of processing the first set of data traffic at the first node executing the application for threat detection and mitigation, a set of characteristics or patterns configured by the operator or a user (e.g., user configures an amount and/or type of data that can be transferred from each of the devices owned or operated by the user, user configures type of services that each of the devices owned or operated by the user), and a set of characteristics learned adaptively by the application for threat detection and mitigation (e.g., by generating a traffic pattern profile for a user or device and detecting when traffic corresponding to the user or the device is not in conformance with said generated traffic pattern profile for said user or said device.)

Method Embodiment 10AA. The method of method embodiment 10, wherein at least some of said characteristics or patterns are: (i) known in advance of the deployment of the application for threat detection and mitigation (e.g., predetermined characteristics or patterns stored in memory or included in instructions of the application for threat detection and management, (ii) configured by the operator or a user of the system, and/or (iii) learned adaptively by the application for threat detection and management through analysis of traffic data (e.g., generation and use of a user or user equipment traffic profile).

Method Embodiment 10A1. The method of method embodiment 10, wherein when the first set of traffic instances does contain a set of characteristics or patterns that match the set of characteristics or patterns which are indicative of a threat of the first type determining that a first threat of the first type has been detected and wherein when the first set of traffic instances does not contain a set of characteristics or patterns that match the set of characteristics or patterns which are indicative of a threat of the first type determining that first set of traffic instances do not constitute a threat of the first type.

Method Embodiment 10B. The method of method embodiment 10, wherein said first type of threat is a robo-call type of threat and wherein said set of characteristics or patterns which are indicative of the robo-call type of threat is an Answer Seizure Ratio (ASR) for calls originated from the same source being below a first threshold coupled with a percentage of calls of short duration being above a second threshold (e.g., calls originated from the same source wherein the ratio of successfully connected calls to attempted calls is very low (e.g., below 20%), and a high percentage of the calls which were completed being short in duration (e.g., above 90%).

Method Embodiment 10B1. The method of method embodiment 10B, wherein said first threshold, said short duration and said second threshold are configurable values.

Method Embodiment 10B2. The method of method embodiment 10B1, wherein said first threshold is configured to be 20%;

wherein said short duration is configured to be 6 seconds or less; and wherein said second threshold percentage is configured to be 90%.

Method Embodiment 10C. The method of method embodiment 10B, wherein said first set of data is a set of call detail records.

Method Embodiment 10D. The method of method embodiment 10, wherein said first type of threat is a Wangiri type fraud traffic threat and wherein said set of characteristics or patterns which are indicative of the Wangiri type fraud traffic threat are patterns of calls from a premium charge telephone number that are one ring and then drop.

Method Embodiment 10E. The method of method embodiment 10, wherein said first type of threat is an exfiltration attempt traffic threat and wherein said set of characteristics or patterns which are indicative of the exfiltration attempts traffic threat include traffic being communicated from an address including an amount of data in excess of an authorized amount for the address or not characteristic for the service being employed (e.g., Voice Over Internet Protocol (VOIP) call service with bandwidth usage of the VOIP channel far exceeding that of a typical VOIP call which is indicative of the VOIP channel being used for something other than VOIP call service such as for example, an unauthorized file transfer).

Method Embodiment 10F. The method of method embodiment 10, wherein said first type of threat is an abuse of service threat and wherein said set of characteristics or patterns which are indicative of the abuse of service threat include traffic characteristics or patterns which are outside an average or typical usage for said service.

Method Embodiment 10F1. The method of method embodiment 10F, wherein said service is Voice Over Internet Protocol (VOIP) call service and wherein said traffic characteristics or patterns which are outside the average or typical usage for said service is a bandwidth usage on a communication channel established for the VOIP call which is in excess of a threshold, said threshold being greater than the average or typical usage bandwidth for a VOIP call by a configurable amount. (e.g., if VOIP average or typical bandwidth usage is 100 kbps of bandwidth and the first set of data traffic shows that the VOIP call bandwidth usage is 1000 kbps, it is indicative of a threat that the VOIP channel is not being used for a VOIP call but instead is being used for another unauthorized purpose such as for example a file transfer, i.e., it is indicative of an exfiltration traffic threat).

Method Embodiment 11. The method of method embodiment 1, wherein said first threat of a first type is one of the following: robo-call traffic threat, exfiltration attempts traffic threat (i.e., attempts at unauthorized transfer of sensitive information), Wangiri type fraud traffic threat (e.g., one ring and drop fraud in which a fraudster places a call allows it to ring once then hangs up in an attempt to entice the recipient of call to call back a premium number resulting in a charge to the recipient, or fraudster leaves a message attempting to entice the recipient to call back a premium number resulting in a charge to the recipient (e.g., message regarding winning a prize or urgent need for help, etc.), International Revenue Share Fraud (IRSF) threat, Premium-rate Revenue Share Fraud (PRSF) threat (e.g., IRSF and PRSF threats occurring when an attacker compromises an entity (e.g., user device, PBX system or enterprise system that can generate calls), places a large volume of calls to a specific premium or international target number or range of numbers from the compromised entity and then shares in the proceeds received from the terminating operator for calling the premium or international target number or range of numbers), and a denial of service attack threat.

Method Embodiment 12. The method of method embodiment 1, wherein said action in response to said first threat is one of the following: changing a security setting (e.g., for a first traffic flow), blocking traffic of one or more traffic flows, limiting traffic of one or more traffic flows (e.g., bandwidth limit on a traffic flow), provide a specific level of Quality of Service (QOS) for one or more traffic flows, open a pin hole for traffic, close a pin hole for traffic, mirror or copy and forward packets of a traffic flow to another device for call analysis, tracing or lawful intercept, revoke one or more user privileges corresponding to one or more users (e.g., revoke a SIP registration corresponding to a user), restrict one or more user privileges corresponding to one or more users (e.g., restrict a user's access to one or more services and/or servers based on one or more IDs (e.g., SIP identifier, IMS identifier, telephone number, address of record (AOR) corresponding to the user), revoke privileges corresponding to an endpoint device (e.g., UE device (e.g., revoke a SIP registration corresponding a UE device)), restrict one or more privileges corresponding to a one or more endpoint devices (e.g., restrict a UE device's access to one or more services and/or servers (e.g., application servers)).

Method Embodiment 13. The method of method embodiment 1 further comprising: processing at a second node executing a second application for threat detection and mitigation, the first set of traffic data; detecting, based on the first set of traffic data, a second set of traffic instances which are found to be a second threat of a second type; notifying the operator of the second threat of the second type; monitoring to detect a response from the operator indicating an action to be taken in the system in response to the second threat of the second type; and in response to detecting an operator indicated action to be taken in response to the second threat of the second type, implementing said action; in response to failing to detect an operator indicated action to be taken in response to the second threat of the second type within the predetermined time, continuing system operation without taking an action in response to the second threat of the second type; and storing information about the second threat of the second type and any action taken in response to the second threat of the second type.

Method Embodiment 13A. The method of method embodiment 13, wherein said application executing on said first node is for detecting and mitigating robo-call threats and wherein said application executing on said second node is for detecting and mitigating Wangirie type fraud traffic threats.

Method Embodiment 14. The method of method embodiment 1, wherein said notifying an operator of the first threat of the first type includes sending a notification via a management Application Programming Interface (API) Gateway to one or more computing devices of the operator.

Method Embodiment 14A. The method of method embodiment 14, wherein said one or more computing devices of the operator includes one or more of the following: a computer, a mobile device, a smartphone, a laptop, and a tablet.

Method Embodiment 14B. The method of method embodiment 14A, wherein said notification includes one or more of the following: a text message presented on a display, a video message, an e-mail message, an audio message, the sounding of an alarm, communicating alarm data in the form of an Application Programming Interface (API) call to a Security Information and Event Management (SIEM) application executing on one of said computing devices of said operator.

Method Embodiment 14C. The method of method embodiment 1, wherein said notifying an operator of the first threat of the first type includes communicating alarm data in the form of an Application Programming Interface (API) call to a Security Information and Event Management (SIEM) application which is part of a security system receiving API calls from a plurality of different applications for threat detection and mitigation executing on a plurality of different nodes deployed in the communications system.

Method Embodiment 14A1. The method of method embodiment 14B, wherein said one or more computing devices of the operator is a plurality of computing devices and wherein said notification is sent to the plurality of computing devices, the form of the notification sent to each device being based on each device's capabilities.

Method Embodiment 14C. The method of method embodiment 14B, wherein said notification includes the severity of the threat and a list of actions that can be selected by the operator to be taken in response to the threat.

Method Embodiment 14D. The method of method embodiment 14C, wherein the list of actions is a list of actionable web links.

Method Embodiment 15. The method of method embodiment 14, wherein monitoring to detect a response from the operator indicating an action to be taken in the system in response to the first threat includes monitoring messages from the management API gateway for a response from the operator.

Method Embodiment 16. The method of method embodiment 1, wherein said information about the first threat of the first type and any action in response to the first threat of the first type is stored in a storage device included in or coupled to said first node.

Method Embodiment 16A. The method of method embodiment 16, wherein the storage device is a database system coupled to said first node.

Method Embodiment 16B. The method of method embodiment 16A wherein the database system is a Hadoop system or Hadoop cluster.

Method Embodiment 16C. The method of method embodiment 16A further comprising: using a device interface gateway to exchange data between said sensors and sensor enforcer devices and said database system.

Method Embodiment 17. The method of method embodiment 1, wherein the sensor, sensor enforcer nodes, and enforcer devices are distributed throughout the communications system, access to a network of the communications system (e.g., access for calls, VOIP calls, media sessions by UE devices) being controlled by the enforcer nodes and sensor enforcer nodes.

Method Embodiment 18. The method of method embodiment 1, wherein said first node is a compute node located in the cloud including a processor and being coupled to or including memory.

Method Embodiment 19. The method of method embodiment 1, wherein said first node including the application for said threat detection and mitigation executing on the first node is implemented as a virtual machine in the cloud.

Method Embodiment 20. The method of method embodiment 1, wherein said communications system is a Unified Communications system.

Method Embodiment 21. The method of method embodiment 1, wherein said monitoring traffic by said sensors and sensor enforcer devices is performed in a non-intrusive manner that does not affect call or session processing.

Method Embodiment 21A. The method of method embodiment 21, wherein said processing of the first set of traffic data is not performed as part of the call processing but performed separately and independently from said call processing.

Method Embodiment 21B. The method of method embodiment 21A, wherein said first set of traffic data includes application level traffic flow information obtained from authenticated and trusted devices.

Method Embodiment 22. The method of method embodiment 1 further comprising: generating, by the application for threat detection and mitigation, a traffic profile for a user based on the traffic data corresponding to the user for a configurable period of time; and wherein the first threat of the first type is traffic corresponding to the user which deviates from the generated traffic profile for the user.

Method Embodiment 23. The method of method embodiment 1 further comprising: detecting, based on the first set of traffic data, a second set of traffic instances which are found to be a second threat of a second type; notifying the operator of the second threat of the second type; monitoring to detect a response from the operator indicating an action to be taken in the system in response to the second threat of the second type; and in response to detecting an operator indicated action to be taken in response to the second threat of the second type, implementing said action; in response to failing to detect an operator indicated action to be taken in response to the second threat of the second type within the predetermined time, continuing system operation without taking an action in response to the second threat of the second type; and storing information about the second threat of the second type and any action taken in response to the second threat of the second type.

Method Embodiment 24. The method of method embodiment 23, further comprising: processing at the first node a second set of traffic data including information about system traffic corresponding to a second time period, said second time period following said first time period; detecting, based on the second set of traffic data, a third set of traffic instances which are found to be a second threat of the second type; checking the stored set of threat information and action information indicating an automatic action or operator instructed action to be taken in response to a previous threat of the second type; and automatically taking the automatic or operator instructed action, if any, in the stored information matching the threat of the first type in response to detecting the second threat of the second type.

Method Embodiment 25. The method of method embodiment 24, further comprising: notifying the operator of the second threat of the second type; monitoring to detect a response from the operator indicating an action to be taken in response to the second threat of the second type.

Method Embodiment 26. The method of method embodiment 25, further comprising: in response to detecting an operator indicated action to be taken in response to the second threat of the second type, implementing the operator indicated action.

Method Embodiment 27. The method of method embodiment 26, further comprising: updating the stored information corresponding to the second type of threat to indicate the operator specified action to be taken in response to threats of the second type.

Method Embodiment 28. The method of method embodiment 25, further comprising: in response to failing to detect an operator indicated action to be taken in response to the second threat of the second type in a predetermined time, checking to determine if the second threat of the second type corresponds to an increased rate of threats of the second type (e.g., a shorter time between detection of threats of the second type) or an increased level of threat (e.g., due to the severity of the threat); and if the detected threat corresponds to an increased rate of threats or an increased level of threats taking an automated action in response to the second threat of the second type in the absence of operator input.

Method Embodiment 29. The method of method embodiment 28, wherein taking an automated action in response to the second threat of the second type in the absence of operator input includes: checking the stored set of threat information and action information indicating an automatic action or operator instructed action to be taken in response to a previous threat of the second type having the same or a greater increased rate of threats of the second type or the same or a lesser level of threat of the second type (e.g., same or lesser severity level of threat for a threat of the second type); and automatically taking the automatic or operator instructed action, if any, in the stored information matching the second threat of the second type in response to detecting the second threat of the second type, said automatically taking the automatic or operator instructed action including: automatically determining a policy change to be implemented to enforce the determined action to be taken, communicating the policy change to be implemented to the sensor enforcer nodes and enforcement nodes in the communications system; and implementing the policy change at the sensor enforcer nodes and the enforcement nodes.

Method Embodiment 30. The method of method embodiment 1 wherein said first type of threat is one of a plurality of types of threats that the threat detection and mitigation application is configured to detect.

Method Embodiment 31. The method of method embodiment 13 wherein said first and second nodes are configured to detect a plurality of different types of threats.

Numbered List of Exemplary System Embodiments

System Embodiment 1. A communications system comprising: a first node including: one or more processors configured to control the operation of the first node to perform one or more threat detection and mitigation operations including: processing a first set of traffic data including information about system traffic corresponding to a first time period, one or more pieces of data in said first data set being provided by sensors or sensor enforcer nodes monitoring traffic; detecting, based on the first set of traffic data, a first set of traffic instances which are found to be a first threat of a first type; notifying an operator of the first threat; monitoring to detect a response from the operator indicating an action to be taken in the system in response to the first threat; and in response to detecting an operator indicated action to be taken in response to the first threat, implementing said action; in response to failing to detect an operator indicated action to be taken in response to the first threat within a first predetermined time, continuing system operation without taking an action in response to the first threat; and a storage device in which information about the first threat of the first type and any action taken in response to the first threat of the first type is stored.

System Embodiment 1A. The communications system of system embodiment 1, wherein said one or more threat detection and mitigation operations further include: in response to detecting an operator indicated action to be taken in response to the first threat: determining a policy change to be implemented to enforce the operator indicated action; and communicating the policy change to one or more enforcement nodes or sensor enforcer nodes.

System Embodiment 1B. The communication system of system embodiment 1A wherein said detecting, based on the first set of traffic data, a first set of traffic instances which are found to be a first threat of a first type includes detecting one or more sets of the following traffic instances corresponding to a subscriber or a device: mismatches in traffic characteristics corresponding to the subscriber or the device (e.g. traffic belonging to or corresponding to a single subscriber or user equipment device having average call duration (ACD) traffic characteristics indicative of an enterprise system or Private Branch Exchange); call or session control signaling (e.g., SIP signaling) traffic corresponding to the subscriber or the device identified as containing known bad actor indicator elements (e.g., the User-Agent contains a string for software commonly used for hacking); uncommon characteristics identified on a per message basis in a set of messages corresponding to the subscriber or device (e.g., INVITE messages are typically large but the other messages in a signaling setup are typically small with no message bodies); traffic containing communications system level violations from the subscriber or the device (e.g., an access subscriber attempting to place a call without registering); or traffic from the subscriber or device containing requests inconsistent with a known past state corresponding to the subscriber or the device (e.g., receiving a refresh register request from a different device than the device that initially created a registration for an Address of Record (AOR) included in the refresh register request).

System Embodiment 1C. The communications system of system embodiment 1B wherein said one or more threat detection and mitigation operations further include: in response to failing to detect an operator indicated action to be taken in response to the first threat of the first type within a second predetermined time following said first predetermined time: determining an automatic action or operator instructed action to be taken based on a stored set of threat information and action information indicating an automatic action or operator instructed action to be taken in response to a previous threat of the first type; automatically determining a policy change to be implemented to enforce the determined action to be taken; and communicating the policy change to be implemented to the sensor enforcer devices and enforcement devices in the communications system.

System Embodiment 1D. The communications system of system embodiment 1C wherein said determined action to be taken in response to said first threat of a first type includes adding a source IP block to the sensor enforcer devices and enforcement devices of the communications system, said source IP block corresponding to an IP address of the device which was the source of the traffic corresponding to the set of traffic instances upon which the detection of the first threat was detected.

System Embodiment 1E. The communications system of system embodiment 1D, wherein said sensor enforcer devices and enforcement devices include firewall devices and SBC devices deployed at access points on edge of the communication system.

System Embodiment 2. The communications system of system embodiment 1, wherein said one or more threat detection and mitigation operations further include: processing at the first node a second set of traffic data including information about system traffic corresponding to a second time period, said second time period following said first time period; detecting, based on the second set of traffic data, a second set of traffic instances which are found to be a second threat of the first type; checking the stored set of threat information and action information indicating an automatic action or operator instructed action to be taken in response to a previous threat of the first type; and automatically taking the automatic or operator instructed action, if any, in the stored information matching the threat of the first type in response to detecting the second threat of the first type.

System Embodiment 3. The communications system of system embodiment 2, wherein said one or more threat detection and mitigation operations further include: notifying the operator of the second threat; and monitoring to detect a response from the operator indicating an action to be taken in response to the second threat.

System Embodiment 4. The communications system of system embodiment 3, wherein said one or more threat detection and mitigation operations further include: in response to detecting an operator indicated action to be taken in response to the second threat, implementing the operator indicated action.

System Embodiment 5. The communications system of system embodiment 4, wherein said one or more threat detection and mitigation operations further include: updating the stored information corresponding to the first type of threat to indicate the operator indicated action to be taken in response to threats of the first type.

System Embodiment 6. The communications system of system embodiment 3, wherein said one or more threat detection and mitigation operations further include: in response to failing to detect an operator indicated action to be taken in response to the second threat in a third predetermined time, checking to determine if the second threat corresponds to an increased rate of threats of the first type (e.g., a shorter time between detection of threats of the first type) or an increased level of threat (e.g., due to the severity of the threat); and if the detected threat corresponds to an increased rate of threats or an increased level of threats taking an automated action in response to the second threat in the absence of operator input.

System Embodiment 6A. The communications system of system embodiment 6, wherein taking an automated action in response to the second threat in the absence of operator input includes: checking the stored set of threat information and action information indicating an automatic action or operator instructed action to be taken in response to a previous threat of the first type having the same or a greater increased rate of threats of the first type or the same or a lesser level of threat of the first type (e.g., same or lesser severity level of threat for a threat of the first type); and automatically taking the automatic or operator instructed action, if any, in the stored information matching the second threat of the first type in response to detecting the second threat of the first type, said automatically taking the automatic or operator instructed action including: automatically determining a policy change to be implemented to enforce the determined action to be taken; communicating the policy change to be implemented to the sensor enforcer nodes and enforcement nodes in the communications system; and implementing the policy change at the sensor enforcer nodes and the enforcement nodes.

System Embodiment 7. The communications system of system embodiment 1, wherein said sensor enforcer nodes operate as both sensors that monitor traffic and enforcement devices that enforce policy.

System Embodiment 7A. The communications system of system embodiment 7, wherein said sensor enforcer nodes include firewall devices, Session Border Controllers, Private Branch Exchanges (PBXes), application servers, equipment executing endpoint security applications, and configurable switches (e.g., Software Defined Network (SDN) switches such as for example OpenFlow switches).

System Embodiment 7B. The communications system of system embodiment 7A, wherein said enforcement policy includes controlling the flow of traffic in the system in accordance with policy rules or directives.

System Embodiment 7B1. The communications system of system embodiment 7A, wherein said enforcement policy includes one or more of the following: (i) controlling the flow of traffic in the system in accordance with policy rules or directives and (ii) revoking or restricting user or endpoint equipment privileges (e.g., revoking a Session Initiation Protocol registration) in accordance with policy rules or directives.

System Embodiment 7C. The communications system of system embodiment 7, wherein at least one of said sensor enforcer nodes is a Session Border Controller that performs as a sensor to detect and report registration failures on a traffic flow and also performs as an enforcement device by applying an Access Control List to block the traffic flow in response when instructed to block the traffic flow.

System Embodiment 8. The communications system of system embodiment 1, wherein said first set of traffic data including information about system traffic corresponding to a first time period includes application level protocol specific information.

System Embodiment 8A. The communications system of system embodiment 8, wherein said application level protocol specific information includes Session Initiation Protocol information.

System Embodiment 8AA. The communications system of system embodiment 8, wherein said application level protocol specific information includes a quality of session metric based on one or more of the following: number of packets exchanged, packet loss, loss rate, discard rate due to late arrival of packets, burst density gap, gap durations, Mean Opinion Score (MOS) score, Rx factor, jitter, round-trip-time, and number of consecutive packet losses for packet loss periods experienced during the session.

System Embodiment 8B. The communications system of system embodiment 8A, wherein said first set of traffic data also includes data link layer and physical layer information.

System Embodiment 8C. The communications system of system embodiment 8, wherein said first set of traffic data includes Real-time Transport Protocol (RTP) application meta-data and raw data and Real-time Transport Control Protocol (RTCP) application meta-data and raw data.

System Embodiment 8C1. The communications system of system embodiment 8C, wherein said RTP raw data consists of RTP packets included in the first set of traffic data; wherein said RTP meta-data is data describing an RTP stream (e.g., an RTP stream to which at least some of said RTP raw data corresponds); wherein said RTCP raw data consists of RTCP packets included in the first set of traffic data; and wherein said RTCP meta-data is data describing an RTCP stream (e.g., an RTCP stream to which at least some of said RTCP raw data corresponds).

System Embodiment 8C2. The communications system of system embodiment 8C1, wherein said RTCP meta-data include one or more of the following: counts of RTCP packets and counts of RTCP streams; and wherein said RTP meta-data includes counts of RTP packets, counts of RTP packet streams, rates, jitter, loss, partner pairs corresponding to RTP packets of a RTP packet stream.

System Embodiment 8D. The communications system of system embodiment 1, wherein said sensors include at least one of: a Session Initiation Protocol (SIP) proxy or an Application Programming Interface (API) gateway.

System Embodiment 8E. The communications system of system embodiment 1, wherein said first set of traffic data includes call data record information.

System Embodiment 9. The communications system of system embodiment 1, wherein said communications system is a Unified Communications system; and wherein said application for threat detection and mitigation is an integral part of a security framework of the Unified Communications system and not an independent application separate from the security framework of the Unified Communications system.

System Embodiment 9A. The communications system of system embodiment 1, wherein said communications system comprises an ecosystem including the application for threat detection and mitigation, said application for threat detection and mitigation not being independent of said ecosystem.

System Embodiment 9AA. The communications system of system embodiment 1, wherein said first node and said application for threat detection and mitigation executing on said first node are an integral part of an ecosystem formed by said communications system, said application for threat detection and mitigation being in a trusted relationship with other applications included in said ecosystem and not being independent of said ecosystem.

System Embodiment 9AAA. The communications system of system embodiment 1, wherein said application for threat detection and mitigation is a subroutine or component of another application of the communications system and not an independent application.

System Embodiment 9B. The communications system of system embodiment 1 wherein said first node includes a plurality of applications, one of said plurality of applications being said application for threat detection and mitigation.

System Embodiment 9B1. The communications system of system embodiment 9B, wherein said application for said threat detection and mitigation is one of the following: a robocall detection and mitigation application, a fraud detection and mitigation application, an International Revenue Share Fraud (IRSF) threat detection and mitigation application, a Premium-rate Revenue Share Fraud (PRSF) threat detection and mitigation application, a service theft detection and mitigation application, a key performance indicator monitoring application, a traffic analyzer for historical analysis application, a telephony denial of service application.

System Embodiment 9B2. The communications system of system embodiment 9B1, wherein said plurality of applications includes more than one application for threat detection and mitigation.

System Embodiment 9B3. The communications system of system embodiment 9B2, wherein said plurality of applications further includes one or more applications which are not applications for threat detection and mitigation.

System Embodiment 9C. The communications system of system embodiment 9, 9A, 9AA, 9AAA or 9B, wherein said application for threat detection and mitigation is a separate licensable component which is only operational upon receipt of an indication of an active license.

System Embodiment 10. The communications system of system embodiment 1, wherein said detecting, based on the first set of data, a first set of traffic instances which are found to be a first threat of a first type includes determining if the first set of traffic instances contains a set of characteristics or patterns that match a set of characteristics or patterns which are indicative of a threat of the first type.

System Embodiment 10A. The communications system of system embodiment 10, wherein said set of characteristics or patterns are one of the following: a predetermined set of characteristics or patterns stored in memory prior to the start of processing the first set of data traffic at the first node executing the application for threat detection and mitigation, a set of characteristics or patterns configured by the operator or a user (e.g., user configures an amount and/or type of data that can be transferred from each of the devices owned or operated by the user, user configures type of services that each of the devices owned or operated by the user), and a set of characteristics learned adaptively by the application for threat detection and mitigation (e.g., by generating a traffic pattern profile for a user or device and detecting when traffic corresponding to the user or the device is not in conformance with said generated traffic pattern profile for said user or said device.)

System Embodiment 10AA. The communications system of system embodiment 10, wherein at least some of said characteristics or patterns are: (i) known in advance of the deployment of the application for threat detection and mitigation (e.g., predetermined characteristics or patterns stored in memory or included in instructions of the application for threat detection and management, (ii) configured by the operator or a user of the system, and/or (iii) learned adaptively by the application for threat detection and management through analysis of traffic data (e.g., generation and use of a user or user equipment traffic profile).

System Embodiment 10A1. The communications system of system embodiment 10, wherein when the first set of traffic instances does contain a set of characteristics or patterns that match the set of characteristics or patterns which are indicative of a threat of the first type determining that a first threat of the first type has been detected and wherein when the first set of traffic instances does not contain a set of characteristics or patterns that match the set of characteristics or patterns which are indicative of a threat of the first type determining that first set of traffic instances do not constitute a threat of the first type.

System Embodiment 10B. The communications system of system embodiment 10, wherein said first type of threat is a robo-call type of threat and wherein said set of characteristics or patterns which are indicative of the robo-call type of threat is an Answer Seizure Ratio (ASR) for calls originated from the same source being below a first threshold coupled with a percentage of calls of short duration being above a second threshold (e.g., calls originated from the same source wherein the ratio of successfully connected calls to attempted calls is very low (e.g., below 20%), and a high percentage of the calls which were completed being short in duration (e.g., above 90%).

System Embodiment 10B1. The communications system of system embodiment 10B, wherein said first threshold, said short duration and said second threshold are configurable values.

System Embodiment 10B2. The communications system of system embodiment 10B1, wherein said first threshold is configured to be 20%; wherein said short duration is configured to be 6 seconds or less; and wherein said second threshold percentage is configured to be 90%.

System Embodiment 10C. The communications system of system embodiment 10B, wherein said first set of data is a set of call detail records.

System Embodiment 10D. The communications system of system embodiment 10, wherein said first type of threat is a Wangiri type fraud traffic threat and wherein said set of characteristics or patterns which are indicative of the Wangiri type fraud traffic threat are patterns of calls from a premium charge telephone number that are one ring and then drop.

System Embodiment 10E. The communications system of system embodiment 10, wherein said first type of threat is an exfiltration attempt traffic threat and wherein said set of characteristics or patterns which are indicative of the exfiltration attempt traffic threat include traffic being communicated from an address including an amount of data in excess of an authorized amount for the address or not characteristic for the service being employed (e.g., Voice Over Internet Protocol (VOIP) call service with bandwidth usage of the VOIP channel far exceeding that of a typical VOIP call which is indicative of the VOIP channel being used for something other than VOIP call service such as for example, an unauthorized file transfer).

System Embodiment 10F. The communications system of system embodiment 10, wherein said first type of threat is an abuse of service threat and wherein said set of characteristics or patterns which are indicative of the abuse of service threat include traffic characteristics or patterns which are outside an average or typical usage for said service.

System Embodiment 10F1. The communications system of system embodiment 10F, wherein said service is Voice Over Internet Protocol (VOIP) call service and wherein said traffic characteristics or patterns which are outside the average or typical usage for said service is a bandwidth usage on a communication channel established for the VOIP call which is in excess of a threshold, said threshold being greater than the average or typical usage bandwidth for a VOIP call by a configurable amount. (e.g., if VOIP average or typical bandwidth usage is 100 kbps of bandwidth and the first set of data traffic shows that the VOIP call bandwidth usage is 1000 kbps, it is indicative of a threat that the VOIP channel is not being used for a VOIP call but instead is being used for another unauthorized purpose such as for example a file transfer, i.e., it is indicative of an exfiltration traffic threat).

System Embodiment 11. The communications system of system embodiment 1, wherein said first threat of a first type is one of the following: robo-call traffic threat, exfiltration attempt traffic threat (i.e., attempt at unauthorized transfer of sensitive information), Wangiri type fraud traffic threat (e.g., one ring and drop fraud in which a fraudster places a call allows it to ring once then hangs up in an attempt to entice the recipient of call to call back a premium number resulting in a charge to the recipient, or fraudster leaves a message attempting to entice the recipient to call back a premium number resulting in a charge to the recipient (e.g., message regarding winning a prize or urgent need for help, etc.), International Revenue Share Fraud (IRSF) threat, Premium-rate Revenue Share Fraud (PRSF) threat (e.g., IRSF and PRSF threats occurring when an attacker compromises an entity (e.g., user device, PBX system or enterprise system that can generate calls), places a large volume of calls to a specific premium or international target number or range of numbers from the compromised entity and then shares in the proceeds received from the terminating operator for calling the premium or international target number or range of numbers), and a denial of service attack threat.

System Embodiment 12. The communications system of system embodiment 1, wherein said action in response to said first threat is one of the following: changing a security setting (e.g., for a first traffic flow), blocking traffic of one or more traffic flows, limiting traffic of one or more traffic flows (e.g., bandwidth limit on a traffic flow), providing a specific level of Quality of Service (QOS) for one or more traffic flows, open a pin hole for traffic, closing a pin hole for traffic, mirroring or copying and forwarding packets of a traffic flow to another device for call analysis, tracing or lawfully intercepting, revoking one or more user privileges corresponding to one or more users (e.g., revoke a SIP registration corresponding to a user), restricting one or more user privileges corresponding to one or more users (e.g., restrict a user's access to one or more services and/or servers based on one or more IDs (e.g., SIP identifier, IMS identifier, telephone number, address of record (AOR) corresponding to the user), revoke privileges corresponding to an endpoint device (e.g., UE device (e.g., revoking a SIP registration corresponding a UE device)), restricting one or more privileges corresponding to a one or more endpoint devices (e.g., restrict a UE device's access to one or more services and/or servers (e.g., application servers)).

System Embodiment 13. The communications system of system embodiment 1 further comprising: a second node including one or more additional processors executing at a second application for threat detection and mitigation that control the second node to perform a second set of threat detection and mitigation operations including: processing the first set of traffic data; detecting, based on the first set of traffic data, a second set of traffic instances which are found to be a second threat of a second type; notifying the operator of the second threat of the second type; monitoring to detect a response from the operator indicating an action to be taken in the system in response to the second threat of the second type; and in response to detecting an operator indicated action to be taken in response to the second threat of the second type, implementing said action; in response to failing to detect an operator indicated action to be taken in response to the second threat of the second type within the predetermined time, continuing system operation without taking an action in response to the second threat of the second type; and storing information about the second threat of the second type and any action taken in response to the second threat of the second type.

System Embodiment 13A. The communications system of system embodiment 13, wherein said application executing on said first node is for detecting and mitigating robocall threats and wherein said application executing on said second node is for detecting and mitigating Wangiri type fraud traffic threats.

System Embodiment 14. The communications system of system embodiment 1, wherein said notifying an operator of the first threat of the first type includes sending a notification via a management Application Programming Interface (API) Gateway to one or more computing devices of the operator.

System Embodiment 14A. The communications system of system embodiment 14, wherein said one or more computing devices of the operator includes one or more of the following: a computer, a mobile device, a smartphone, a laptop, and a tablet.

System Embodiment 14B. The communications system of system embodiment 14A, wherein said notification includes one or more of the following: a text message presented on a display, a video message, an e-mail message, an audio message, the sounding of an alarm, communicating alarm data in the form of an Application Programming Interface (API) call to a Security Information and Event Management (SIEM) application executing on one of said computing devices of said operator.

System Embodiment 14B1: The communications system of system embodiment 14B, wherein said notification includes alarm data, said alarm data including key performance indicators of the network corresponding to the threat type, said key performance indicators having been identified by operator in prior requests for key performance indicator data in response to prior notifications of threats of the same type. In some embodiments said key performance indicators include Quality of Service indicators for traffic flows from a source address and/or a destination address of one or more traffic flows corresponding to a determined threat, call rates, link status information, and system performance throughout statistics for one or more devices and/or links affected by said determined threat.

System Embodiment 14C. The communications system of system embodiment 1, wherein said notifying an operator of the first threat of the first type includes communicating alarm data in the form of an Application Programming Interface (API) call to a Security Information and Event Management (SIEM) application which is part of a security system receiving API calls from a plurality of different applications for threat detection and mitigation executing on a plurality of different nodes deployed in the communications system.

System Embodiment 14A1. The communications system of system embodiment 14B, wherein said one or more computing devices of the operator is a plurality of computing devices and wherein said notification is sent to the plurality of computing devices, the form of the notification sent to each device being based on each device's capabilities.

System Embodiment 14C. The communications system of system embodiment 14B, wherein said notification includes the severity of the threat and a list of actions that can be selected by the operator to be taken in response to the threat.

System Embodiment 14D. The communications system of system embodiment 14C, wherein the list of actions is a list of actionable web links.

System Embodiment 15. The communications system of system embodiment 14, wherein monitoring to detect a response from the operator indicating an action to be taken in the system in response to the first threat includes monitoring messages from the management API gateway for a response from the operator.

System Embodiment 16. The communications system of system embodiment 1, wherein said information about the first threat of the first type and any action in response to the first threat of the first type is stored in a storage device included in or coupled to said first node.

System Embodiment 16A. The communications system of system embodiment 16, wherein the storage device is a database system coupled to said first node.

System Embodiment 16B. The communications system of system embodiment 16A wherein the database system is a Hadoop system or Hadoop cluster.

System Embodiment 16C. The communications system of system embodiment 16A further comprising: using a device interface gateway to exchange data between said sensors and sensor enforcer devices and said database system.

System Embodiment 17. The communications system of system embodiment 1, wherein the sensor, sensor enforcer nodes, and enforcer devices are distributed throughout the communications system, access to a network of the communications system (e.g., access for calls, VOIP calls, media sessions by UE devices) being controlled by the enforcer nodes and sensor enforcer nodes.

System Embodiment 18. The communications system of system embodiment 1, wherein said first node is a compute node located in the cloud including a processor and being coupled to or including memory.

System Embodiment 19. The communications system of system embodiment 1, wherein said first node including the application for said threat detection and mitigation executing on the first node is implemented as a virtual machine in the cloud.

System Embodiment 20. The communications system of system embodiment 1, wherein said communications system is a Unified Communications system.

System Embodiment 21. The communications system of system embodiment 1, wherein said monitoring traffic by said sensors and sensor enforcer devices is performed in a non-intrusive manner that does not affect call or session processing.

System Embodiment 21A. The communications system of system embodiment 21, wherein said processing of the first set of traffic data is not performed as part of the call processing but performed separately and independently from said call processing.

System Embodiment 21B. The communications system of system embodiment 21A, wherein said first set of traffic data includes application level traffic flow information obtained from authenticated and trusted devices.

System Embodiment 22. The communications system of system embodiment 1 wherein said one or more threat detection and mitigation operations further include: generating, by the application for threat detection and mitigation, a traffic profile for a user based on the traffic data corresponding to the user for a configurable period of time; and wherein the first threat of the first type is traffic corresponding to the user which deviates from the generated traffic profile for the user.

List of Numbered Exemplary Computer Readable Medium Embodiments

Computer Readable Medium Embodiment 1. A non-transitory computer readable medium including a first set of computer executable instructions which when executed by a processor of a node cause the node to: process a first set of traffic data including information about system traffic corresponding to a first time period, one or more pieces of data in said first data set being provided by sensors or sensor enforcer nodes monitoring traffic; detect, based on the first set of traffic data, a first set of traffic instances which are found to be a first threat of a first type; notify an operator of the first threat; monitor to detect a response from the operator indicating an action to be taken in the system in response to the first threat; and in response to detecting an operator indicated action to be taken in response to the first threat, implementing said action; in response to failing to detect an operator indicated action to be taken in response to the first threat within a first predetermined time, continuing system operation without taking an action in response to the first threat; and store in a storage device information about the first threat of the first type and any action taken in response to the first threat of the first type.

Computer Readable Medium Embodiment 1A. The computer readable medium of computer readable medium embodiment 1, wherein said one or more threat detection and mitigation operations further include: in response to detecting an operator indicated action to be taken in response to the first threat: determining a policy change to be implemented to enforce the operator indicated action; and communicating the policy change to one or more enforcement nodes or sensor enforcer nodes.

Computer Readable Medium Embodiment 1B

The computer readable medium of computer readable medium embodiment 1A wherein said detecting, based on the first set of traffic data, a first set of traffic instances which are found to be a first threat of a first type includes detecting one or more sets of the following traffic instances corresponding to a subscriber or a device: mismatches in traffic characteristics corresponding to the subscriber or the device (e.g. traffic belonging to or corresponding to a single subscriber or user equipment device having average call duration (ACD) traffic characteristics indicative of an enterprise system or Private Branch Exchange); call or session control signaling (e.g., SIP signaling) traffic corresponding to the subscriber or the device identified as containing known bad actor indicator elements (e.g., the User-Agent contains a string for software commonly used for hacking); uncommon characteristics identified on a per message basis in a set of messages corresponding to the subscriber or device (e.g., INVITE messages are typically large but the other messages in a signaling setup are typically small with no message bodies); traffic containing communications system level violations from the subscriber or the device (e.g., an access subscriber attempting to place a call without registering); or traffic from the subscriber or device containing requests inconsistent with a known past state corresponding to the subscriber or the device (e.g., receiving a refresh register request from a different device than the device that initially created a registration for an Address of Record (AOR) included in the refresh register request).

Computer Readable Medium Embodiment 1C

The computer readable medium of computer readable medium embodiment 1B wherein said one or more threat detection and mitigation operations further include: in response to failing to detect an operator indicated action to be taken in response to the first threat of the first type within a second predetermined time following said first predetermined time: determining an automatic action or operator instructed action to be taken based on a stored set of threat information and action information indicating an automatic action or operator instructed action to be taken in response to a previous threat of the first type; automatically determining a policy change to be implemented to enforce the determined action to be taken; and communicating the policy change to be implemented to the sensor enforcer devices and enforcement devices in the communications system.

Computer Readable Medium Embodiment 1D. The computer readable medium of computer readable medium embodiment 1C wherein said determined action to be taken in response to said first threat of a first type includes adding a source IP block to the sensor enforcer devices and enforcement devices of the communications system, said source IP block corresponding to an IP address of the device which was the source of the traffic corresponding to the set of traffic instances upon which the detection of the first threat was detected.

Computer Readable Medium Embodiment 1E. The computer readable medium of computer readable medium embodiment 1D, wherein said sensor enforcer devices and enforcement devices include firewall devices and SBC devices deployed at access points on edge of the communication system.

Computer Readable Medium Embodiment 2. The computer readable medium embodiment of computer readable medium embodiment 1, wherein said one or more threat detection and mitigation operations further include: processing at the first node a second set of traffic data including information about system traffic corresponding to a second time period, said second time period following said first time period; detecting, based on the second set of traffic data, a second set of traffic instances which are found to be a second threat of the first type; checking the stored set of threat information and action information indicating an automatic action or operator instructed action to be taken in response to a previous threat of the first type; and automatically taking the automatic or operator instructed action, if any, in the stored information matching the threat of the first type in response to detecting the second threat of the first type.

Computer Readable Medium Embodiment 3. The computer readable medium embodiment of computer readable medium embodiment 2, wherein said one or more threat detection and mitigation operations further include: notifying the operator of the second threat; and monitoring to detect a response from the operator indicating an action to be taken in response to the second threat.

Computer Readable Medium Embodiment 4

The computer readable medium embodiment of computer readable medium embodiment 3, wherein said one or more threat detection and mitigation operations further include: in response to detecting an operator indicated action to be taken in response to the second threat, implementing the operator indicated action.

Computer Readable Medium Embodiment 5

The computer readable medium embodiment of computer readable medium embodiment 4, wherein said one or more threat detection and mitigation operations further include: updating the stored information corresponding to the first type of threat to indicate the operator indicated action to be taken in response to threats of the first type.

Computer Readable Medium Embodiment 6

The computer readable medium embodiment of computer readable medium embodiment 3, wherein said one or more threat detection and mitigation operations further include: in response to failing to detect an operator indicated action to be taken in response to the second threat in a third predetermined time, checking to determine if the second threat corresponds to an increased rate of threats of the first type (e.g., a shorter time between detection of threats of the first type) or an increased level of threat (e.g., due to the severity of the threat); and if the detected threat corresponds to an increased rate of threats or an increased level of threats taking an automated action in response to the second threat in the absence of operator input.

Computer Readable Medium Embodiment 6A

The computer readable medium embodiment of computer readable medium embodiment 6, wherein taking an automated action in response to the second threat in the absence of operator input includes: checking the stored set of threat information and action information indicating an automatic action or operator instructed action to be taken in response to a previous threat of the first type having the same or a greater increased rate of threats of the first type or the same or a lesser level of threat of the first type (e.g., same or lesser severity level of threat for a threat of the first type); and automatically taking the automatic or operator instructed action, if any, in the stored information matching the second threat of the first type in response to detecting the second threat of the first type, said automatically taking the automatic or operator instructed action including: automatically determining a policy change to be implemented to enforce the determined action to be taken; communicating the policy change to be implemented to the sensor enforcer nodes and enforcement nodes in the communications system; and implementing the policy change at the sensor enforcer nodes and the enforcement nodes.

List of Anomaly Detection and Mitigation Embodiments

Anomaly Detection and Mitigation Method Embodiment 1. A method of operating a communication system, the method comprising: processing at a first node executing an application for anomaly detection and mitigation, a first set of traffic data including information about system traffic corresponding to a first time period, one or more pieces of data in said first data set being provided by sensors or sensor enforcer nodes monitoring traffic; detecting, based on the first set of traffic data, a first set of traffic instances which are found to be a first anomaly of a first type; notifying an operator of the first anomaly; monitoring to detect a response from the operator indicating an action to be taken in the system in response to the first anomaly; and in response to detecting an operator indicated action to be taken in response to the first anomaly, implementing said action; in response to failing to detect an operator indicated action to be taken in response to the first anomaly within a predetermined time, continuing system operation without taking an action in response to the first anomaly; and storing information about the first anomaly of the first type and any action taken in response to the first anomaly of the first type.

Anomaly Detection and Mitigation Method Embodiment 2. The method of Anomaly Detection and Mitigation Method Embodiment 1, further comprising: in response to detecting an operator indicated action to be taken in response to the first anomaly determining a policy change to be implemented to enforce the operator indicated action; and communicating the policy change to one or more enforcement nodes or sensor enforcer nodes.

Anomaly Detection and Mitigation Method Embodiment 3. The method of Anomaly Detection and Mitigation Method Embodiment 1, further comprising: processing at the first node a second set of traffic data including information about system traffic corresponding to a second time period, said second time period following said first time period; detecting, based on the second set of traffic data, a second set of traffic instances which are found to be a second anomaly of the first type; checking the stored set of potential anomaly information and action information indicating an automatic action or operator instructed action to be taken in response to a previous anomaly of the first type; and automatically taking the automatic or operator instructed action, if any, in the stored information matching the anomaly of the first type in response to detecting the second anomaly of the first type.

Anomaly Detection and Mitigation Method Embodiment 4. A closed loop method of operating a Unified Communications system comprising: continuously monitoring by sensors distributed throughout a network of the Unified Communications system traffic data over a configurable time period, said traffic data including application level traffic data (e.g., call detail records, SIP application level data and metrics); detecting one or more anomalies in the network based on the monitored traffic data: applying one or more policies by enforcement devices in the network until said monitoring indicates that Unified Communications system traffic has meet or exceeded a threshold.

Anomaly Detection and Mitigation Method Embodiment 5. The method of the Anomaly Detection and Mitigation Method Embodiment 1, wherein the threshold is one of the following: an optimization threshold, a Quality of Service threshold, a Quality of Service threshold in compliance with a service contract, a call or session throughput optimization threshold.

The techniques of various embodiments may be implemented using software, hardware and/or a combination of software and hardware. Various embodiments are directed to apparatus, e.g., sensors, call processing devices, gateways, session border controllers, network nodes and/or network equipment devices. Various embodiments are also directed to methods, e.g., method of controlling and/or operating devices such as sensors, call processing devices, gateways, session border controllers, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or, in some embodiments, logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border controllers, network nodes and/or network equipment devices, including a processor configured to implement one, multiple or all of the steps of one or more methods of the invention.

In some embodiments, the processor or processors, e.g., CPUs, of one or more devices, e.g., computing nodes such as call processing devices, session border controllers are configured to perform the steps of the methods described as being performed by the computing nodes, e.g., sensors, call processing devices, gateways, session border controllers, network nodes and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as sensors, call processing devices, gateways, session border controllers, network nodes and/or network equipment devices with a processor which includes a component corresponding to each of the steps of the various described methods performed by the device in which the processor is included. In some but not all embodiments a device, e.g., computing node such as sensors, call processing devices, gateways, session border controller, network nodes and/or network equipment devices, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a communication system, the method comprising:
    processing at a first node executing an application for anomaly detection and mitigation, a first set of traffic data including information about system traffic corresponding to a first time period, one or more pieces of data in said first set of traffic data being provided by sensors or sensor enforcer nodes monitoring traffic;
    detecting, based on the first set of traffic data, a first set of traffic instances which are found to be a first anomaly of a first type;
    notifying an operator of the first anomaly;
    monitoring to detect a response from the operator indicating an action to be taken in the system in response to the first anomaly;
    in response to detecting an operator indicated action to be taken in response to the first anomaly, implementing said operator indicated action to be taken in response to the first anomaly;
    in response to failing to detect an operator indicated action to be taken in response to the first anomaly within a predetermined time, continuing system operation without taking an action in response to the first anomaly;
    storing information about the first anomaly of the first type and any action taken in response to the first anomaly of the first type;
    determining, if the first set of traffic instances contain a set of patterns that match patterns indicative of a robo-call type of threat, said set of patterns which are indicative of the robo-call type of threat being an Answer Seizure Ratio (ASR) for calls originated from a same source being below a first threshold coupled with a percentage of calls of short duration being above a second threshold; and when the first set of traffic instances are determined to contain a set of patterns that match patterns indicative of a robo-call type of threat communicating instructions to enforcer and sensor enforcer nodes to take a robocall mitigation operation.

2. The method of claim 1, further comprising:

in response to detecting an operator indicated action to be taken in response to the first anomaly determining a policy change to be implemented to enforce the operator indicated action; and communicating the policy change to one or more enforcement nodes or sensor enforcer nodes.

3. The method of claim 1, further comprising:

processing at the first node a second set of traffic data including information about system traffic corresponding to a second time period, said second time period following said first time period;

detecting, based on the second set of traffic data, a second set of traffic instances which are found to be a second anomaly of the first type;

checking a stored set of anomaly and action information for information indicating an automatic action or operator instructed action previously taken in response to a previous anomaly of the first type; and upon identification of an automatic action or operator instructed action previously taken in response to a previous anomaly of the first type, implementing the identified automatic action or operator instructed action in response to the detected second anomaly of the first type.

4. The method of claim 3, further comprising:

after taking an automatic action or operator instructed action matching the anomaly of the first type in response to detecting the second anomaly of the first type, continuously monitoring traffic data from sensor and sensor enforcer nodes for a configurable time period and applying one or more policies by enforcement devices in the network until said monitoring indicates that the system traffic has met or exceeded a third threshold.

5. The method of claim 4, wherein the third threshold is one of the following a Quality of Service threshold or a throughput optimization threshold.

6. The method of claim 1, further comprising:

detecting, based on the first set of traffic data, a first threat of a first type, said first type of threat being different than said robo-call type of threat;

notifying the operator of the detection of the first threat of the first type;

monitoring for a first response period of time to detect a response from the operator indicating an action to be taken in the system in response to the first threat of the first type;

detecting an operator indicated action to be taken in response to the first threat of the first type prior to the expiration of the first response period of time;

implementing said detected operator indicated action to be taken in response to the first threat of the first type; and storing information about the first threat of the first type and the action implemented in response to the first threat of the first type.

7. The method of claim 6, further comprising:

detecting a second threat of the first type subsequent to detecting said first threat of the first type;

notifying the operator of the detection of the second threat of the first type;

monitoring for a second response period of time to detect a response from the operator indicating an action to be taken in the system in response to the second threat of the first type; and when no response is detected within the second response period of time, automatically implementing the stored action implemented in response to the first threat of the first type.

8. A closed loop method of operating a Unified Communications system comprising:

continuously monitoring, by sensors distributed throughout a network of the Unified Communications system, traffic data over a configurable time period, said traffic data including application level protocol specific information;

detecting, based on the monitored traffic data, a first set of traffic instances;

detecting one or more anomalies in the network based on the monitored traffic data;

determining, if the first set of traffic instances contain a set of patterns that match patterns indicative of a robo-call type of threat, said set of patterns which are indicative of the robo-call type of threat being an Answer Seizure Ratio (ASR) for calls originated from a same source being below a first threshold coupled with a percentage of calls of short duration being above a second threshold; and when the first set of traffic instances are determined to contain a set of patterns that match patterns indicative of a robo-call type of threat communicating instructions to enforcer and sensor enforcer nodes to take a robocall mitigation operation; and applying one or more policies by enforcement devices in the network until said monitoring indicates that Unified Communications system traffic has met or exceeded a third threshold.

9. The method of claim 8, wherein the third threshold is one of the following: a Quality of Service threshold in compliance with a service contract or a session throughput optimization threshold.

10. The method of claim 8, wherein said application level protocol specific information includes Session Initiation Protocol information.

11. The method of claim 8, wherein said application level protocol specific information includes one or more of the following: a quality of session metric based on one or more of the following: number of packets exchanged, number of packets lost, rate of packet loss, packet discard rate due to late arrival of packets, burst density gap, gap durations, Mean Opinion Score (MOS), and number of consecutive packet losses for packet loss periods experienced during a session.

12. The method of claim 8, wherein detecting one or more anomalies in the network based on the monitored traffic data is performed by an anomaly detection and mitigation application.

13. The method of claim 12, further comprising:
communicating, by the anomaly detection and mitigation application, said one or more policies to be applied to a policy server; and
communicating from the policy server to the enforcement devices the one or more policies to be applied.

14. The method of claim 12, wherein said anomaly detection and mitigation application is implemented on a virtual machine in a cloud.

15. The method of claim 8,
wherein said robo-call mitigation operation is an action that was previously specified by an operator in response to the operator being notified of detection of a prior threat of the robo-call type, said detection of the prior threat of the robo-call type occurring prior to said detection of said first set of traffic instances.

16. The method of claim 15, further comprising:
notifying the operator of the detection of the prior threat of the robo-call type, said notifying the operator of the detection of the prior threat of the robo-call type including sending a notification to a smartphone of the operator with a list of potential actions that may be taken.

17. An anomaly detection node of a Unified Communications system comprising:
memory; and
a processor, said processor controlling the anomaly detection node to perform the following operations:
continuously monitor, over a configurable time period, traffic data received from sensors and sensor enforcer devices distributed throughout a network of the Unified Communications system, said traffic data including application level protocol specific information;
detect, based on the monitored traffic data, a first set of traffic instances;
detect one or more anomalies in the network based on the monitored traffic data;
determine, if the first set of traffic instances contain a set of patterns that match patterns indicative of a robo-call type of threat, said set of patterns which are indicative of the robo-call type of threat being an Answer Seizure Ratio (ASR) for calls originated from a same source being below a first threshold coupled with a percentage of calls of short duration being above a second threshold;
when the first set of traffic instances are determined to contain a set of patterns that match patterns indicative of a robo-call type of threat communicating instructions to enforcer and sensor enforcer nodes to take a robo-call mitigation operation; and
communicate one or more policies to be applied by enforcement devices in the network until said monitoring indicates that Unified Communications system traffic has met or exceeded a third threshold.

18. The anomaly detection node of claim 17, wherein the third threshold is one of the following: a Quality of Service threshold in compliance with a service contract or a session throughput optimization threshold.

19. The anomaly detection node of claim 17, wherein said application level protocol specific information includes Session Initiation Protocol information.

20. The anomaly detection node of claim 17, wherein said application level protocol specific information includes one or more of the following: a quality of session metric based on one or more of the following: number of packets exchanged, number of packets lost, rate of packet loss, packet discard rate due to late arrival of packets, burst density gap, gap durations, Mean Opinion Score (MOS), and number of consecutive packet losses for packet loss periods experienced during a session.

* * * * *